(12) United States Patent
Oishi et al.

(10) Patent No.: US 11,788,173 B2
(45) Date of Patent: Oct. 17, 2023

(54) FREE-CUTTING COPPER ALLOY, AND MANUFACTURING METHOD OF FREE-CUTTING COPPER ALLOY

(71) Applicant: MITSUBISHI MATERIALS CORPORATION, Tokyo (JP)

(72) Inventors: Keiichiro Oishi, Sakai (JP); Kouichi Suzaki, Sakai (JP); Hiroki Goto, Sakai (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 0 days.

(21) Appl. No.: 17/436,667

(22) PCT Filed: Dec. 23, 2019

(86) PCT No.: PCT/JP2019/050255
§ 371 (c)(1),
(2) Date: Sep. 7, 2021

(87) PCT Pub. No.: WO2020/261611
PCT Pub. Date: Dec. 30, 2020

(65) Prior Publication Data
US 2022/0186352 A1 Jun. 16, 2022

(30) Foreign Application Priority Data

Jun. 25, 2019 (JP) ................. 2019-116914
Jul. 12, 2019 (JP) ................. 2019-130143
(Continued)

(51) Int. Cl.
*C22C 9/04* (2006.01)
*C21D 9/00* (2006.01)
(Continued)

(52) U.S. Cl.
CPC ................ *C22C 9/04* (2013.01); *B22D 21/00* (2013.01); *C21D 9/00* (2013.01); *C22C 9/10* (2013.01); *C22F 1/08* (2013.01)

(58) Field of Classification Search
CPC ...... C21D 9/00; C21D 8/0226; C21D 8/0273; C21D 8/0236; C22C 9/04; C22F 1/08
See application file for complete search history.

(56) References Cited

U.S. PATENT DOCUMENTS

| | | | |
|---|---|---|---|
| 4,055,445 A | 10/1977 | Pops | |
| 4,259,124 A | 3/1981 | Smith et al. | |

(Continued)

FOREIGN PATENT DOCUMENTS

| | | |
|---|---|---|
| CN | 1969052 A | 5/2007 |
| CN | 101298643 A | 11/2008 |

(Continued)

OTHER PUBLICATIONS

Office Action dated Feb. 28, 2022, issued for Indian Patent Application No. 202117033588.
(Continued)

*Primary Examiner* — John A Hevey
(74) *Attorney, Agent, or Firm* — Locke Lord LLP

(57) ABSTRACT

This free-cutting copper alloy includes Cu: more than 58.0% and less than 65.0%, Si: more than 0.30% and less than 1.30%, Pb: more than 0.001% and 0.20% or less, Bi: more than 0.020% and 0.10% or less, and P: more than 0.001% and less than 0.20%, with the remainder being Zn and unavoidable impurities, a total amount of Fe, Mn, Co and Cr is less than 0.45%, a total amount of Sn and Al is less than 0.45%, relationships of 56.5≤[Cu]−4.7×[Si]+0.5×[Pb]+0.5×[Bi]−0.5×[P]≤59.5, and 0.025≤[Pb]+[Bi]<0.25 are satisfied,
(Continued)

in constituent phases of a metallographic structure, relationships of $20 \leq (\alpha) < 85$, $15 < (\beta) \leq 80$, $0 \leq (\gamma) < 5$, $8.0 \leq ([Bi]+[Pb]-0.002)^{1/2} \times 10 + ([P]-0.001)^{1/2} \times 5 + ((\beta)-7)^{1/2} \times ([Si]-0.1)^{1/2} \times 1.2 + (\gamma)^{1/2} \times 0.5 \leq 17.0$, and $0.9 \leq ([Bi]+[Pb]-0.002)^{1/2} \times ((\beta)-7)^{1/2} \times ([Si]-0.1)^{1/2} \leq 4.0$ are satisfied, and a particle containing Bi is present in $\alpha$ phase.

9 Claims, 1 Drawing Sheet

(30) Foreign Application Priority Data

Jul. 31, 2019 (JP) .................. 2019-141096
Sep. 9, 2019 (JP) .................. 2019-163773

(51) Int. Cl.
  C22F 1/08 (2006.01)
  B22D 21/00 (2006.01)
  C22C 9/10 (2006.01)

(56) References Cited

U.S. PATENT DOCUMENTS

| | | | |
|---|---|---|---|
| 6,165,246 A | 12/2000 | Kira et al. | |
| 11,479,834 B2 | 10/2022 | Oishi et al. | |
| 2004/0159375 A1 | 8/2004 | Yamagishi | |
| 2004/0241038 A1 | 12/2004 | Hofmann et al. | |
| 2005/0039827 A1 | 2/2005 | Yamagishi et al. | |
| 2007/0158002 A1* | 7/2007 | Oishi | B22D 27/00 420/472 |
| 2007/0169854 A1 | 7/2007 | Oishi | |
| 2009/0263272 A1 | 10/2009 | Uchida | |
| 2009/0297390 A1 | 12/2009 | Hidenobu et al. | |
| 2010/0135848 A1 | 6/2010 | Xu et al. | |
| 2014/0248175 A1 | 9/2014 | Lee et al. | |
| 2014/0251488 A1* | 9/2014 | Oishi | F16L 9/02 420/478 |
| 2015/0132179 A1 | 5/2015 | Oishi | |
| 2016/0068931 A1 | 3/2016 | Xu et al. | |
| 2016/0215366 A1 | 7/2016 | Uchida | |
| 2019/0256960 A1 | 8/2019 | Oishi et al. | |
| 2020/0157658 A1 | 5/2020 | Oishi et al. | |
| 2020/0181739 A1 | 6/2020 | Oishi et al. | |
| 2022/0042141 A1 | 2/2022 | Oishi et al. | |
| 2022/0259711 A1* | 8/2022 | Oishi | C22C 9/04 |
| 2022/0275479 A1* | 9/2022 | Oishi | C22C 9/04 |

FOREIGN PATENT DOCUMENTS

| | | |
|---|---|---|
| CN | 101476056 A | 7/2009 |
| CN | 104004940 A | 8/2014 |
| CN | 104480344 A | 4/2015 |
| CN | 105624463 A | 6/2016 |
| CN | 103282524 B | 8/2016 |
| CN | 106893883 A | 6/2017 |
| CN | 107937752 A | 4/2018 |
| CN | 107974573 A | 5/2018 |
| CN | 109563567 A | 4/2019 |
| CN | 109563568 A | 4/2019 |
| CN | 109563569 A | 4/2019 |
| CN | 109642272 A | 4/2019 |
| EP | 0947592 A1 | 10/1999 |
| EP | 1790742 A1 | 5/2007 |
| EP | 2634275 A1 | 9/2013 |
| EP | 3050982 A1 | 8/2016 |
| EP | 3498870 A1 | 6/2019 |
| IN | 201917005548 | 4/2019 |
| JP | 2000-119774 A | 4/2000 |
| JP | 2000-119775 A | 4/2000 |
| JP | 2000-355746 A | 12/2000 |
| JP | 2004-244672 A | 9/2004 |
| JP | 2004-263301 A | 9/2004 |
| JP | 3999676 B2 | 10/2007 |
| JP | 2010-242184 A | 10/2010 |
| JP | 2011-219857 A | 11/2011 |
| JP | 2013-104071 A | 5/2013 |
| JP | 5865548 B2 | 2/2016 |
| JP | 2016-511792 A | 4/2016 |
| JP | 2016-145411 A | 8/2016 |
| JP | 2016-194123 A | 11/2016 |
| JP | 2018-048397 A | 3/2018 |
| JP | 2018-172725 A | 11/2018 |
| JP | 2019-508584 A | 3/2019 |
| TW | 200722536 A | 6/2007 |
| TW | 200930822 A | 7/2009 |
| TW | 201107501 A | 3/2011 |
| TW | 201335391 A | 9/2013 |
| TW | I467036 B | 1/2015 |
| TW | 201527559 A | 7/2015 |
| TW | 201910525 A | 3/2019 |
| TW | 201910526 A | 3/2019 |
| TW | 201910527 A | 3/2019 |
| WO | 2005/093108 A1 | 10/2005 |
| WO | 2006/016442 A1 | 2/2006 |
| WO | 2006/016624 A1 | 2/2006 |
| WO | 2006/016630 A1 | 2/2006 |
| WO | 2007/034571 A1 | 3/2007 |
| WO | 2008/081947 A1 | 7/2008 |
| WO | 2009/048008 A1 | 4/2009 |
| WO | 2012/057055 A1 | 5/2012 |
| WO | 2013/065830 A1 | 5/2013 |
| WO | 2015/046421 A1 | 4/2015 |
| WO | 2017/127284 A1 | 7/2017 |
| WO | 2017/204252 A1 | 11/2017 |
| WO | 2019/035225 A1 | 2/2019 |

OTHER PUBLICATIONS

Office Action dated Mar. 2, 2022 issued for U.S. Appl. No. 17/426,164.
Office Action dated Mar. 14, 2022, issued for Chinese Patent Application No. 201980096002.6 and English translation of the Search Report.
Office Action dated Apr. 1, 2022, issued in Chinese Patent Application No. CN 202080038596.8 and English translation of the Search Report.
Genjiro Mima and Seiji Hasegawa, Journal of the Japan Copper and Brass Research Association, vol. 2, No. 1, 1963, pp. 62-77.
International Search Report dated Mar. 3, 2020, issued for PCT/JP2019/048438 and English translation thereof.
International Search Report dated Mar. 3, 2020, issued for PCT/JP2019/048455 and English translation thereof.
International Search Report dated May 12, 2020, issued for PCT/JP2020/006037 and English translation thereof.
International Search Report dated Jun. 16, 2020, issued for PCT/JP2020/011343 and English translation thereof.
International Search Report dated Mar. 3, 2020, issued for PCT/JP2019/050255 and English translation thereof.
International Search Report dated Feb. 9, 2021, issued for PCT/JP2020/044418 and English translation thereof.
Office Action dated Sep. 15, 2020, issued for the Taiwan Patent Application No. 108145211 and English translation of the Search Report.
Office Action dated Jan. 8, 2021, issued for the Taiwan Patent Application No. 108145219 and English translation of the Search Report.
Office Action dated Nov. 30, 2020, issued for the Taiwan Patent Application No. 109105097 and English translation of the Search Report.
Office Action dated Jul. 14, 2020, issued for the Taiwan Patent Application No. 108147337 and English translation of the Search Report.
Office Action dated Jul. 13, 2021, issued for the Taiwan Patent Application No. 109143360 and English translation of the Search Report.
Supplementary European Search Report dated Dec. 21, 2021, issued for European Patent Application No. 19935321.0.

(56) References Cited

OTHER PUBLICATIONS

Requirement for Restriction/Election dated Dec. 27, 2021, issued for U.S. Appl. No. 17/426,140.
Office Action dated Dec. 28, 2021, issued for Chinese Patent Application No. 201980090321.6 and English partial Translation (Search Report only).
Office Action dated Dec. 28, 2021, issued for Chinese Patent Application No. 201980090313.1 and English partial Translation (Search Report only).
Requirement for Restriction/Election dated Jan. 26, 2022, issued for U.S. Appl. No. 17/426,164.
Office Action issued in Indian Patent Application No. 202217022390, dated Aug. 12, 2022.
Office Action dated Mar. 13, 2023, issued for U.S. Appl. No. 17/611,195.
Office Action dated Feb. 1, 2023, issued for Chinese Patent Application No. 202080084404.7 and English translation of the Search Report.
Pemika Suksongkarm et al., "Bismuth Formation in Lead-Free Cu-Zn-Si Yellow Brass with Various Bismuth-Tin Alloy Additions," Materials Transactions, vol. 59, No. 11, 2018, pp. 1747-1752.
Notice of Allowance dated Jul. 18, 2023, issued for U.S. Appl. No. 17/611,195.

* cited by examiner

FREE-CUTTING COPPER ALLOY, AND MANUFACTURING METHOD OF FREE-CUTTING COPPER ALLOY

TECHNICAL FIELD

The present invention relates to a free-cutting copper alloy having a high strength and a significantly reduced Pb content and a method for producing a free-cutting copper alloy. The present invention relates to a free-cutting copper alloy used for automobile components, electrical and electronic apparatus components, mechanical components, stationaries, toys, sliding components, measuring instrument components, precision mechanical components, medical components, drink-related devices and components, devices and components for water drainage, industrial plumbing components, or components relating to liquid or gas such as drinking water, industrial water, drainage water, or hydrogen, and a method for producing the free-cutting copper alloy. Examples of specific component names include valves, joints, cocks, faucets, faucet fittings, gears, axles, bearings, shafts, sleeves, spindles, sensors, bolts, nuts, flare nuts, pen points, insert nuts, cap nuts, nipples, spacers, and screws. The present invention relates to a free-cutting copper alloy used for the components that are made by machining, and a method for producing the free-cutting copper alloy.

The present application claims priority on Japanese Patent Application No. 2019-116914 filed on Jun. 25, 2019, Japanese Patent Application No. 2019-130143 filed on Jul. 12, 2019, Japanese Patent Application No. 2019-141096 filed on Jul. 31, 2019, and Japanese Patent Application No. 2019-163773 filed on Sep. 9, 2019, the contents of which are incorporated herein by reference.

BACKGROUND ART

Conventionally, a Cu—Zn—Pb alloy (so-called a free-cutting brass bar, brass for forging, or brass for casting) or a Cu—Sn—Zn—Pb alloy (so-called bronze casting: gunmetal) having excellent machinability was generally used for automobile components, electrical, home appliance, and electronic apparatus components, mechanical components, stationaries, precision mechanical components, medical components, and devices and components relating to liquid or gas such as drinking water, industrial water, drainage water, or hydrogen, specific component names of which include valve, joint, gear, sensor, nut, and screw.

A Cu—Zn—Pb alloy includes 56% to 65 mass % Cu, 1% to 4 mass % Pb, and the balance is Zn. A Cu—Sn—Zn—Pb alloy includes 80% to 88 mass % Cu, 2% to 8 mass % Sn, 1% to 8 mass % Pb, and the balance is Zn.

However, recently, Pb's influence on human body and the environment is becoming a concern, and momentum to regulate Pb is increasing in various countries. For example, a regulation for reducing the Pb content in drinking water supply devices to be 0.25 mass % or lower came into force in January 2010 in California, the United States. In countries other than the United States also, such regulation is rapidly being established, and development of a copper alloy material that meets the requirements of the regulation on Pb content is in demand.

In addition, in other industrial fields such as those of automobiles, electrical and electronic apparatuses, and machines, for example, in ELV regulations and RoHS regulations of the Europe, free-cutting copper alloys are exceptionally allowed to include maximum 4 mass % Pb. However, like in the field of drinking water, strengthening of regulations on Pb content including elimination of exemptions has been actively discussed.

While there is a trend to strengthen Pb regulations for free-cutting copper alloys, alloys like (1) a Cu—Zn—Bi alloy or Cu—Zn—Bi—Se alloy including Bi having machinability (machining performance, machinability-improvement function) or, in some cases, including not only Bi but also Se instead of Pb, (2) a Cu—Zn alloy including a high concentration of Zn in which the amount of β phase is increased to improve machinability, (3) a Cu—Zn—Si alloy or Cu—Zn—Sn alloy including large amounts of γ phase and κ phase having machinability instead of Pb, (4) a Cu—Zn—Sn—Bi alloy including a large amount of γ phase and Bi, etc. are proposed.

For example, Patent Documents 1 and 12 disclose a method of improving corrosion resistance and machinability by adding about 1.0 to 2.5 mass % Sn and about 1.5 to 2.0 mass % Bi to a Cu—Zn alloy such that γ phase precipitates.

However, alloys including Bi instead of Pb have many problems. For example, Bi has lower machinability than Pb. Bi may be harmful to the environment and human body like Pb. Bi has a resourcing problem because it is a rare metal. And, Bi embrittles a copper alloy material.

In addition, as disclosed in Patent Document 1, even when γ phase of a Cu—Zn—Sn alloy is precipitated, γ phase including Sn has poor machinability, thus requiring co-addition of Bi having machinability.

Further, it is absolutely impossible to replace a free-cutting copper alloy containing lead with a Cu—Zn binary alloy including a large amount of β phase since even though β phase contributes to improvement of machinability, it has lower machinability than Pb.

For this reason, Cu—Zn—Si alloys including Si instead of Pb are proposed as free-cutting copper alloys in, for example, Patent Documents 2 to 11.

In Patent Documents 2 and 3, excellent machinability is realized without including Pb or with a small amount of Pb by the excellent machinability of γ phase, or, in some cases, κ phase formed in an alloy mainly comprising a high Cu concentration of 69% to 79 mass % and a high Si concentration of 2 to 4 mass %. By including greater than or equal to 0.3 mass % Sn and greater than or equal to 0.1 mass % Al, formation of γ phase having machinability is further increased and accelerated such that machinability can be improved. Corrosion resistance is improved by forming a large amount of γ phase.

In Patent Document 4, excellent machinability is obtained by adding an extremely small amount (0.02 mass % or lower) of Pb and simply defining the total area of γ phase and κ phase mainly in consideration of the Pb content.

Patent Document 5 proposes a copper alloy in which Fe is included in a Cu—Zn—Si alloy.

Patent Document 6 proposes a copper alloy in which Sn, Fe, Co, Ni, and Mn are included in a Cu—Zn—Si alloy.

Patent Document 7 proposes a Cu—Zn—Si alloy having an α phase matrix including κ phase in which area ratios of β phase, γ phase, and μ phase are limited.

Patent Document 8 proposes a Cu—Zn—Si alloy having an α phase matrix including κ phase in which area ratios of β phase and γ phase are limited.

Patent Document 9 proposes a Cu—Zn—Si alloy in which the length of the longer sides of γ phase and the length of the longer sides of μ phase are defined.

Patent Document 10 proposes a Cu—Zn—Si alloy to which Sn and Al are added.

Patent Document 11 proposes a Cu—Zn—Si alloy in which γ phase is distributed in the form of particles at a phase boundary between α phase and β phase to improve machinability.

Patent Document 14 proposes a Cu—Zn alloy to which Sn, Pb, and Si are added.

Now, as described in Patent Document 13 and Non-Patent Document 1, in Cu—Zn—Si alloys, it is known that, even when looking at only those having Cu concentration of 60 mass % or higher, a Zn concentration of 40 mass % or lower, and Si concentration of 10 mass % or lower, 10 kinds of metallic phases including α phase matrix, β phase, γ phase, δ phase, ε phase, ζ phase, η phase, κ phase, μ phase, and χ phase, in some cases, 13 kinds of metallic phases including additional phases of α', β', and γ' are present. Further, it is empirically known that, as the number of additive elements increases, the metallographic structure becomes complicated, and a new phase or an intermetallic compound may appear. In addition, it is also empirically well known that there is a large difference in the constitution of metallic phases between what an equilibrium phase diagram shows and that of an actually produced alloy. Further, it is well known that the compositions of these phases change depending on the concentrations of Cu, Zn, Si, and the like in a copper alloy and processing heat history.

Incidentally, in Cu—Zn—Pb alloys including Pb, the Cu concentration is about 60 mass % whereas in all the Cu—Zn—Si alloys described in Patent Documents 2 to 9, the Cu concentrations are 65 mass % or higher, and a reduction in the concentration of expensive Cu is desired from a viewpoint of economic efficiency.

In Patent Document 10, Sn and Al are indispensably contained in a Cu—Zn—Si alloy in order to obtain excellent corrosion resistance, and also a large amount Pb, or Bi is required in order to realize excellent machinability. Patent Document 11 describes copper alloy castings free of Pb having a Cu concentration of about 65 mass % or higher and good castability and mechanical strength in which machinability is improved by γ phase, and examples containing large amounts of Sn, Mn, Ni Sb, and B.

In addition, for conventional leaded free-cutting copper alloys, it is expected that high-speed machining such as turning or drilling can be performed without troubles for at least 24 hours and without replacement of cutting tool or adjustment such as polishing of cutting edge for 24 hours. Although depending on the degree of difficulty of machining, the same level of machinability is expected for alloys containing a significantly reduced amount of Pb.

Now, in Patent Document 5, the Cu—Zn—Si alloy includes Fe, and Fe and Si form an intermetallic compound of Fe—Si which is harder and more brittle than γ phase. This intermetallic compound has problems like reducing tool life of a cutting tool during machining and generation of hard spots during polishing impairing the external appearance. In addition, since Fe combines with Si which is an additive element and Si is thus consumed as an intermetallic compound, the performance of the alloy deteriorates.

In addition, in Patent Document 6, Sn, Fe, Co, and Mn are added to a Cu—Zn—Si alloy. However, Fe, Co, and Mn all combine with Si to form a hard and brittle intermetallic compound. Therefore, such addition causes problems during machining or polishing as disclosed by Patent Document 5.

PRIOR ART DOCUMENTS

Patent Document

Patent Document 1: PCT International Publication No. WO2008/081947

Patent Document 2: Japanese Unexamined Patent Application, First Publication No. 2000-119775
Patent Document 3: Japanese Unexamined Patent Application, First Publication No. 2000-119774
Patent Document 4: PCT International Publication No. WO2007/034571
Patent Document 5: Published Japanese Translation No. 2016-511792 of the PCT International Publication
Patent Document 6: Japanese Unexamined Patent Application, First Publication No. 2004-263301
Patent Document 7: PCT International Publication No. WO2012/057055
Patent Document 8: Japanese Unexamined Patent Application, First Publication No. 2013-104071
Patent Document 9: PCT International Publication No. WO2019/035225
Patent Document 10: Japanese Unexamined Patent Application, First Publication No. 2018-048397
Patent Document 11: Published Japanese Translation No. 2019-508584 of the PCT International Publication
Patent Document 12: PCT International Publication No. WO2005/093108
Patent Document 13: U.S. Pat. No. 4,055,445
Patent Document 14: Japanese Unexamined Patent Application, First Publication No. 2016-194123

Non-Patent Document

Non-Patent Document 1: Genjiro MIMA, Masaharu HASEGAWA, Journal of the Japan Copper and Brass Research Association, 2 (1963), p. 62 to 77

DISCLOSURE OF INVENTION

Problems to be Solved by the Invention

The present invention has been made in order to solve the above-described problems in the conventional art, and an object thereof is to provide a free-cutting copper alloy having excellent hot workability, a high strength, and a good balance between strength and ductility, whose Pb content has been significantly reduced, and a method for producing the free-cutting copper alloy.

In this specification, unless specified otherwise, a hot worked material includes a hot extruded material, a hot forged material, and a hot rolled material. Cold workability refers to performance of cold working such as drawing, wire drawing, rolling, crimping, or bending. Drilling refers to making holes with a drill. Excellent machinability refers to low cutting resistance and good or excellent chip breakability during turning with a lathe or drilling. Conductivity refers to electric conductivity and thermal conductivity. In addition, β phase includes β' phase, γ phase includes γ' phase, and α phase includes α' phase. Cooling rate refers to the average cooling rate in a given temperature range. "Particles containing Bi" refer to particles that contain both Bi and Pb (particles of an alloy comprising Bi and Pb) and is sometimes simply denominated as Bi particles. 24 hours refer to one day. P-containing compound is a compound including P and at least either Si or Zn or both Si and Zn, in some cases, further including Cu and/or inevitable impurities such as Fe, Mn, Cr, or Co. A P-containing compound can be a compound such as P—Si, P—Si—Zn, P—Zn, or P—Zn—Cu. P-containing compound also refers to a compound including P, Si, and Zn.

Solutions for Solving the Problems

In order to solve the above-described problems and to achieve the above-described object, the present inventors conducted a thorough investigation and obtained the following findings.

Patent Document 4 discloses that in Cu—Zn—Si alloys, β phase does not substantially contribute to but rather inhibits machinability. Patent Documents 2 and 3 recite that when β phase is present, β phase is changed into γ phase by heat treatment. In Patent Documents 7, 8, and 9, also, the amount of β phase is significantly limited. In Patent Documents 1 and 12, in order to give excellent dezincification corrosion resistance to an Cu—Zn—Sn—Bi alloy, β phase, which has poor corrosion resistance, is limited.

First, the present inventors diligently studied β phase that had been known to have no effect on machinability of a Cu—Zn—Si alloy in the conventional art, and ascertained the composition of β phase that has a large effect on machinability. That is, β phase of a Cu—Zn—Si alloy made by adding an appropriate amount of Si to appropriate amounts of Cu and Zn, exhibited remarkably improved machinability compared with Si-free β phase. However, there still was a significant difference in machinability in terms of chip breakability and cutting resistance if compared with a free-cutting brass including 3 mass % Pb even if Si-containing β phase was present.

Then we learned that there were some ways to make a further improvement in the metallographic structure for the solution of the problem.

One way was to further add P and have it solid solubilize in β phase and have a compound including P and Si and/or Zn having a size of about 0.3 to 3 μm (for example, P—Si, P—Zn, P—Si—Zn, or P—Zn—Cu, etc.) precipitate in β phase of a Cu—Zn—Si alloy including an appropriate amount of Si in order to improve the machinability (machining performance, machinability-improvement function) of β phase itself. As a result, the machinability of β phase improved more.

However, β phase with improved machinability has poor ductility and toughness. In order to improve ductility without deterioration of the machinability of β phase, the amounts of β phase and α phase were controlled to appropriate levels, and distributions of α phase and β phase, and shapes of crystal grains of α phase were controlled.

A more important improvement point is improvement of machinability of α phase having poor machinability. When a Cu—Zn alloy including Si includes Bi, Bi particles having a particle size of about 0.1 to 3 μm can be caused to be preferentially present in α phase due to the action of Si. As a result, it was found that the machinability of α phase improves and the machinability of the alloy significantly improves.

As described above, it was found that, by including β phase whose machinability is improved by including Si, α phase whose machinability is improved due to the presence of Bi, and a very small amount of Pb, the machinability of the alloy can be improved. Of course, by solid-solubilizing P in β phase such that P-containing compound is present, the machinability of the alloy further improves. Thus the free-cutting copper alloy according to the present invention, which has free-cutting ability comparable to that of a conventional copper alloy including a large amount of Pb, was invented by including a small amount of γ phase in some cases.

A free-cutting copper alloy according to the first aspect of the present invention includes: higher than 58.0 mass % and lower than 65.0 mass % of Cu; higher than 0.30 mass % and lower than 1.30 mass % of Si; higher than 0.001 mass % and lower than or equal to 0.20 mass % of Pb; higher than 0.020 mass % and lower than or equal to 0.10 mass % of Bi; and higher than 0.001 mass % and lower than 0.20 mass % of P, with the balance being Zn and inevitable impurities, wherein among the inevitable impurities, a total content of Fe, Mn, Co, and Cr is lower than 0.45 mass % and a total content of Sn and Al is lower than 0.45 mass %, when a Cu content is represented by [Cu] mass %, a Si content is represented by [Si] mass %, a Pb content is represented by [Pb] mass %, a Bi content is represented by [Bi] mass %, and a P content is represented by [P] mass %, relationships of $56.5 \leq f1=[Cu]-4.7\times[Si]+0.5\times[Pb]+0.5\times[Bi]-0.5\times[P] \leq 59.5$ and $0.025 \leq f2=[Pb]+[Bi]<0.25$ are satisfied, a metallographic structure contains α phase and β phase, in constituent phases of the metallographic structure excluding non-metallic inclusions that are intermetallic compounds, precipitates, oxides, and sulfides, when an area ratio of α phase is represented by (α) %, an area ratio of γ phase is represented by (γ) %, and an area ratio of β phase is represented by (β) %, relationships of $$20 \leq (\alpha) < 85,$$

$$15 < (\beta) \leq 80,$$

$$0 \leq (\gamma) < 5,$$

$$8.0 \leq ([Bi]+[Pb]-0.002)^{1/2}\times 10+([P]-0.001)^{1/2}\times 5+((\beta)-7)^{1/2}\times ([Si]-0.1)^{1/2}\times 1.2+(\gamma)^{1/2}\times 0.5 \leq 17.0 \text{ and}$$

$$0.9 \leq ([Bi]+[Pb]-0.002)^{1/2}\times ((\beta)-7)^{1/2}\times ([Si]-0.1)^{1/2} \leq 4.0 \text{ are satisfied, and}$$

a particle containing Bi is present in the α phase.

A free-cutting copper alloy according to the second aspect of the present invention includes: higher than or equal to 59.5 mass % and lower than or equal to 64.5 mass % of Cu; higher than 0.50 mass % and lower than or equal to 1.20 mass % of Si; higher than or equal to 0.003 mass % and lower than 0.10 mass % of Pb; higher than or equal to 0.030 mass % and lower than 0.10 mass % of Bi; and higher than or equal to 0.010 mass % and lower than or equal to 0.14 mass % of P, with the balance being Zn and inevitable impurities, wherein among the inevitable impurities, a total content of Fe, Mn, Co, and Cr is lower than or equal to 0.35 mass % and a total content of Sn and Al is lower than or equal to 0.35 mass %, when a Cu content is represented by [Cu] mass %, a Si content is represented by [Si] mass %, a Pb content is represented by [Pb] mass %, a Bi content is represented by [Bi] mass %, and a P content is represented by [P] mass %, relationships of $56.8 \leq f1=[Cu]-4.7\times[Si]+0.5\times[Pb]+0.5\times[Bi]-0.5\times[P] \leq 59.0$, and $$0.04 \leq f2=[Pb]+[Bi] \leq 0.19 \text{ are satisfied,}$$

a metallographic structure contains α phase and β phase, in constituent phases of the metallographic structure excluding non-metallic inclusions that are intermetallic compounds, precipitates, oxides, and sulfides, when an area ratio of α phase is represented by (α) %, an area ratio of γ phase is represented by (γ) %, and an area ratio of β phase is represented by (β) %, relationships of

30≤(α)≤75,

25≤(β)≤70,

0≤(γ)<3, 10.0≤([Bi]+[Pb]−0.002)$^{1/2}$×10+([P]−0.001)$^{1/2}$×5+ ((β)−7)$^{1/2}$×([Si]−0.1)$^{1/2}$×1.2+(γ)$^{1/2}$×0.5≤14.0, and 1.2≤([Bi]+[Pb]−0.002)$^{1/2}$×((β)−7)$^{1/2}$× ([Si]−0.1)$^{1/2}$≤3.0 are satisfied, a particle containing Bi is present in the α phase, and a compound containing P is present in the β phase.

A free-cutting copper alloy according to the third aspect of the present invention is the free-cutting copper alloy according to the first or second aspect of the present invention in which a Si content in the β phase is higher than or equal to 0.4 mass % and lower than or equal to 1.7 mass %.

A free-cutting copper alloy according to the fourth aspect of the present invention is the free-cutting copper alloy according to any one of the first to third aspects of the present invention, which is a hot worked material, a material obtained by subjecting a hot worked material to cold working, or a material obtained by subjecting a material to hot working, annealing, and cold working, wherein an electrical conductivity is higher than or equal to 14% IACS, a tensile strength S (N/mm$^2$) is at least higher than or equal to 440 N/mm$^2$, and f8=S×(100+E)/100, which indicates a balance between the strength and the elongation E (%), is higher than or equal to 580.

A free-cutting copper alloy according to the fifth aspect of the present invention is the free-cutting copper alloy according to any one of the first to fourth aspects of the present invention, which is used for an automobile component, an electrical or electronic apparatus component, a mechanical component, a stationery, a toy, a sliding component, a measuring instrument component, a precision mechanical component, a medical component, a drink-related device or component, a device or component for water drainage, or an industrial plumbing component.

A method for producing a free-cutting copper alloy according to the sixth aspect of the present invention is a method for producing the free-cutting copper alloy according to any one of the first to fifth aspects of the present invention, including one or more hot working steps, wherein in the final hot working step among the hot working steps, hot working temperature is higher than 530° C. and lower than 650° C., and an average cooling rate in a temperature range from 530° C. to 450° C. after hot working is higher than or equal to 0.1° C./min and lower than or equal to 50° C./min.

A method for producing a free-cutting copper alloy according to the seventh aspect of the present invention is the method for producing a free-cutting copper alloy according to the sixth aspect of the present invention, further including one or more steps selected from a cold working step, a straightness correction step, and an annealing step.

A method for producing a free-cutting copper alloy according to the eighth aspect of the present invention is the method for producing a free-cutting copper alloy according to the sixth or seventh aspect of the present invention, further including a low-temperature annealing step that is performed after the final step among the hot working step, the cold working step, the straightness correction step, and the annealing step, wherein in the low-temperature annealing step, holding temperature is higher than or equal to 250° C. and lower than or equal to 430° C., and holding time is longer than or equal to 10 minutes and shorter than or equal to 200 minutes.

Effects of Invention

According to one aspect of the present invention, a free-cutting copper alloy having excellent hot workability, a high strength, and a good balance between strength and ductility, and containing a significantly reduced amount of lead, and a method for producing the free-cutting copper alloy can be provided.

EMBODIMENTS FOR CARRYING OUT THE INVENTION

Figure 1:
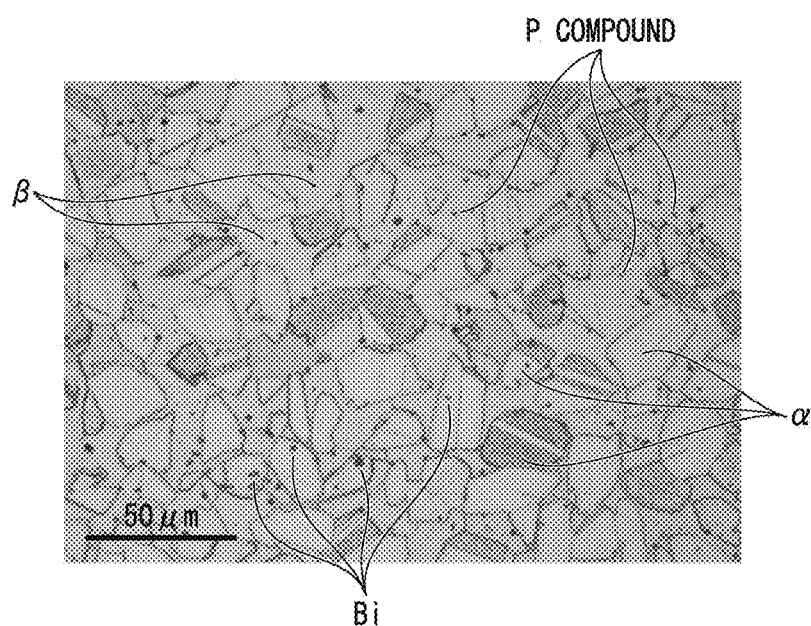
FIG. 1 is a picture showing a structure of a free-cutting copper alloy according to an embodiment of the present invention.

Below is a description of free-cutting copper alloys according to embodiments of the present invention and methods for producing the free-cutting copper alloys.

Free-cutting copper alloys according to embodiments of the present invention are used for automobile components, electrical or electronic apparatus components, mechanical components, stationeries, toys, sliding components, measuring instrument components, precision mechanical components, medical components, drink-related devices and components, devices and components for water drainage, and industrial plumbing components. Specifically, the alloys are used for valves, faucet fittings, faucets, joints, gears, screws, nuts, sensors, pressure vessels and the liked that are used as automobile component, electrical or electronic component, home appliance component, mechanical component, or device or component that comes in contact with liquid or gas such as drinking water, industrial water, and hydrogen.

Here, in this specification, an element symbol in parentheses such as [Zn] represents the content (mass %) of the element.

In embodiments of the present invention, using this content expressing method, composition relational expressions f1 and f2 are defined as follows.

Composition relational expression f1=[Cu]−4.7×[Si]+ 0.5×[Pb]+0.5×[Bi]−0.5×[P]

Composition relational expression f2=[Pb]+[Bi]

Further, in the embodiments, in constituent phases of the metallographic structure excluding non-metallic inclusions such as intermetallic compounds, precipitates, oxides, and sulfides, area ratio of α phase is represented by (α) %, area ratio of β phase is represented by (β) %, and area ratio of γ phase is represented by (γ) %. Area ratio of each of the phases will also be referred to as "amount of each of the phases", "proportion of each of the phases", or "proportion that each of the phases occupies".

In the embodiments, a plurality of metallographic structure relational expressions and composition and metallographic structure relational expressions are defined as follows.

Metallographic Structure Relational Expression $f3=$
(α)

Metallographic Structure Relational Expression $f4=$
(β)

Metallographic Structure Relational Expression $f5=$
(γ)

Composition and Metallographic Structure Relational Expression $f6=([Bi]+[Pb]-0.002)^{1/2} \times 10+([P]-0.001)^{1/2} \times 5+((\beta)-7)^{1/2} \times ([Si]-0.1)^{1/2} \times 1.2+(\gamma)^{1/2} \times 0.5$, Composition and Metallographic Structure Relational Expression $f7=([Bi]+[Pb]-0.002)^{1/2} \times ((\beta)-7)^{1/2} \times ([Si]-0.1)^{1/2}$ A free-cutting copper alloy according to the first embodiment of the present invention includes: higher than 58.0 mass % and lower than 65.0 mass % Cu; higher than 0.30 mass % and lower than 1.30 mass % Si; higher than 0.001 mass % and lower than or equal to 0.20 mass % Pb; higher than 0.020 mass % and lower than or equal to 0.10 mass % Bi, higher than 0.001 mass % and lower than 0.20 mass % P; with the balance being Zn and inevitable impurities, wherein the total content of Fe, Mn, Co, and Cr is lower than 0.45 mass %, the total content of Sn and Al is lower than 0.45 mass %, the metallographic structure contains α phase and β phase, the composition relational expression f1 is in a range of $56.5 \leq f1 \leq 59.5$, the composition relational expression f2 is in a range of $0.025 \leq f2 < 0.25$, the metallographic structure relational expression f3 is in a range of $20 \leq f3 < 85$, the metallographic structure relational expression f4 is in a range of $15 < f4 \leq 80$, the metallographic structure relational expression f5 is in a range of $0 \leq f5 < 5$, the composition and metallographic structure relational expression f6 is in a range of $8.0 \leq f6 \leq 17.0$, the composition and metallographic structure relational expression f7 is in a range of $0.9 \leq f7 \leq 4.0$, and a particle containing Bi is present in α phase.

A free-cutting copper alloy according to the second embodiment of the present invention includes: higher than or equal to 59.5 mass % and lower than or equal to 64.5 mass % Cu; higher than 0.50 mass % and lower than or equal to 1.20 mass % Si; higher than or equal to 0.003 mass % and lower than 0.10 mass % Pb; higher than or equal to 0.030 mass % and lower than 0.10 mass % Bi; and higher than or equal to 0.010 mass % and lower than or equal to 0.14 mass % P; with the balance being Zn and inevitable impurities, wherein among the inevitable impurities, the total content of Fe, Mn, Co, and Cr is 0.35 mass % or lower and the total content of Sn and Al is 0.35 mass % or lower, the metallographic structure includes α phase and β phase, the composition relational expression f1 is in a range of $56.8 \leq f1 \leq 59.0$, the composition relational expression f2 is in a range of $0.04 \leq f2 \leq 0.19$, the metallographic structure relational expression f3 is in a range of $30 \leq f3 \leq 75$, the metallographic structure relational expression f4 is in a range of $25 \leq f4 \leq 70$, the metallographic structure relational expression 5 is in a range of $0 \leq f5 < 3$, the composition and metallographic structure relational expression f6 is in a range of $10.0 \leq f6 \leq 14.0$, the composition and metallographic structure relational expression f7 is in a range of $1.2 \leq f7 \leq 3.0$, a particle including Bi is present in α phase, and a P-containing compound is present in β phase.

Here, in free-cutting copper alloys according to the first and second embodiments of the present invention, it is preferable that the Si content in β phase is 0.4 mass % or higher and 1.7 mass % or lower.

Further, it is preferable that the electrical conductivity is 14% IACS or higher, the tensile strength represented by S (N/mm$^2$) is at least 440 N/mm$^2$ or higher, and characteristic relational expression $f8=S \times (100+E)/100$ indicating the balance between tensile strength and elongation (E %) is 580 or higher.

The reasons why the component composition, the composition relational expressions f1 and f2, the metallographic structure relational expressions f3, f4, and f5, the composition and metallographic structure relational expressions f6 and f7, the characteristic relational expression f8, and the like are defined as described above are explained below.

<Component Composition>

(Cu)

Cu is a main element of an alloy according to an embodiment of the present invention. In order to achieve the object of the present invention, it is necessary to contain Cu in an amount exceeding 58.0 mass % at least. When the Cu content is 58.0 mass % or lower, the proportion of β phase exceeds 80% although depending on the contents of Si, Zn, P, Pb, and Bi and the production process, and as a result, ductility of the material is poor. Accordingly, the lower limit of the Cu content is higher than 58.0 mass %, preferably 58.5 mass % or higher, more preferably 59.5 mass % or higher, and still more preferably 60.0 mass % or higher.

On the other hand, when the Cu content is 65.0 mass % or higher, the proportion of β phase decreases and the proportion of γ phase increases although depending on the contents of Si, Zn, P, Pb and Bi and the production process. In some cases, μ phase also appears. Accordingly, the Cu content is lower than 65.0 mass %, preferably 64.5 mass % or lower, and more preferably 64.0 mass % or lower.

(Si)

Si is a main element of a free-cutting copper alloy according to an embodiment of the present invention. Si contributes to formation of metallic phases such as κ phase, γ phase, μ phase, β phase, and ζ phase. Si improves the machinability, strength, castability, hot workability, wear resistance, and stress corrosion cracking resistance, of an alloy according to an embodiment of the present invention.

In addition, due to inclusion of Si, machinability, in particular, machinability of β phase, improves and α phase and β phase are strengthened by solid-solubilization, which strengthen alloys. Inclusion of Si also affects ductility and toughness of alloy. When Si is included, the electrical conductivity of α phase decreases, but the electrical conductivity of alloy is improved by formation of β phase.

In order to obtain excellent machinability as an alloy, obtain high strength, and improve castability and hot workability, it is necessary to include higher than 0.30 mass % Si. The Si content is preferably higher than 0.40 mass %, more preferably higher than 0.50 mass %, and still more preferably 0.70 mass % or higher. That is, the higher the Si concentration in the alloy, the higher the Si concentration in β phase, and the more machinability, strength, and hot workability improve.

Regarding hot workability, by including Si, the hot deformability of α phase and β phase improves from a relatively low temperature of about 500° C., and hot deformation resistance lowers. As a result, the hot deformability of the alloy improves, and hot deformation resistance lowers.

Incidentally, when a Cu—Zn alloy formed of α phase and β phase includes Si in an amount higher than 0.30 mass %, preferably higher than 0.50 mass %, even if the amount of Bi is small, Bi particles come to be present in α phase. Further, when a large amount of Si is included, the likelihood that Bi particles are present in α phase increases. When the temperature of the copper alloy including Bi during cooling as part of a casting process, during hot working, or after hot working is about 270° C. or higher, Bi in the alloy is present in a liquid state (molten state). When a Cu—Zn—Bi alloy formed of α phase and β phase does not include Si, Bi particles are mainly present at α phase boundary between α phase and β phase or in β phase. Since Bi particles are present in α phase due to an action of Si, the machinability of α phase can be improved.

On the other hand, when the Si content is excessive, the amount γ phase is excessive. In some cases, κ phase or μ phase appears. γ phase improves the machinability of alloy but deteriorates alloy's ductility because its ductility and toughness are lower than those of β phase. When the amount of γ phase is excessive, the alloy's machinability is worsened instead of improved, and the thrust in drilling deteriorates. An increase in the amount of Si (increase of Si content) deteriorates the electrical conductivity of the alloy. In the embodiments, since excellent machinability, high strength, excellent ductility, and electrical components and the like are targeted, obtaining conductivity is also aimed at. Accordingly, the upper limit of the Si content is lower than 1.30 mass %, preferably 1.20 mass % or lower, and more preferably 1.10 mass % or lower. Although depending on the production process, the Cu concentration, and inevitable impurities, when the Si content is lower than about 1.0 mass %, γ phase is no longer present. However, by increasing the proportion of β phase and including small amounts of Bi and Pb, excellent machinability can be secured, and the balance between strength and ductility becomes excellent.

β phase formed by including Cu, Zn, and Si in the above-described content ranges has excellent machinability. Since Si is preferentially distributed in β phase, Si exhibits its effect even if its content is small. In addition, if Si is added to a Cu—Zn alloy, particles including Bi (hereinafter, referred to as "Bi particles") are likely to be present in α phase, and the machinability of α phase having poor machinability can be improved by the particles. Examples of composition of β phase having excellent machinability include a composition including about 59 mass % Cu, about 1 mass % Si, and about 40 mass % Zn. Examples of composition of α phase include a composition including about 68 mass % Cu, about 0.6 mass % Si, and about 31 mass % Zn. Machinability of α phase of an alloy having a composition that falls within a composition range of an embodiment of the present invention is also improved by including Si, but the degree of the improvement is far less than that of β phase. By causing Bi particles having excellent machinability to be present in α phase, the machinability of α phase can be improved.

When a Cu—Zn binary alloy as a base alloy includes third and fourth elements and the contents of the third and fourth elements increase or decrease, the properties and characteristics of β phase change. As described in Patent Documents 2 to 5, β phase present in an alloy including about higher than or equal to 69 mass % Cu, about higher than or equal to 2 mass % Si, and Zn as the balance does not have the same properties or characteristics as β phase formed in an alloy, for example, an alloy including about 62 mass % Cu, about 0.8 mass % Si, and Zn as the balance. Further, when a large amount of inevitable impurities are included, the characteristics of β phase also change. In some cases, properties including machinability deteriorate. In the case of γ phase also, the characteristics of γ phase to be formed change when the amounts of main elements or the blending ratio between them are changed. Also, when a large amount of inevitable impurities are included, the characteristics of γ phase change. Further, even when the composition is the same, the kinds of phases to be present, their amounts, the distribution of each element in each phase change depending on the production conditions such as temperature.

(Zn)

Zn is a main element of the free-cutting copper alloys according to an embodiment of the present invention together with Cu and Si, and is an element necessary to enhance machinability, strength, high temperature properties, and castability. Zn is described as the balance in the composition, but to be specific, its content is lower than about 41.5 mass % and preferably lower than about 40.5 mass % and higher than about 32.5 mass % (preferably higher than 33.5 mass %).

(Pb)

In an embodiment of the present invention, machinability is improved by β phase including Si. By containing small amounts of Pb and Bi in addition to that, excellent machinability is achieved. In a composition according to an embodiment of the present invention, about 0.001 mass % Pb is solid solubilized in the matrix, and Pb in excess of such amount is present in the form of particles of about 0.1 to about 3 μm in diameter. When Pb and Bi are both added, they are present as particles mainly comprising Pb and Bi (Bi-containing particles). Pb is effective to improve machinability even when its content is very small. If Bi is contained together with Pb, Pb exhibits its effectiveness when contained in the amount exceeding 0.001 mass %. Pb content is preferably 0.003 mass % or more.

Apart from its machinability improvement effect, Pb is harmful to human body and affects alloys' ductility and cold workability, too. In embodiments of the present invention, it is naturally necessary to restrict Pb content since Bi, an element whose influence on the environment and human body is yet to be known, is contained in a small amount. Therefore, the amount of Pb is 0.20 mass % or less, preferably less than 0.10 mass %, and more preferably less than 0.08 mass %. Pb and Bi are sometimes present alone apart from each other, but in many cases, they coexist, and their machinability improvement effects are not impaired by the coexistence.

(Bi)

About 0.001 mass % Bi is solid-solubilized in the matrix, and the portion of Bi that exceeds 0.001 mass % is present in the form of particles having a diameter of about 0.1 to about 3 μm. In embodiments of the present invention, the objective is to obtain excellent machinability with the content of Pb, a substance that is harmful to human body, limited to 0.20 mass % or less. In the embodiments, due to the action of Si, Bi particles are preferentially present in α phase, and the machinability of α phase is improved by the Bi particles. As β phase whose machinability is significantly improved by including Si and P is also present, the alloy can obtained superb machinability. It has been known that the function of improving machinability that Bi has is poorer than that of Pb. However, in the embodiments, it was ascertained that Bi exhibits the effect that is equivalent to or better than that of Pb.

In order to improve the machinability of α phase, it is necessary that Bi particles are present in α phase and the likelihood of the presence of Bi particles is increased. In order for an alloy to obtain high machinability, Bi needs to be contained in an amount at least higher than 0.020 mass %. The Bi content is preferably 0.030 mass % or higher. The influence of Bi on the environment or human body is unclear at present. In consideration of the influence on the environment or human body, the Bi content is 0.10 mass % or lower and preferably lower than 0.10 mass %, and the total content of Pb and Bi (the composition relational expression f2 described below) is lower than 0.25 mass %. By adjusting the contents of Cu, Zn, Si, and P, the amount of β phase, and the metallographic structure more appropriately, even when the amount of Bi is small or significantly limited, the alloy can obtain excellent machinability. Bi particles may be located outside of α phase, but even in such a case, Bi is still able to improve an alloy's machinability although its machinability improvement effect is weaker than that of Pb.

(P)

In a Cu—Zn—Si alloy including Si and mainly comprising α phase and β phase, P is preferentially distributed in β phase. Regarding P, the machinability of β phase including Si can be improved by solid-solubilization of P in β phase. Further, by containing P and adjusting the production process, P-containing compounds having an average diameter of 0.3 to 3 μm are formed. Due to the compounds, in the case of turning, the three force components—principal cutting force, feed force, and thrust force decrease. In the case of drilling, the torque decreases among others. The three force components during turning, the torque during drilling, and the chip shape correlate to each other. The smaller the three force components and the torque, the more broken chips get.

P-containing compounds are not formed during hot working. P is solid-solubilized in β phase during hot working. In the process of cooling after hot working, P-containing compounds precipitate mainly in β phase at a certain critical cooling rate or lower. P-containing compounds rarely precipitate in α phase. When observed with a metallographic microscope, precipitates including P appear to be small granular particles having an average particle size of about 0.3 to 3 μm. β phase including such precipitate can obtain even more excellent machinability. P-containing compound hardly affects the life of a cutting tool and does not substantially impair the ductility or toughness of an alloy. Compound including Fe, Mn, Cr or Co and Si or P contributes to improvement of strength and wear resistance of an alloy, but consumes Si and P in the alloy, causes the cutting resistance of the alloy to increase, deteriorates chip breakability, shortens the tool life, and impairs ductility of the alloy.

When P is added together with Si, P also exhibits an effect of facilitating the presence of Bi-containing particles in α phase, contributing to the improvement of α phase's machinability.

In order to exhibit the above-described effects, the lower limit of the P content is higher than 0.001 mass %, preferably 0.003 mass % or higher, more preferably 0.010 mass % or higher, and still more preferably 0.020 mass % or higher. If P is contained in an amount exceeding 0.010 mass %, P-containing compounds become visible with a 500× metallographic microscope.

When P is contained in an amount of 0.20 mass % or more, precipitates enlarge and its machinability improving effect saturates. In addition, Si concentration in β phase decreases causing deterioration in machinability, ductility, and toughness. For this reason, P content is less than 0.20 mass %, preferably 0.14 mass % or less, and more preferably 0.10 mass % or less. Even when P content is less than 0.05 mass %, P precipitates in β phase and a sufficient amount of P-containing compounds are formed.

Incidentally, the component ratio in the composition of a compound including, for instance, P or Si, gradually changes as the content of an element such as Mn, Fe, Cr, or Co that easily combines with Si or P increases. That is, P-containing compound having a significant effect of improving the machinability of β phase gradually changes into a compound having a less effect on machinability. Accordingly, at least the total content of Fe, Mn, Co, and Cr needs to be limited to less than 0.45 mass % and preferably 0.35 mass % or less.

(Inevitable Impurities, in Particular, Fe, Mn, Co, and Cr; Sn and Al)

Examples of the inevitable impurities in an embodiment of the present invention include Mn, Fe, Al, Ni, Mg, Se, Te, Sn, Co, Ca, Zr, Cr, Ti, In, W, Mo, B, Ag, and rare earth elements.

Conventionally, a free-cutting copper alloy, in particular, free-cutting brass including about higher or equal to 30 mass % Zn is not mainly formed of quality raw material such as electrolytic copper or electrolytic zinc but is mainly formed of recycled copper alloy. In preliminary steps (downstream step, working step) in this field of art, machining is performed on almost all the parts and components, during which a large amount of copper alloy accounting for 40 to 80% of the material is disposed of. Examples of such disposed copper alloy include chips, mill ends, burrs, runners, and products having production defects. These disposed copper alloys are the main raw material. If cutting chips, mill ends, and the like are not properly separated, Pb, Fe, Mn, Si, Se, Te, Sn, P, Sb, As, Bi, Ca, Al, Zr, Ni, and/or rare earth elements mix as part of a raw material from a leaded free-cutting brass, a free-cutting copper alloy not containing Pb but containing Bi or the like, a special brass alloy including Si, Mn, Fe, and Al, or other copper alloys. In addition, cutting chips include Fe, W, Co, Mo, and the like which originate from tools. Wasted materials include plated products, and thus Ni, Cr, and Sn mix in. In addition, Mg, Sn, Fe, Cr, Ti, Co, In, Ni, Se, and Te are mixed into pure copper-based scrap that is used instead of electrolytic copper. Brass-based scraps that are used instead of electrolytic copper or electrolytic zinc are often plated with Sn, resulting in contamination by a high concentration of Sn.

From a viewpoint of reuse of resources and costs, scraps including these elements are used as a raw material to the extent that there is no bad influence on the properties at least. In a leaded JIS free-cutting brass bar, C3604 (JIS H 3250), including about 3 mass % Pb as an essential element, Fe may be contained up to 0.5 mass % and Fe+Sn (the total content of Fe and Sn) may be contained up to 1.0 mass % as impurities. Also, in a leaded JIS standard brass casting (JIS H 5120), Pb is contained as an indispensable element in an amount of about 2 mass %, the upper limits of the remaining components are 0.8 mass % for Fe, 1.0 mass % or less for Sn, 0.5 mass % for Al, and 1.0 mass % or less for Ni. The total amount of Fe and Sn contained in C3604 which is available in the market is about 0.5 mass %. Fe or Sn may be contained in a free-cutting brass bar at a higher concentration.

Fe, Mn, Co, and Cr are solid-solubilized in α phase, β phase, and γ phase of a Cu—Zn alloy to a certain concentration. However, if Si is present then, Fe, Mn, Co, and Cr are likely to compound with Si. In some cases, Fe, Mn, Co, and Cr may combine with Si potentially resulting in consumption of Si, an element that is effective for machinability. Fe, Mn, Co, or Cr that is compounded with Si forms a Fe—Si compound, an Mn—Si compound, a Co—Si compound, or a Cr—Si compound in the metallographic structure. Since these intermetallic compounds are extremely hard, cutting resistance increases, and the tool life decreases. Therefore, the content of each of Fe, Mn, Co, and Cr is required to be limited and is preferably lower than 0.30 mass %, more preferably lower than 0.20 mass %, and still more preferably 0.15 mass % or lower. In particular, the total content of Fe, Mn, Co, and Cr is required to be limited to lower than 0.45 mass % and is preferably 0.35 mass % or lower, more preferably 0.25 mass % or lower, and still more preferably 0.20 mass % or lower.

On the other hand, Sn and Al mixed in from free-cutting brass, plated waste products, or the like promote formation of γ phase in an alloy according to an embodiment of the present invention, which is seemingly effective for machinability. However, Sn and Al change the inherent characteristics of γ phase comprising Cu, Zn, and Si. In addition, larger amounts of Sn and Al are distributed in β phase than in α phase and change characteristics of β phase. As a result, the alloy's ductility, toughness, or machinability may deteriorate. Therefore, it is necessary to limit the contents of Sn and Al, too. The Sn content is preferably lower than 0.40 mass %, more preferably lower than 0.30 mass %, and still more preferably 0.25 mass % or lower. The Al content is preferably lower than 0.20 mass %, more preferably lower than 0.15 mass %, and still more preferably 0.10 mass % or lower. In particular, from a viewpoint of influence on machinability and ductility, the total content of Sn and Al is required to be limited to lower than 0.45 mass %, preferably to 0.35 mass % or lower, more preferably to 0.30 mass % or lower, and still more preferably to 0.25 mass % or lower.

As other main inevitable impurity elements, empirically speaking, in many cases, Ni often mixes in from scraps of plated products and the like, but the influence on properties is less than that of Fe, Mn, Sn and the like. Even if a small amount of Fe or Sn mixes in, as long as the Ni content is lower than 0.3 mass %, the influence on the properties is limited. It is more preferable if Ni content is 0.2 mass % or less. It is not necessary to particularly limit the content of Ag because Ag is commonly considered as Cu and does not substantially affect various properties of an alloy. However, the Ag content is preferably lower than 0.1 mass %. Te and Se themselves have free-cutting ability, and contamination by a large amount of Te or Se may occur although it is rare. In consideration of influence on ductility or impact resistance, each content of Te and Se is preferably lower than 0.2 mass %, more preferably 0.05 mass % or lower, and still more preferably 0.02 mass % or lower. In addition, corrosion-resistant brass includes As and/or Sb in order to improve its corrosion resistance. In consideration of influence on ductility and impact resistance, each content of As and Sb is preferably lower than 0.05 mass % and preferably 0.02 mass % or lower.

The content of each of Mg, Ca, Zr, Ti, In, W, Mo, B, and rare earth elements as other elements is preferably lower than 0.05 mass %, more preferably lower than 0.03 mass %, and still more preferably lower than 0.02.

The content of the rare earth elements refers to the total content of one or more of the following elements: Sc, Y, La, Ce, Pr, Nd, Pm, Sm, Eu, Gd, Tb, Dy, Ho, Er, Tm, Tb, and Lu.

The total content of the inevitable impurities is preferably lower than 1.0 mass %, more preferably lower than 0.8 mass %, and still more preferably lower than 0.7 mass %.

(Composition Relational Expression f1)

The composition relational expression f1=[Cu]−4.7×[Si]+0.5×[Pb]+0.5×[Bi]−0.5×[P] is an expression indicating a relationship between the composition and the metallographic structure. Even when the amount of each of the elements is in the above-described defined range, unless this composition relational expression f1 is not satisfied, the properties targeted in embodiments of the present invention cannot be obtained. When the composition relational expression f1 is lower than 56.5, the proportion of β phase increases, and ductility deteriorates even if the production process is modified. Accordingly, the lower limit of the composition relational expression f1 is 56.5 or higher, preferably 56.8 or higher, and more preferably 57.0 or higher. As the composition becomes more preferable within the defined range of the composition relational expression f1, the proportion of α phase increases, excellent machinability can be maintained, and good ductility, cold workability, and stress corrosion cracking resistance can be obtained.

On the other hand, the upper limit of the composition relational expression f1 affects the proportion of β phase, the proportion of γ phase, and the range of temperature at which the alloy solidifies. When the composition relational expression f1 is higher than 59.5, the proportion of β phase decreases, and excellent machinability cannot be obtained. At the same time, the proportion of γ phase increases, ductility decreases, and strength also decreases. In some cases, μ phase precipitates. Then, the solidification temperature range exceeds 25° C. and defects peculiar to castings such as porous shrinkage cavity and recess are more likely to appear. Accordingly, the upper limit of the composition relational expression f1 is 59.5 or lower, preferably 59.0 or lower, more preferably 58.8 or lower, and still more preferably 58.4 or lower.

In addition, the composition relational expression f1 also deeply relates to hot workability performed at about 600° C. When the composition relational expression f1 is lower than 56.5, a problem occurs in hot deformability. When the composition relational expression f1 is higher than 59.5, hot deformation resistance increases, and hot working at 600° C. becomes difficult to perform.

A free-cutting copper alloy according to an embodiment of the present invention has machinability, a property that requires a kind of brittleness obtained by decreasing cutting resistance so that finely broken chips are generated, and ductility, a property that is completely opposite to machinability. By discussing not only the composition but also the composition relational expressions f1 and f2, the metallographic structure relational expressions f3 to f5, and the composition and metallographic structure relational expressions f6 and f7 in detail, an alloy more suitable for the purpose and use can be provided.

Sn, Al, Cr, Co, Fe, Mn, and inevitable impurities, that are separately defined, are not defined by the composition relational expression f1 because their influence on the composition relational expression f1 is small if the content is within the range that can be treated as inevitable impurities.

(Composition Relational Expression f2)

In embodiments of the present invention, it is desired to obtain excellent machinability by including small or limited amounts of Pb and Bi. In the embodiments, Bi mainly exhibits the effect of improving the machinability of α phase, and its machinability improvement effect is higher than or equal to that of Pb. In order to represent the effect of improving machinability in a concise manner, it is not sufficient to define Pb and Bi individually. Therefore, these elements are defined with a composition relational expression f2=[Pb]+[Bi].

In order to obtain excellent machinability, f2 is at least 0.025 or higher and preferably 0.03 or higher. When machining conditions are severe, for example, when machining is performed at a high speed or at a high feed rate, when the cutting depth is deep in turning, or when the diameter of a drillhole is large, f2 is more preferably 0.04 or higher and still more preferably 0.05 or higher. Regarding the upper limit of f2, the higher the value of f2, the better the machinability. In the embodiments, since the influence of Bi on the environment or human body is considered to be of the same level as that of Pb, it is necessary to limit the total content of Bi and Pb. In consideration of the influence on the environment and human body, f2 is preferably lower than 0.25 and more preferably 0.19 or lower. The effect of β phase of which machinability is significantly improved by containing Si as previously described is so tremendous that excellent machinability can be obtained even though the amounts of Bi and Pb contained are small.

(Comparison with Patent Documents)

Here, the results of comparison between the compositions of the Cu—Zn—Si alloys described in Patent Documents 1 to 14 and the compositions of alloys according to embodiments of the present invention are shown in Tables 1 and 2.

The embodiments and the alloys disclosed by Patent Documents 1 and 12 are different from each other in the Sn content, and a large amount of Bi is required in effect.

The embodiments and the alloys disclosed by Patent Documents 2 to 9 are different from each other in the contents of Cu and Si, the main elements of the alloys. In Patent Documents 2 to 11, a large amount of Cu is required.

In Patent Documents 2 to 4 and 7 to 9, β phase is depicted as a metallic phase that is not preferable in a metallographic structure because it impairs machinability. It is also disclosed that when β phase is present, it is preferable that β phase is changed into γ phase having excellent machinability through a heat treatment.

In Patent Documents 4 and 7 to 9, in which an allowable amount of β phase is described, the maximum area ratio of β phase is 5%.

In Patent Document 10, the content of each of Sn and Al is at least 0.1 mass % or higher in order to improve dezincification corrosion resistance, and large amounts of Pb and Bi need to be included in order to obtain excellent machinability.

Patent Document 11 describes a copper alloy casting having corrosion-resistance which requires greater than or equal to 65 mass % Cu and has excellent mechanical characteristics and castability achieved by including Si and a small amount of Al, Sb, Sn, Mn, Ni, B, or the like.

Patent Document 14 discloses that Bi is not included, Sn is included in an amount of 0.20 mass % or higher, the material is held at a high temperature of 700° C. to 850° C., and subsequently hot extrusion is performed.

Further, none of these Patent Documents disclose or imply any of the essential requirements of the embodiments that β phase including Si has excellent machinability, β phase is required in an amount exceeding at least 15%, P is effective to improve the machinability of β phase, fine P and Si as well as Zn compounds are present in β phase, and particles containing Bi are present in α phase.

TABLE 1

|  | Cu | Si | P | Pb | Bi | Sn | Al | Others |
|---|---|---|---|---|---|---|---|---|
| First Embodiment | 58.0-65.0 | 0.30-1.30 | 0.001-0.20 | 0.001-0.20 | 0.020-0.10 | Sn + Al <0.45, | | Fe + Mn + Cr + Co <0.45 |
| Second Embodiment | 59.5-64.5 | 0.50-1.20 | 0.010-0.14 | 0.003-0.10 | 0.030-0.10 | Sn + Al ≤0.35, | | Fe + Mn + Cr + Co ≤0.35 |
| Patent Document 1 | 59.5-66.0 | — | — | — | 0.5-2.0 | 0.7-2.5 | — | — |
| Patent Document 2 | 69-79 | 2.0-4.0 | 0.02-0.25 | — | 0.02-0.4 | 0.3-3.5 | 0.1-1.5 | — |
| Patent Document 3 | 69-79 | 2.0-4.0 | 0.02-0.25 | 0.02-0.4 | 0.02-0.4 | 0.3-3.5 | 0.1-1.5 | — |
| Patent Document 4 | 71.5-78.5 | 2.0-4.5 | 0.01-0.2 | 0.005-0.02 | 0.01-0.2 | 0.1-1.2 | 0.1-2.0 | — |
| Patent Document 5 | 74.5-76.5 | 3.0-3.5 | 0.04-0.10 | 0.01-0.25 | 0.01-0.4 | 0.05-0.2 | 0.05-0.2 | Fe: 0.11-0.2 |
| Patent Document 6 | 70-83 | 1-5 | 0.1 or less | — | — | 0.01-2 | — | Fe, Co: 0.01-0.3 Ni: 0.01-0.3 n: 0.01-0.3 |
| Patent Document 7 | 73.0-79.5 | 2.5-4.0 | 0.015-0.2 | 0.003-0.25 | — | 0.03-1.0 | 0.03-1.5 | — |
| Patent Document 8 | 73.5-79.5 | 2.5-3.7 | 0.015-0.2 | 0.003-0.25 | 0.003-0.30 | 0.03-1.0 | 0.03-1.5 | — |
| Patent Document 9 | 75.4-78.0 | 3.05-3.55 | 0.05-0.13 | 0.005-0.070 | 0.005-0.10 | 0.05 or less | 0.05 or less | — |
| Patent Document 10 | 55-75 | 0.01-1.5 | less than 0.15 | 0.01-4.0 | 0.01-4.0 | 0.1 or more | 0.1 or more | — |
| Patent Document 11 | 65-75 | 0.5-2.0 | — | — | — | 0.01-0.55 | 0.1-1.0 | — |
| Patent Document 12 | 61.0-63.0 | 0.05-0.30 | 0.04-0.15 | 0.01 or less | 0.5-2.5 | 1.5-3.0 | — | Sb: 0.02-0.10 |
| Patent Document 13 | — | 0.25-3.0 | — | — | — | — | — | — |
| Patent Document 14 | 60.0-66.0 | 0.01-0.50 | 0.15 or less | — | 0.05-0.50 | 0.20-0.90 | — | Fe: 0.60 or less |

TABLE 2

|  | Metallographic Structure |
|---|---|
| First Embodiment | $20 \leq \alpha < 85, 15 < \beta \leq 80, 0 \leq \gamma < 5$ |
| Second Embodiment | $30 \leq \alpha < 75, 25 < \beta \leq 70, 0 \leq \gamma < 3$ |
| Patent Document 1 | $\alpha + \gamma$ structure or $\alpha + \beta + \gamma$ structure |
| Patent Document 2 | γ phase, in some cases, κ phase is present. β phase is turned into γ phase by heat treatment. |
| Patent Document 3 | γ phase, in some cases, κ phase is present. β phase is turned into γ phase by heat treatment. |
| Patent Document 4 | $18\text{-}500 \text{ Pb} \leq \kappa + \gamma + 0.3\mu - \beta \leq 56 + 500 \text{ Pb}, 0 \leq \beta \leq 5$ |
| Patent Document 5 | — |
| Patent Document 6 | — |
| Patent Document 7 | $30 \leq \alpha \leq 84, 15 \leq \kappa \leq 68, \beta \leq 3$, etc. |
| Patent Document 8 | $60 \leq \alpha \leq 84, 15 \leq \kappa \leq 40, \beta \leq 2$, etc. |
| Patent Document 9 | $29 \leq \kappa \leq 60, \beta = 0$, etc. κ phase is present in α phase. |
| Patent Document 10 | — |
| Patent Document 11 | — |
| Patent Document 12 | — |
| Patent Document 13 | — |
| Patent Document 14 | — |

<Metallographic Structure>

In a Cu—Zn—Si alloy, 10 or more kinds of phases are present, a complicated phase change occurs, and desired properties cannot be necessarily obtained simply by satisfying the composition ranges and relational expressions of the elements. Eventually, by specifying and determining the kinds of metallic phases present in the metallographic structure and the area ratio ranges thereof, desired properties can be obtained. Accordingly, the metallographic structure relational expressions and composition and metallographic structure relational expressions are defined as follows.

$$20 \leq f3 = (\alpha) < 85$$

$$15 < f4 = (\beta) \leq 80$$

$$0 \leq f5 = (\gamma) < 5$$

$$8.0 \leq f6 = ([Bi]+[Pb]-0.002)^{1/2} \times 10 + ([P]-0.001)^{1/2} \times 5 + ((\beta)-7)^{1/2} \times ([Si]-0.1)^{1/2} \times 1.2 + (\gamma)^{1/2} \times 0.5 \leq 17.0$$

$$0.9 \leq f7 = ([Bi]+[Pb]-0.002)^{1/2} \times ((\beta)-7)^{1/2} \times ([Si]-0.1)^{1/2} \leq 4.0$$

(γ Phase, Metallographic Structure Relational Expression f5)

As described in Patent Documents 2 to 9, γ phase is a phase that contributes most to machinability in a Cu—Zn—Si alloy in which the Cu concentration is about 69 mass % to 80 mass % and the Si concentration is about 2 mass % to 4 mass %. In embodiments of the present invention also, γ phase was confirmed to be contributing to machinability. However, it is necessary to drastically reduce γ phase in order to obtain a good balance between ductility and strength. Specifically, when the proportion of γ phase is 5% or higher, excellent ductility or toughness cannot be obtained. Even when the amount of γ phase is small, γ phase exhibits an effect of reducing the torque and improving chip breakability in drilling. However, when a large amount of γ phase is present, thrust resistance value and cutting resistance value in turning increase. Providing that β phase is present at a proportion of higher than 15% (in terms of area ratio; hereinafter, the unit for the amount of phase shall be area ratio), the effect of γ phase on machinability corresponds to the value obtained by raising the amount of γ phase to the power of ½. When a small amount of γ phase is included, γ phase has a large effect on improving machinability. However, when the amount of γ phase is increased, the effect of improving machinability decreases. Also, an increase of γ phase leads to a decrease in β phase. In consideration of ductility and cutting resistance in drilling and turning, the proportion of γ phase needs to be lower than 5%. Further, the area ratio of γ phase is preferably less than 3% and more preferably less than 1%. Even when γ phase is not present, that is, (γ)=0, excellent machinability can be obtained by causing β phase including Si to be present at a proportion described below and also causing the alloy to contain Pb and Bi.

(β phase, Metallographic Structure Relational Expression f4)

In order to obtain excellent machinability with a limited amount of γ phase and without κ phase or μ phase, it is important to optimize the Si content, the blending ratio between Cu and Zn, the amount of β phase, and the amount of Si solid-solubilized in β phase. Incidentally, it should be noted that β phase includes β' phase.

β phase of an alloy whose composition falls within a composition range according to an embodiment of the present invention has lower ductility than α phase, but has much higher ductility than γ phase, a phase whose ductility and toughness are poor. Compared with the ductility of κ phase or μ phase of a Cu—Zn—Si alloy, it has better ductility, too. Accordingly, from a viewpoint of ductility, a relatively large amount of β phase can be included. In addition, β phase can obtain excellent conductivity although it includes high concentrations of Zn and Si. The amounts of β phase and γ phase are significantly affected not only by the composition but also by the process.

In a Cu—Zn—Si—P—Pb—Bi alloy, a free-cutting copper alloy according to an embodiment of the present invention, in order to obtain excellent machinability while minimizing the contents of Pb and Bi, it is necessary that the area ratio of β phase is at least higher than 15%, and the area ratio of β phase is preferably 25% or higher, more preferably 30% or higher, and still more preferably 40% or higher. Even when the amount of γ phase is 0%, if the area ratio of β phase is higher than about 15%, excellent machinability can be obtained. Even when the proportion of β phase is about 50% and the proportion of α phase having poor machinability is about 50%, machinability can be maintained at a high level even compared to an alloy where the proportion of β phase including Si is 100%, and excellent ductility and strength can be obtained. For example, when β phase including about 1 mass % Si and a P-containing compound and soft α phase having excellent ductility are present together, it is presumed that soft α phase functions as some kind of cushioning material or a phase boundary between α phase and hard β phase functions as an origin of chip breakage. Even when the amount of β phase is about 50%, excellent machinability, that is, low cutting resistance is maintained, and chip breakability is improved in some cases.

Regarding mechanical characteristics, the strength of β phase is maintained by an increase in ductility and crystal grains that have become fine due to precipitation of α phase in a β single-phase state. The strength of β phase relates to the amount of Si solid-solubilized in β phase, and when about higher than or equal to 0.4 mass % Si is solid-solubilized in β phase, a high strength can be obtained. With respect to ductility, even if the amount of β phase is about 50% or higher than about 50%, excellent ductility of α phase takes precedence and is maintained due to the action of α phase as a cushioning material. Yet, as the amount of β phase increases, ductility gradually deteriorates. In order to obtain excellent ductility and a good balance between strength and ductility, the proportion of β phase is required to be 80% or lower and preferably 70% or lower. When ductility and cold workability are important, the proportion of β phase is preferably 60% or lower. The appropriate proportion of β phase slightly varies depending on the intended purpose of use and application.

Incidentally, β phase including about 1 mass % Si exhibits excellent hot deformability and low hot deformation resistance from a minimum level of hot working temperature of 500° C., and the alloy having such β phase exhibits excellent hot deformability and low hot deformation resistance.

(Si Concentration and Machinability of β Phase)

In a composition range of an embodiment of the present invention, the more the Si content solid-solubilized in β phase increases, the more the machinability improves, and the more the amount of β phase increases, the more the machinability improves. When the Si content solid-solubilized in β phase is about 0.15 mass %, the effect starts to be exhibited. When the Si content is about 0.4 mass % or higher, the effect on machinability is clear. When the Si content is about 0.6 mass % or higher and further about 1.0 mass % or higher, the effect on machinability is clearer. The Si content solid-solubilized in β phase depends on the production process and the amount of β phase. For example, when the Si concentration in the alloy is 0.8 mass %, the Si concentration in β phase is 0.9 mass % to 1.2 mass %. On the other hand, when the Si content solid-solubilized in β phase exceeds 1.7 mass %, the effect on machinability is saturated, and the ductility of β phase deteriorates, causing deterioration in the ductility of the alloy. Therefore, the Si content solid-solubilized in β phase is preferably 1.7 mass % or lower.

Next, although depending on the amount of Si, β phase including Si starts to exhibit the effect on machinability when its content is about 5% to 8%. As the amount of β phase increases, the machinability of the alloy rapidly improves. When the amount of β phase exceeds 15%, it exhibits a large effect on the machinability of the alloy, and as the amount of β phase is increased to 25%, 35%, and 40%, the machinability further improves.

On the other hand, as the amount of Si solid-solubilized in β phase and the amount of β phase increase, the effect is gradually saturated. As a result of diligent study on the relationship between the Si concentration in the alloy, the amount of β phase, and the machinability of the alloy, it was revealed that, when Si concentration (mass %) is represented by [Si] and the amount of β phase (%) is represented by (β) for facility and convenience, the machinability of the alloy is well expressed by $(((β)-7)^{1/2} \times ([Si]-0.1)^{1/2})$, a value obtained by multiplying $((β)-7)^{1/2}$ by $([Si]-0.1)^{1/2}$.

The amount of β phase from which β phase begins to exhibits its effect on the machinability of the alloy is about 7%. The term $((β)-7)^{1/2}$ is a value obtained by subtracting 7% from the area ratio (β) of β phase, ((β)−7), raised to the power of ½.

The Si concentration from which Si begins to exhibit its effect on the machinability of the alloy is about 0.1 mass %. The term $([Si]-0.1)^{1/2}$ is a value obtained by subtracting 0.1 mass % from the Si concentration [Si], ([Si]−0.1), raised to the power of ½.

That is, even when the amounts of β phases are the same, β phase having a higher Si concentration has higher machinability. When the Si concentrations are the same, the more the amount of β phase, the better the machinability. Providing that the Si concentration and the amount of β phase are within the ranges defined by an embodiment of the present invention, its machinability improvement effect can be represented by $((β)-7)^{1/2} \times ([Si]-0.1)^{1/2}$.

(Composition and Metallographic Structure Relational Expressions f6 and f7)

The composition and metallographic structure relational expressions f6 and f7 are expressions involving composition and metallographic structure for obtaining generally excellent machinability and mechanical characteristics, in addition to the composition relational expressions f1 and f2 and the metallographic structure relational expressions f3 to f5. f6 is an addition expression for obtaining machinability, and f7 is a relational expression representing the interaction and synergistic effect of machinability.

In a Cu—Zn—Si—P—Pb—Bi alloy, the machinability is affected by the total content of Pb and Bi (f2), the amounts of β phase and Si, the amount of P, the presence of P-containing compound, and the amount of γ phase, and their effects are added up. In consideration of the amounts of Pb and Bi and their influences on machinability, the effect of Pb and Bi on machinability can be represented by $([Bi]+[Pb]-0.002)^{1/2}$.

The total content of Pb and Bi from which they begin to exhibit their effect on the machinability is 0.002 mass %. $([Bi]+[Pb]-0.002)^{1/2}$ is a value obtained by subtracting 0.002 mass % from the total content of Pb and Bi, ([Bi]+[Pb]−0.002), raised to the power of ½.

As described above, the amounts of β phase and Si can be represented by $((β)-7)^{1/2} \times ([Si]-0.1)^{1/2}$. Regarding the amount of γ phase, the effect on machinability can be obtained by raising the amount (%) of γ phase to the power of ½. In consideration of the presence and amount of P-containing compound, and the amount of P solid-solubilized in β phase, the effect of P on machinability can be represented by $([P]-0.001)^{1/2}$.

The amount of P from which its effect starts to be exhibited is 0.001 mass %. $([P]-0.001)^{1/2}$ is a value obtained by subtracting 0.001 mass % from the P content [P], ([P]−0.001), raised to the power of ½.

f6 is an addition expression representing an effect on machinability obtained by multiplying the elements of the respective effects by the coefficients derived from the results of a series of diligent studies.

$$f6=([Bi]+[Pb]-0.002)^{1/2} \times 10+([P]-0.001)^{1/2} \times 5+((β)-7)^{1/2} \times ([Si]-0.1)^{1/2} \times 1.2+(γ)^{1/2} \times 0.5$$

In order to obtain excellent machinability and high strength, f6 is required to be at least 8.0 or higher, preferably 8.5 or higher, and more preferably 9.2 or higher. In particular, when machining conditions are severe, f6 is preferably 10.0 or higher and more preferably 11.0 or higher. On the other hand, the upper limit of f6 is 17.0 or lower and preferably 15.0 or lower in view of the influence on the environment and human body as well as the ductility and the cold workability of the alloy. From a perspective of reducing the value of the term $([Bi]+[Pb])^{1/2}$, the upper limit of f6 is more preferably 14.0 or lower and still more preferably 13.0 or lower.

On the other hand, the interaction and synergistic effect regarding machinability can be represented by the product of the total content of Pb and Bi (f2) and the amounts of β phase and Si. In consideration of the total content of Pb and Bi from which an effect starts to appear, the amount of β phase from which an effect starts to appear, and the Si content from which an effect starts to appear, described above, they can be represented by the following relational expression:

$$f7=([Bi]+[Pb]-0.002)^{1/2} \times ((β)-7)^{1/2} \times ([Si]-0.1)^{1/2}$$

f7 is the product of the term of Pb and Bi, the term of β phase, and the term of Si. Therefore, if the value of one of the terms is excessively small, f7 may not be satisfied. In order to obtain excellent machinability, f7 is required to be 0.9 or higher and preferably 1.0 or higher. In particular, under severe machining conditions, f7 is preferably 1.2 or higher and more preferably 1.4 or higher. When f7 exceeds 4.0, the ductility and the cold workability of the alloy deteriorate. Therefore, f7 is 4.0 or lower, preferably 3.0 or lower, and more preferably 2.5 or lower for the purpose of reducing the term of Pb+Bi.

f6 is 8.0 or higher and 17.0 or lower, preferably 10.0 or higher and 14.0 or lower, and most preferably 11.0 or higher and 13.0 or lower. And also, f7 is 0.9 or higher and 4.0 or lower, preferably 1.2 or higher and 3.0 or lower, and more preferably 1.4 or higher and 2.5 or lower. By controlling the composition and the metallographic structure in narrow ranges as described above, an alloy having excellent machinability, high strength, excellent ductility, and cold workability with reduced amounts of Pb and Bi is completed. Regarding the machinability, the concentration of Si contained in β phase, the amount of β phase, the amount of P solid-solubilized in β phase, the amount of P-containing compound present in β phase, the presence and the amount of Bi-containing particles in α phase, and the amounts of Bi and Pb present in the form of fine particles improve the machinability of the alloy by their individual actions. When all the requirements are satisfied, a large effect of improving machinability is exhibited due to their interaction and a synergistic effect, and the machinability of the alloy is significantly improved by including very small amounts of Pb, Bi, and P.

Incidentally, in the metallographic structure relational expressions f3 to f5 and the composition and metallographic structure relational expressions f6 and f7, α phase, β phase, γ phase, δ phase, ε phase, ζ phase, η phase, κ phase, μ phase, and χ phase are the subject metallic phases, and intermetallic compounds excluding P-containing compounds, Pb particles, Bi particles, oxides, non-metallic inclusions, non-melted materials, and the like are not the subjects, that is, they are excluded from the subjects of area ratio calculation. P-containing compounds are tiny with the average size of about 0.3 to 3.0 μm and mostly present in β phase or at a boundary between α phase and β phase. Therefore, it is assumed that β phase includes the P-containing compounds present in β phase or at a boundary between α phase and β phase. Should any P-containing compounds be present in α phase although it is rare, it is assumed that such compounds are included in α phase. On the other hand, Intermetallic compounds that are formed by Si, P, and/or inevitably mixed-in elements (for example, Fe, Mn, Co, and Cr) are outside the scope of the calculation of the area ratios of metallic phases. In embodiments of the present invention, precipitates and metallic phases having a size that can be observed with a 500-fold metallographic microscope or that can be distinguished and recognized with a metallographic microscope having a magnification power of about 1000× are the subjects of the area ratio calculation. Accordingly, the minimum size of a precipitate or metallic phase that can be observed is about 0.5 μm. For example, γ phase having a size of 0.1 to 0.4 μm that is less than about 0.5 μm can be present in β phase. However, since such γ phase cannot be recognized with the metallographic microscope, it is regarded as β phase.

(α Phase, Metallographic Structure Relational Expression f3)

α phase is a main phase forming the matrix together with β phase or γ phase. α phase including Si improves machinability better than that without Si but only slightly. However, when the Si content is in a certain predetermined range, ductility is high. When β phase accounts for 100%, there is a problem in the ductility of the alloy. Therefore, an appropriate amount of α phase is required. It is considered that even if a β single-phase alloy comes to include a relatively large amount of α phase, for example, about 50% in terms of area ratio, α phase itself functions as a cushioning material such that boundaries between α phase and hard β phase become stress concentration source during machining. As a result, chips are broken, excellent machinability that a β single-phase alloy has is maintained, and machinability is improved in some cases.

As a result of a series of diligent studies, it was found that from a viewpoint of ductility and cold workability of the alloy, the amount of α phase is required to be 20% or higher and preferably 30% or higher. In the applications that embodiments of the present invention aim at, cold swaging may be performed after machining, and in order to prevent cracking during swaging, the area ratio of α phase is preferably 40% or higher. On the other hand, in order to obtain excellent machinability, the upper limit of the area ratio of α phase is at least lower than 85%, preferably 75% or lower, and more preferably 65% or lower. When the amount of α phase is large, the amount of β phase having improved machinability is small and Bi that improves the machinability of α phase, that is, Bi particle present in α phase is required in a large amount.

(Machinability, Mechanical Characteristics, Shape of a Phase, and Distribution of β Phase)

Regarding the shape and distribution of α phase and the distribution of β phase that affect the machinability and/or the mechanical characteristics of the alloy, when the shape of α phase crystal grains is acicular (an elliptical shape in which the longer side/shorter side ratio of a crystal grain is higher than 4), the dispersion of α phase deteriorates, and acicular α phase having a large longer side hinders machining. It is presumed that, although depending on the amount of α phase, when the shape of α phase is granular and the average size of α phase crystal grains is as small as about 30 μm or less, chip breakability is better than that of a β single-phase alloy, which is presumed to be because β phase is divided by α phase becoming an origin of chip breakage during machining. Accordingly, in a preferable embodiment of the present invention, when the proportion of granular crystal grains of α phase whose longer side/shorter side ratio is 4 or less is 50% or higher and preferably 75% or higher in all the α phase crystal grains, machinability is improved. To be exact, the proportion of granular crystal grains of α phase refers to the proportion calculated by dividing the number of granular crystal grains of α phase, in one visual field, whose longer side/shorter side ratio is 4 or lower, by the total number of α phase crystal grains in the same visual field, which can be expressed with: (the number of granular crystal grains of α phase whose longer side/shorter side ratio is 4 or lower/the total number of α phase crystal grains)× 100. When the proportion of acicular crystal grains of α phase having a large longer side exceeds 50%, ductility is substantially maintained, but the strength of the alloy decreases. Accordingly, when the proportion of the granular α-phase crystal grains increases, the strength increases, and the balance between strength and ductility improves. Whether or not the proportion of granular crystal grains of α phase whose longer side/shorter side ratio is 4 or lower exceeds 50% or 75% is affected by not only the composition but also the production process. When the hot working temperature is low, the proportion of granular crystal grains of α phase whose longer side/shorter side ratio is 4 or lower is high.

Incidentally, in embodiments of the present invention, longer side and shorter side of a crystal grain are measured by observing the crystal grain at a magnification of, for example, 500-fold and analyzing their images. Specifically, assuming that a crystal grain has an elliptical shape, the longer side (major axis) refers to the longest line among the lines connecting any two points on the contour of the crystal grain, and the shorter side (minor axis) refers to the longest line among the lines drawn perpendicular to the longer side and severed by a grain boundary (the contour of the crystal grain).

The average size of α phase crystal grains is measured using the following method. The average grain size is obtained according to JIS H 0501: Methods for estimating average grain size of wrought copper and copper alloys. The value obtained by multiplying the area ratio of α phase by the average value of grain size is the average crystal grain size.

Size of a compound particle refers to the length of the longest line among the lines connecting any two points on the contour of a particle, and is measured using an image analysis method. The average size of compound particles is the average of the number of particles measured.

(μ Phase, κ Phase, and Other Phases)

In order to obtain high ductility, toughness, and strength together with excellent machinability, presence of phases other than α, β, and γ phases is also important. In embodiments of the present invention, considering the properties of the alloy, κ phase, μ phase, δ phase, ε phase, ζ phase, or η phase is not required. When the sum of the constituent phases (α), (β), (γ), (μ), (κ), (δ), (ε), (ζ), and (η) that form the metallographic structure is represented by 100, it is preferable that (α)+(β)+(γ)>99, and it is most preferable that (α)+(β)+(γ)=100 providing that measurement error and number rounding are disregarded.

(Bi Particles (Particles Including Bi) Present in α Phase)

Machinability of a β single-phase alloy including Si and a β single-phase alloy in which P-containing compounds are present in addition to Si is close to that of a free-cutting brass including 3 mass % Pb but does not reach the same level. In order to obtain higher machinability, even though α phase functions as a cushioning material between β phases and makes an origin of chip breakage such that chip breakability is improved, the machinability of α phase itself needs to be improved. In an alloy according to an embodiment of the present invention, due to P in addition to Si contained in the alloy, Bi particles having a particle size of about 0.1 to 3 μm are more likely to be present within α phase. By causing Bi particles to be present within α phase, the machinability of α phase significantly improves, and the machinability of the alloy can be significantly improved due to the effects of β phase having improved machinability in addition to the α phase having significantly improved machinability.

Incidentally, Bi is hardly solid-solubilized in a copper alloy and is present in the form of circular particles having a particle size of 0.3 μm to 3 μm when observed with a metallographic microscope. Bi has a lower melting point, a larger atomic number, and a larger atomic size than those of Cu or brass, an alloy comprising Cu and Zn. Therefore, in the case of a brass alloy that does not include Si and in which the proportion of β phase exceeds about 20%, very few Bi particles are present in α phase. They are mainly present at α phase boundary between α phase and β phase. The more the amount of β phase, the more the amount of Bi particles present in β phase. In embodiments of the present invention, it was ascertained that the likelihood of Bi particles present in α phase increases due to an action of Si on a Cu—Zn alloy. When the Si content is approximately 0.1 mass %, the action starts to be effective but not sufficiently. As the Si content is increased to higher than 0.3 mass %, higher than 0.5 mass %, and 0.7 mass % or higher, the effect becomes clear. Further, by including P, the likelihood of Bi particles present in α phase increases. It is known that Bi has lower machinability than Pb. However, in the embodiments, by causing Bi particles to be present in α phase, machinability higher than or equal to that of Pb can be obtained. When Bi and Pb are added together, Bi and Pb are present together in most of the particles, but an effect that is similar to that when Bi alone is included is exhibited. In order to increase the likelihood of Bi particles present in α phase and enhance the machinability of α phase, Bi needs to be contained in an amount exceeding 0.020 mass %. Further, when Bi particles are present in α phase, ductility and workability at a normal temperature, about 300° C., and about 500° C. improve compared with when Bi particles are present at a phase boundary between α phase and β phase.

(Presence of P-Containing Compound)

By including Si, the machinability of β phase is significantly improved, and the machinability is further improved by including P and solid-solubilization of P in β phase. Further, by causing a compound formed with P having a particle size of about 0.3 to about 3 μm and Si and/or Zn to be present in β phase, the machinability of β phase can be further improved. Machinability of a β single-phase alloy including 0.01 mass % Pb, 0.05 mass % P, and about 1 mass % Si without including Bi is improved by about 10% in terms of machinability index as compared to a β single-phase alloy to which P is not added by the presence of P-containing compounds in a sufficient amount.

By causing a P-containing compound to be present in β phase including Si, the machinability of β phase can be further improved. In addition, the machinability of α phase is improved by the presence of Bi particles. A 10% machinability improvement may not be expected simply deriving from this, but in a more preferable embodiment, an alloy having higher machinability can be obtained by a combination of β phase having further improved machinability and α phase having improved machinability.

P-containing compound is a compound including P and at least either or both of Si and Zn. In some cases, it can further includes Cu and/or inevitable impurities such as Fe, Mn, Cr, or Co. P-containing compounds are affected by inevitable impurities such as Fe, Mn, Cr, and Co, too. When the concentration of the inevitable impurities exceeds the aforementioned defined amount, the composition of P-containing compound changes such that P-containing compound may no longer contribute to improvement of machinability. Incidentally, P-containing compounds are not present at a hot working temperature of about 600° C. They are produced at a critical cooling rate during cooling after hot working. Accordingly, the cooling rate after hot working is important, and it is desirable that cooling is performed at an average cooling rate of 50° C./min or lower in a temperature range from 530° C. to 450° C. On the other hand, when the cooling rate is excessively slow, P-containing compounds are likely to grow bigger, which causes the effect on machinability to decrease. The lower limit of the average cooling rate is preferably 0.1° C./min or higher and more preferably 0.3° C./min or higher. The upper limit of the cooling rate, 50° C./min, varies slightly depending on the amount of P. When a large amount of P is contained, P-containing compounds are formed even when cooling is performed at a higher cooling rate.

Now, FIG. 1 shows a picture of a metallographic structure of a free-cutting alloy according to an embodiment of the present invention.

FIG. 1 shows an alloy that includes 63.1 mass % Cu, 1.13 mass % Si, 0.047 mass % P, 0.053 mass % Pb, 0.073 mass % Bi, and Zn as the balance and is obtained by performing hot forging at 640° C. at an average cooling rate of 10° C./min in a temperature range from 530° C. to 450° C.

As shown in FIG. 1, particles including Bi having a dimension of about 1 μm present in granular α phase crystal grains having an average crystal grain size of about 20 μm are observed, and presence of P-containing compounds formed of small granular particles having a particle size of about 0.5 to 1.5 μm are observes in β phase with a metallographic microscope. In the picture of the metallographic structure, the particles including Bi and the P-containing compounds can be distinguished from each other although they have the same granular shape. Viewing this from a different perspective, it can be said that particles present in α phase are Bi-containing particles since P-containing compounds are scarcely present in α phase.

(Si Content Solid-Solubilized in β Phase and Machinability)

The contents of Cu, Zn, and Si in α phase, β phase, and γ phase formed in an alloy having a composition that falls within a composition range according to an embodiment of the present invention roughly have the following relationships.

The Cu concentration: α>β≥γ.
The Zn concentration: β>γ>α.
The Si concentration: γ>β>α.

Regarding (1) a sample (an alloy including 63.1 mass % Cu, 1.13 mass % Si, 0.047 mass % P, 0.053 mass % Pb, 0.073 mass % Bi, and Zn as the balance) that was hot-extruded to φ25.6 mm at 580° C. using a mass production facility, (2) a sample that was obtained by cold-drawing the hot extruded material of (1) to φ21.6 mm, annealing the cold-drawn material at 480° C. for 60 minutes, and cold-drawing the annealed material to φ20.5, (3) a sample (an alloy including 61.9 mass % Cu, 0.85 mass % Si, 0.039 mass % P, 0.089 mass % Pb, 0.050 mass % Bi, and Zn as the balance) that was extruded to φ24 mm at 590° C. in a laboratory, and (4) a sample (an alloy including 59.9 mass % Cu, 0.58 mass % Si, 0.046 mass % P, 0.045 mass % Pb, 0.044 mass % Bi, and Zn as the balance) that was extruded to φ45 mm at 590° C. and was hot-forged at 600° C. in a laboratory, the concentrations of Cu, Zn, and Si in α and β phases were quantitatively analyzed with an X-ray microanalyzer using secondary electron images and compositional images of the samples taken at a magnification of 2000-fold. The measurement was performed using "JXA-8230" (manufactured by JEOL Ltd.) under the conditions of acceleration voltage: 20 kV and current value: $3.0 \times 10^{-8}$ A. The results are shown in Tables 3 to 6.

Tables 3 to 6 show that the concentration of the Si solid-solubilized in β phase is about 1.5 times that in α phase. That is, about 1.5 times the amount of Si in α phase is distributed in β phase. Incidentally, the result of analysis on γ phase formed by low-temperature annealing in an alloy containing 63.1 mass % Cu, 1.13 mass % Si, 0.047 mass % P, 0.053 mass % Pb, and 0.073 mass % Bi with the balance being Zn indicated that the γ phase had 60 mass % Cu, 3 mass % Si, and 37 mass % Zn.

An alloy having a representative composition of Patent Document 2, that is, 76 mass % Cu, 3.1 mass % Si, and Zn as the balance, was prepared and analyzed with an X-ray microanalyzer (EPMA). The result was that the composition of γ phase was 73 mass % Cu, 6 mass % Si, and 20.5 mass % Zn. This composition of γ phase is significantly different from the composition of 60 mass % Cu, 3 mass % Si, and 37 mass % Zn, which is a composition example of γ phase in a free-cutting copper alloy according to an embodiment of the present invention, and therefore, it is expected that characteristics of the γ phases of the alloys are also different.

TABLE 3

Alloy of Zn-63.1 mass % Cu-
1.13 mass % Si-0.047 mass % P-0.053
mass % Pb-0.073 mass %
Bi(Alloy No. S01; Step No. A1)

|  | Cu | Zn | Si |
|---|---|---|---|
| α phase | 65.5 | 33.5 | 0.8 |
| β phase | 60.5 | 38.0 | 1.3 |

TABLE 4

Alloy of Zn-63.1 mass % Cu-
1.13 mass % Si-0.047 mass % P-0.053
mass % Pb-0.073 mass % Bi
(Alloy No. S01; Step No. E1)

|  | Cu | Zn | Si |
|---|---|---|---|
| α phase | 66.5 | 32.5 | 0.9 |
| β phase | 61.0 | 37.5 | 1.5 |

TABLE 5

Alloy of Zn-61.9 mass % Cu-0.85 mass %
Si-0.039 mass % P-0.089 mass % Pb-0.050
mass % Bi (Alloy No. S21; Step No. C1)

|  | Cu | Zn | Si |
|---|---|---|---|
| α phase | 65.5 | 33.5 | 0.7 |
| β phase | 59.5 | 39.0 | 1.1 |

TABLE 6

Alloy of Zn-59.9 mass % Cu-0.58 mass %
Si-0.046 mass % P-0.045 mass % Pb-0.044
mass % Bi (Alloy No. S28; Step No. F1)

|  | Cu | Zn | Si |
|---|---|---|---|
| α phase | 63.0 | 36.5 | 0.4 |
| β phase | 57.5 | 41.5 | 0.7 |

(Machinability Index)

In general, machinability of various copper alloys are expressed by numerical value (%) by comparison with a free-cutting brass including 3 mass % Pb which is used as a standard alloy, i.e., 100% refers to the machinability of the standard alloy. Machinability of copper alloys is described, for example, in "Basic and Industrial Technique of Copper and Copper Alloy (Revised Edition)" (1994, Japan Copper and Brass Association), p. 533, Table 1, and Metals Handbook TENTH EDITION Volume 2 Properties and Selection: Nonferrous Alloys and Special-Purpose Materials" (1990, ASM International), p. 217 to 228.

Alloys in Table 7 are alloys including 0.01 mass % Pb prepared in a laboratory as described below by hot-extruding to φ22 mm using an extrusion test machine in the laboratory. In the case of Cu—Zn binary alloys, containing a small amount of Pb hardly affects the machinability of the alloy. Therefore, 0.01 mass % Pb, which falls within a component range according to an embodiment of the present invention, was added to each of the alloys. The hot extrusion temperature of Alloys A and D was 750° C., and the hot extrusion temperature of the other alloys, Alloys B, C, E, F, G, and H, was 635° C. After the extrusion, a heat treatment was performed at 500° C. for 2 hours to adjust the metallographic structure. The turning and drilling tests described below were performed to find out the machinability of the alloys. The results of the evaluation are shown in Table 8. A commercially available free-cutting brass, C3604 (comprising 59 mass % Cu, 3 mass % Pb, 0.2 mass % Fe, 0.3 mass % Sn, and Zn as the balance) was used as the standard free-cutting brass material.

TABLE 7

| Material | | Component Composition (mass %) | | | | Metallographic Structure (%) | |
|---|---|---|---|---|---|---|---|
| | | Cu | Zn | Si | Pb | P | α | β |
| Alloy A | α brass | 65.0 | 35.0 | 0 | 0.01 | 0 | 100 | 0 |
| Alloy B | 50% β brass | 58.1 | 41.9 | 0 | 0.01 | 0 | 52 | 48 |
| Alloy C | β brass | 54.0 | 46.0 | 0 | 0.01 | 0 | 0 | 100 |
| Alloy D | α brass with 0.6 Si | 68.3 | 31.0 | 0.60 | 0.01 | 0 | 100 | 0 |
| Alloy E | β brass with 0.5 Si | 56.6 | 42.8 | 0.52 | 0.01 | 0 | 0 | 100 |
| Alloy F | β brass with 1.0 Si | 58.7 | 40.2 | 1.00 | 0.01 | 0 | 0 | 100 |
| Alloy G | β brass with P + 0.5 Si | 56.6 | 42.8 | 0.51 | 0.01 | 0.05 | 0 | 100 |
| Alloy H | β brass with P + 1.0 Si | 58.5 | 40.4 | 1.00 | 0.01 | 0.05 | 0 | 100 |

TABLE 8

| | Machinability | Turning | | | Hole Drilling | | | |
|---|---|---|---|---|---|---|---|---|
| | | Cutting | | | Cutting Resistance | | | |
| | Overall (%) | Resistance (%) | Chips | Overall (%) | Torque (%) | Thrust (%) | Chips |
| Alloy A | 31 | 33 | X | 28 | 26 | 30 | X |
| Alloy B | 44 | 39 | X | 49 | 46 | 52 | X |
| Alloy C | 51 | 41 | X | 61 | 53 | 68 | X |
| Alloy D | 35 | 36 | X | 33 | 30 | 35 | X |
| Alloy E | 68 | 69 | X | 67 | 62 | 72 | X |
| Alloy F | 72 | 75 | X | 69 | 64 | 74 | X |
| Alloy G | 76 | 80 | Δ | 72 | 70 | 73 | Δ |
| Alloy H | 82 | 89 | ○ | 74 | 73 | 75 | ○ |

The above-mentioned Patent Documents describe that the machinability of a 70 Cu-30 Zn alloy which is an α single-phase brass is 30%. In an embodiment of the present invention, as shown in Tables 7 and 8, the overall machinability index of a 65 Cu-35 Zn alloy (Alloy A), which is also an α single-phase brass, was 31%. In an α single-phase brass in which the contents of Cu and Zn were adjusted and the Si content was 0.6 mass % (Alloy D), that is, an α single-phase brass in which 0.6 mass % Si was solid-solubilized in α phase, the machinability index was improved by about 4% compared with an α brass not including Si. Chips of Alloys A and D generated in the turning and drilling tests were both continuous.

The force of turning can be decomposed into a principal cutting force, a feed force, and a thrust force, and the combined force (three force components) thereof was regarded as cutting resistance. In the case of drilling, the force was decomposed into torque and thrust, and their average values are shown in the "Overall" column in the "Hole Drilling" section. Further, cutting resistance during turning and that during drilling were averaged and the resultant values are shown in the "Overall" column in the "Machinability" section as overall machinability index (evaluation).

In a β single-phase brass in which the contents of Cu and Zn were adjusted and Si was not included (Alloy C, 54 Cu-46 Zn), the "overall" machinability index improved about 20% points compared with an α single-phase brass not including Si. Yet, the "overall" machinability index was still quite low standing at 51%. There was little improvement in chip shape, and the chip evaluation remained the same.

In a β single-phase alloy including 0.5 mass % Si (Alloy E), the "overall" machinability index was improved by about 17% points as compared to a β single-phase brass not including Si (Alloy C). In particular, the cutting resistance during turning was improved by about 28% points, the torque was improved by about 9% points. In a β phase alloy including about 1 mass % Si (Alloy F), the "overall" machinability index was improved by about 21% points as compared to the β single-phase alloy not including Si. Thus, the machinability of β phase was improved when the amount of Si in β phase was in a range of 0 mass % to 0.5 mass %. The following is presumed. When the amount of Si is in a range of 0.1 to 0.2 mass %, the effect on machinability starts to be exhibited. When the amount of Si is 0.4 mass % or higher, the effect on machinability is clear. When the amount of Si is 0.6 mass % or higher, the effect on machinability is clearer. When the amount of Si is 0.8 mass % or higher or 1.0 mass % or higher, from the result of Alloy F, the effect on machinability is remarkable.

When not only 0.5 mass % Si but also 0.05 mass % P were added to a β single-phase brass (Alloy G), the "overall" machinability index was improved by about 8% points as compared to Alloy E, and the chip shape was improved in both the turning and drilling tests. In a β single-phase alloy including 0.05 mass % P and 1 mass % Si (Alloy H), the "overall" machinability index was improved by about 10% points as compared to a β single-phase alloy including about 1 mass % Si without including P. Due to presence of P, the solid-solubilization of P in β phase, and the presence of P-containing compounds, the cutting resistance during turning was improved by about 14% points, and the torque during drilling was improved by about 9% points. The magnitude of cutting resistance in turning and that of torque in drilling are related to chip shape, and by including 0.05 mass % P, the evaluation results of the chip shape in both the turning test and the drilling test were improved from "X" to "○". The difference in the cutting resistance during turning narrowed compared with a free-cutting brass including 3 mass % Pb, and chips produced during turning and drilling significantly improved becoming more similar to those of a free-cutting brass including 3 mass % Pb. Cutting resistance is affected by the strength of a material, and the higher the strength, the higher the cutting resistance. β single-phase brasses and free-cutting copper alloys according to an embodiment of the present invention have about 1.2 times the strength of a free-cutting brass including 3 mass % Pb. If the difference in strength is taken into consideration, the machinability of a β single-phase alloy including 1 mass % Si and 0.05 mass % P can be said to be close or equivalent to the machinability of a free-cutting brass including 3 mass % Pb, particularly in turning.

Alloy B is a brass including 0.01 mass % Pb and not including Si or P, in which the proportion of β phase is about 48%. Alloy B is formed of an α single-phase brass having an "overall" machinability index of 31% (Alloy A) and a β single-phase brass having an "overall" machinability index of 51% (Alloy C). The "overall" machinability index of Alloy B is 44% indicating that influence of β phase is slightly stronger than expected for its area ratio. The chip shape of the brass including 48% β phase was continuous. Considering its "overall" machinability index and the chip shape, this brass cannot be a replacement of a free-cutting brass including 3 mass % Pb. In a free-cutting brass bar including 3 mass % Pb, the proportion of β phase is about 20%, and the machinability of its matrix is at least worse than that of Alloy B. Due to an action of Pb, the "overall" machinability index of a free-cutting brass bar including Pb was higher than that of +its matrix by 60 percentage points or more and chips were broken.

Alloys E to H, that are β single-phase alloys, largely correspond to β phase of a free-cutting copper alloy according to an embodiment of the present invention, and Alloy D largely corresponds to α phase thereof. That is, the machinability of β phase is at a high level by including Si and P. It is presumed that, by causing Bi particles to be present in α phase, the machinability of α phase is enhanced and the machinability of the alloy has achieved a high level.

<Properties>

(Normal-Temperature Strength and High Temperature Properties)

There is a strong demand for reduction in the thickness and weight of parts and components that are target applications of embodiments of the present invention such as auto parts. Among the strengths that are required, tensile strength is important, and the balance between tensile strength and ductility is also important.

In order to obtain the strength stated above, it is preferable that hot extruded materials, hot rolled materials, and hot forged materials are high strength materials having a tensile strength of 440 N/mm$^2$ or higher in a state where cold working is not performed after hot working. The tensile strength is more preferably 480 N/mm$^2$ or higher and still more preferably 520 N/mm$^2$ or higher. Many components that are used for valve, joints pressure vessel, air conditioner, or freezer are manufactured by hot forging. C3771, a currently used brass for forging containing 2 mass % Pb has a tensile strength of about 400 N/mm$^2$ and an elongation of 30% to 35% despite presence of β phase in the alloy. A high strength can be achieved and a reduction in weight can be realized by containing Si and satisfying the requirements for metallographic structure defined by metallographic structure relational expressions f3 to f5.

Cold working may also be performed after hot working. In consideration of the influence of cold working, a material that falls within the following range is defined as a high-strength and high-ductility material.

A hot worked material, a material that is further cold-worked at a working ratio of 30% or lower after hot working, or further cold-worked and heat-treated after hot working, in some cases repeatedly, and cold-worked to the final working ratio of 30% or lower have the following properties. Hereinafter, when the cold working ratio is represented by [R]%, and when cold working is not performed, [R]=0. The tensile strength S (N/mm$^2$) is preferably (440+8×[R]) N/mm$^2$ or higher and more preferably (480+8×[R]) N/mm$^2$ or higher. The elongation E (%) is preferably (0.02×[R]$^2$−1.15×[R]+18) % or higher, and more preferably (0.02×[R]$^2$−1.2×[R]+20) % or higher. The characteristic relational expression f8=S×(100+E)/100 representing the balance between strength and ductility is preferably 580 or higher, more preferably 620 or higher, and still more preferably 650 or higher.

Incidentally, in a hot-worked, free-cutting brass including Pb on which no further working is performed after hot-working, the above-mentioned characteristic relational expression f8 is about 530. The characteristic relational expression f8 of a free-cutting copper alloy according to an embodiment of the present invention is higher than this by at least 50, possibly by 90 or more, indicating that the balance between strength and ductility is excellent.

(Electrical Conductivity)

Applications of embodiments of the present invention include electrical or electronic apparatus component, component of automobile, an increasing number of models of which are electric-powered, and other part and component requiring high conductivity. Currently, phosphor bronzes including Sn in an amount of about 5 mass %, about 6 mass %, or about 8 mass % (JIS Standard Nos., C5102, C5191, and C5210) are widely used for these applications, and their electrical conductivities are about 15% IACS, about 14% IACS, and about 12% IACS, respectively. Accordingly, there is no serious problem related to electric conductivity to use a copper alloy according to an embodiment of the present invention for an electrical or electronic component or an automobile component as long as it has an electrical conductivity of 14% IACS or higher, preferably 15% IACS or higher. That copper alloys according to an embodiment of the present invention exhibit high conductivity despite inclusion of Si, an element that deteriorates electrical conductivity, and a high concentration of Zn, is influenced by the amount of β phase in the alloy and Si solid-solubilized in the β phase. Despite the fact that the concentration of Zn in β phase is higher than that in α phase, the more β phase is contained, the higher the electric conductivity. The upper limit of the electrical conductivity is not particularly defined because an increase in conductivity rarely causes a problem in practice.

From the above-stated results of studies the following findings were obtained.

First, in the conventional art, it was known that β phase formed in a Cu—Zn—Si alloy has no effect on the improvement of machinability of an alloy or has a negative effect on the machinability. However, as a result of devoted studies, the present inventors have ascertained that β phase comprising, for example, about 1 mass % Si, about 59 mass % Cu, and about 40 mass % Zn, has excellent machinability.

Secondly, when a Cu—Zn—Si alloy included a small amount Bi, it was able to make Bi particles having an average particle size of about 0.2 to about 2 μm present in α phase due to an action of Si. Presence of Bi particles changed α phase having poor machinability to one having improved machinability. Due to this α phase having improved machinability in combination with the above-mentioned β phase having excellent machinability, the alloy was able to obtain excellent machinability.

Thirdly, the present inventors have revealed that Pb is present in the form of particles in which Bi and Pb having an average particle size of about 0.2 to about 2 μm coexist or in the form of Pb particles, and exhibits the effects of improving chip breakability and reducing the cutting resistance.

Fourthly, when a Cu—Zn—Si alloy included P, P was preferentially solid-solubilized in β phase and further improved the machinability of β phase. It was ascertained that, when P-containing compounds having an average particle size of about 0.3 to about 3 μm are present in β phase, the machinability improves more than those without P-containing compounds.

Fifth, it was ascertained that γ phase formed in a free-cutting copper alloy according to an embodiment of the present invention also has an effect on chip breakability. The free-cutting copper alloys of the Patent Documents have compositions different than that of a free-cutting copper alloy according to an embodiment of the present invention. Even though the copper alloys of the Patent Documents and free-cutting copper alloys according to an embodiment of the present invention both have γ phase, if its composition is different, a large difference is exhibited in machinability similarly to β phase as described above. And, it was found that γ phase present in an alloy having a composition that falls within a composition range of a free-cutting copper alloy according to an embodiment of the present invention has excellent machinability.

Sixth, the present inventors have accomplished free-cutting copper alloys according to an embodiment of the present invention by clarifying the relationships between machinability and the amounts of β phase, Si, Bi, Pb, and the amount of Si solid-solubilized in β phase, presence of P-containing compounds in β phase, the amount of P, and the amount of γ phase, in order to reduce the amount of Pb, an element which may cause a problem in the environment and the like, and the amount of Bi, and making the composition and metallographic structure as well as various mechanical properties more appropriate.

Lastly, conventional leaded copper alloys had a problem in hot deformability at 650° C. or lower because a large amount of Pb is in a molten state at a hot working temperature. Even though a free-cutting copper alloy according to an embodiment of the present invention contains Bi and Pb, it was able to be completed as a copper alloy having excellent hot deformability at about 600° C., a temperature lower than 650° C., low hot deformation resistance, good ductility during hot working and can be hot worked easily because the contents of Bi and Pb are limited to very small amounts.

(Hot Workability)

Free-cutting copper alloys according to an embodiment of the present invention have a characteristic that it has excellent deformability at about 600° C. They can be hot-extruded into a bar having a small cross-sectional area, and can be hot-forged into a complex shape. When high deformation is performed on a leaded copper alloy at about 600° C., a large crack is formed. Therefore, an appropriate hot extrusion temperature range is 625° C. to 800° C., and an appropriate hot forging temperature range is 650° C. to 775° C. A free-cutting copper alloy according to an embodiment of the present invention, however, has a characteristic that it does not crack when hot working is performed at 600° C. with a working ratio of 80% or higher. A preferable hot working temperature for a free-cutting copper alloy according to an embodiment of the present invention is a temperature lower than 650° C. and more preferably lower than 625° C.

In a free-cutting copper alloy according to an embodiment of the present invention, deformability is improved and deformation resistance is reduced at 600° C. due to inclusion of Si. Since the proportion of β phase is high, hot working can be easily performed at 600° C.

When hot worked at about 600° C., a temperature lower than the working temperature of conventional copper alloys, tools such as an extrusion die for hot extrusion, containers of extruder, and metal molds for forging are heated to 400° C. to 500° C. and used. The smaller the difference in temperature between the tools and the hot worked material, the more homogeneous the metallographic structure, the better the dimensional accuracy of a hot worked material, and the longer the tool life because tool temperature does not substantially increase. In addition, a material having a high strength and a good balance between strength and elongation can be obtained.

<Production Process>

Next, a method for producing free-cutting copper alloys according to the first and second embodiments of the present invention will be described.

The metallographic structure of an alloy according to an embodiment of the present invention varies not only depending on the composition but also depending on the production process. The metallographic structure of the alloy is affected not only by hot working temperatures in hot extrusion and hot forging and heat treatment conditions but also by the average cooling rate in the process of cooling after hot working or heat treatment. As a result of a devoted study, it was found that the metallographic structure is affected by the cooling rate in a temperature range from 530° C. to 450° C. in the process of cooling after casting, hot working, or heat treatment.

(Melting and Casting)

Melting is performed at about 950° C. to about 1200° C., a temperature that is about 100° C. to about 300° C. higher than the melting point (liquidus temperature) of an alloy according to an embodiment of the present invention. A molten alloy at a temperature of about 900° C. to about 1100° C., a temperature that is about 50° C. to about 200° C. higher than the alloy's melting point is cast into a predetermined mold and is cooled by several cooling means such as air cooling, slow cooling, or water cooling. After the alloy solidifies, constituent phases change in various ways.

(Hot Working)

Examples of hot working include hot extrusion, hot forging, and hot rolling. Each of these processes is explained below. When two or more hot working steps are performed, the final hot working step is performed under the following conditions.

(1) Hot Working

First, regarding hot extrusion, in a preferred embodiment, although depending on extrusion ratio (hot working ratio) and facility capacity, hot extrusion is performed such that the material's temperature when it is being hot worked, specifically, immediately after the material passes through the extrusion die (hot working temperature) is higher than 530° C. and lower than 650° C. The lower limit of the hot extrusion temperature relates to hot deformation resistance, and the upper limit thereof relates to the shape of α phase. By controlling the hot extrusion temperature such that it is within a narrower temperature range, a stable metallographic structure can be obtained. When hot extrusion is performed at 650° C. or higher, the shape of α phase crystal grains is likely to be acicular instead of granular, or large α phase crystal grains having a diameter of more than 50 μm are likely to appear. When acicular or large α phase crystal grains appear, the strength slightly decreases and the balance between strength and ductility slightly deteriorates. In addition, distribution of P-containing precipitates becomes slightly uneven, and the machinability slightly deteriorates because α phase crystal grains having a large longer side and large α phase crystal grains hinder machining. The shape of α phase crystal grains relates to the composition relational expression f1, and when the composition relational expression f1 is 58.0 or lower, the extrusion temperature is preferably lower than 625° C. By performing extrusion at a temperature lower than the temperature at which leaded copper alloys are extruded, better machinability and high strength can be obtained.

Further, by adjusting the cooling rate after hot extrusion, that is, by performing cooling in a temperature range from 530° C. to 450° C. in the process of cooling after hot extrusion at an average cooling rate of 50° C./min or lower and preferably 45° C./min or lower, a material having more excellent machinability can be obtained. By limiting the average cooling rate to 50° C./min or lower, the presence of P-containing compounds can be observed with a metallographic microscope at a magnification of 500-fold or 1000-fold. On the other hand, if the cooling rate is excessively low, P-containing compounds are likely to grow bigger, and the effect on machinability may decrease. Therefore, the average cooling rate is preferably 0.1° C./min or higher and more preferably 0.3° C./min or higher.

From a perspective of practicability of measurement position, hot working temperature is defined as a temperature of a hot worked material at which measurement can be performed about three or four seconds after hot extrusion, hot forging, or hot rolling is completed. Metallographic structure is affected by the temperature immediately after working where large plastic deformation occurs. The average cooling rate after hot working in question is about 50° C./min. Therefore, a temperature decrease during the 3 to 4 seconds after hot working is calculated to be about 3° C., which little affects the metallographic structure.

(2) Hot Forging

As a material for hot forging, a hot extruded material is mainly used, but a continuously cast bar is also used. Compared with hot extrusion, in hot forging, hot deformation speed is higher, and a more complex shape is formed. In some cases, high deformation is performed up to a thickness of as thin as about 3 mm, and thus the forging temperature is high. In a preferred embodiment, the temperature of a hot forged material on which plastic working is performed to form a main portion of a forged product, that is, the material's temperature about three or four seconds immediately after forging (at the point forging is completed) is preferably higher than 530° C. and lower than 675° C. In a brass alloy including 2 mass % Pb that is widely used as a brass alloy for forging (59Cu-2Pb-balance Zn), the lower limit of the hot forging temperature is 650° C. Hot forging temperature of embodiments of the present invention is more preferably lower than 650° C. Hot forging relates to the composition relational expression f1, and when the composition relational expression f1 is 58.0 or lower, the hot forging temperature is preferably lower than 650° C. Although depending on the working ratio in hot forging, the lower the temperature, the more granular the shape of α phase crystal grains and the smaller the size of α phase crystal grains. As a result, the strength increases, the balance between strength and ductility improves more, and the machinability improves more.

By adjusting the cooling rate after hot forging, the alloy becomes a material having better machinability. That is, cooling is performed after hot forging with the average cooling rate in a temperature range from 530° C. to 450° C. set at 50° C./min or lower, preferably 45° C./min or lower. By controlling the cooling rate such that P-containing compounds having a particle size of about 0.3 to 3 μm precipitate in β phase, the machinability of the alloy can be improved. Incidentally, the lower limit of the above-mentioned average cooling rate is preferably 0.1° C./min or higher and more preferably 0.3° C./min or higher in order to inhibit enlargement of compounds in the cooling process.

(3) Hot Rolling

In hot rolling, an ingot is heated and rolled 5 to 15 times repeatedly. The material's temperature upon completion of the final hot rolling (the material's temperature three or four seconds after completion of the process) is preferably higher than 530° C. and lower than 625° C. After completion of hot rolling, the rolled material is cooled. In this cooling, like in hot extrusion, the average cooling rate in a temperature range from 530° C. to 450° C. is preferably 0.1° C./min or higher and 50° C./min or lower, more preferably 0.3° C./min or higher or 45° C./min or lower.

(Heat Treatment)

A main heat treatment of copper alloy is also called annealing. Heat treatment is performed as necessary. For example, when making a product so small that it cannot be processed by hot extrusion, heat treatment is performed after cold-drawing or cold wire-drawing for the purpose of recrystallization, that is, to soften the material. Cold-rolling and heat treatment are performed on rolled materials, too. In embodiments of the present invention, heat treatment is also performed in order to control the amounts of γ phase and β phase.

When heat treatment to induce recrystallization is required, the material is heated to a temperature of 400° C. or higher and 600° C. or lower for 0.1 to 8 hours. When P-containing compounds are not formed in the previous step, they are formed during heat treatment. When heat treatment is performed at a temperature of higher than 530° C. for a long time, P-containing compounds are solid-solubilized again and disappear. When heat treatment temperature is higher than 530° C., it is preferable to perform cooling with the average cooling rate in a temperature range from 530° C. to 450° C. in the process of cooling set to be 50° C./min or lower and preferably 45° C./min or lower such that P-containing compounds are formed. The lower limit of the average cooling rate is preferably 0.1° C./min or higher.

(Cold Working Step)

In the case of a hot extruded bar, cold working may be performed on a hot extruded material in order to obtain a high strength, to improve the dimensional accuracy, or to straighten (reduce the degree of bending of) an extruded bar or a coiled material. For example, cold-drawing, cold wire drawing, and/or straightness correction are performed on a hot extruded material at a working ratio of about 0% to about 30%.

If the material is a slender bar, a wire, or a rolled material, cold working and heat treatment are repeatedly performed. After the heat treatment, cold working, straightness correction, and/or low-temperature annealing are performed such that the final working ratio becomes 0% to about 30%.

An advantage of cold working is that it can improve the strength of the alloy. By performing a combination of cold working and heat treatment on a hot worked material, no matter which step is performed first, strength and ductility can be well-balanced, and properties required by each application in which strength or ductility is considered important can be obtained. Cold working hardly affects machinability.

(Low-Temperature Annealing)

Low-temperature annealing is a heat treatment performed on bars, wires, forged products, and rolled materials as necessary at a temperature equal to or lower than the recrystallization temperature for the main purposes of removal of residual stress, straightness correction, and adjustment and improvement of metallographic structure. In the case of embodiments of the present invention, in order to distinguish low-temperature annealing from the above-described heat treatment, low-temperature annealing is defined to be a process which induces recrystallization of less than 50% of the metallographic structure. Low-temperature annealing is performed with a holding temperature of 250° C. or higher and 430° C. or lower and a holding time of 10 minutes to 200 minutes. The lower limits of temperature and time are those where residual stress can be sufficiently removed. In addition, bars with excellent straightness can be obtained by arranging bars in a mold whose cross-section has a recess and the bottom surface is smooth and flat, for example, a steel mold having a width of about 500 mm, a height of about 300 mm, a thickness of about 10 mm, and a length of about 4000 mm (depth of a recess is obtained by deducting mold's thickness from height), and holding the bars at a temperature of 250° C. or higher and 430° C. or lower for 10 minutes to 200 minutes. When the temperature is represented by T° C. and the time is represented by t min, it is preferable that 300≤annealing conditional expression f9=(T−200)×(t)$^{1/2}$≤2000 is satisfied when performing low-temperature annealing. When conditional expression f9 is lower than 300, the removal of residual stress or straightness correction is insufficient. When the annealing conditional expression f9 is higher than 2000, the strength decreases. The annealing conditional expression f9 is preferably 400 or higher and 1600 or lower. Irrespective of the cooling rate in the previous step, when the annealing conditional expression f9 is 400 or higher, compounds including fine P are formed during low-temperature annealing. In addition, although depending on the alloy's composition, when a material is held at a temperature of 250° C. or higher and 430° C. or lower for 10 minutes to 200 minutes, fine γ phase may precipitate in β phase or at a phase boundary between β phase and α phase, making chips generated by drilling become fine.

Using the above-mentioned production method, high-strength free-cutting copper alloys according to the first and second embodiments of the present invention are produced.

The hot working step, the heat treatment step (also referred to as "annealing"), and the low-temperature annealing step are steps of heating the copper alloy. Basic production steps are melting and casting, hot working (extrusion, forging, rolling), cold working (drawing, wire-drawing, rolling), straightness correction, and low-temperature annealing, but straightness correction, cold working, or low-temperature annealing may not be included. Straightness correction is typically performed in a cold state, and thus is also be referred to as "cold working". The steps for slender bars having a diameter of φ5 to 7 mm, wires, and plates having a thickness of 8 mm or less may include a heat treatment. Heat treatment is mainly performed after cold working, and heat treatment and cold working are repeated according to the final dimensions. The smaller the diameter of the final product and the thinner the final product, the more the cold workability matters. The heat treatment may be performed before cold working after hot working.

A low-temperature annealing step is performed after the final step among a hot working step, a cold working step, a straightness correction step, and an annealing step. When a low-temperature annealing step is performed, an annealing step is typically performed between the working steps. It can be said that a low-temperature annealing step is performed after the final working step among a hot working step, a cold working step, and a straightness correction step.

Specifically, the following combinations of production steps can be provided as examples. Incidentally, hot rolling may be performed instead of hot extrusion.

(1) Hot extrusion and low-temperature annealing (2) Hot extrusion, cold working (drawing, wire-drawing, rolling), and low-temperature annealing (3) Hot extrusion, cold working (drawing, wire-drawing, rolling), straightness correction, and low-temperature annealing (4) Hot extrusion, repetition of cold working (wire-drawing, rolling) and annealing, cold working, and low-temperature annealing (5) Hot extrusion, repetition of cold working (cold wire-drawing, rolling) and annealing, cold working, straightness correction, and low-temperature annealing (6) Hot extrusion, annealing, cold working (drawing, wire-drawing, rolling), and low-temperature annealing (7) Hot extrusion, annealing, cold working (drawing, wire-drawing, rolling), straightness correction, and low-temperature annealing (8) Hot extrusion, annealing, repetition of cold working (drawing, wire-drawing, rolling) and annealing, cold working, and low-temperature annealing (9) Hot extrusion, annealing, repetition of cold working (drawing, wire-drawing, rolling) and annealing, cold working, straightness correction, and low-temperature annealing

(10) Hot extrusion, cold-drawing, straightness correction (straightness correction may not be performed), hot forging, and low-temperature annealing

(11) Hot extrusion, straightness correction, hot forging, and low-temperature annealing

(12) Hot extrusion, hot forging, and low-temperature annealing

(13) Casting, hot forging, and low-temperature annealing

(14) Casting, straightness correction, hot forging, and low-temperature annealing In a free-cutting alloy according to the first or second embodiment of the present invention having the above-described constitution, since the alloy's composition, the composition relational expressions f1 and f2, the metallographic structure relational expressions f3 to f5, and the composition and metallographic structure relational expressions f6 and f7 are defined as described above, even though the contents of Pb and Bi are small, excellent machinability can be obtained, and excellent hot workability, high strength, and a good balance between strength and ductility can be obtained.

Hereinabove, embodiments of the present invention have been described. However, the present invention is not limited to the embodiments, and appropriate modifications can be made within a range not departing from the technical requirements of the present invention.

EXAMPLES

Hereinafter, the results of the experiments that were performed to verify the effects of embodiments of the present invention will be described. The following Examples are for the purpose of explaining the effects of the embodiments. The constituent elements, the processes, and the conditions described in the Examples do not limit technical ranges of the embodiments.

Using a low-frequency melting furnace and a semi-continuous casting machine used for manufacturing commercial products, a trial production of copper alloys was performed.

In addition, using a laboratory facility, a trial production of copper alloys was performed.

Tables 9 to 11 show the alloys' compositions. In addition, Tables 12 to 17 show production steps. Regarding composition, "MM" refers to mischmetal which represents the total content of rare earth elements. Each of the production steps are explained below.

(Steps Nos. A1 to A6, and A10)

As shown in Table 12, using the low-frequency melting furnace and the semi-continuous casting machine used for manufacturing commercial products, a billet having a diameter of 240 mm was produced. For raw materials, those correspond to ones used for commercial production were used. The billet was cut into a length of 800 mm and was heated. Using a hot extruder having an officially announced capacity of 3000 tons, two round bars having a diameter of 25.6 mm were extruded. The extruded bars were cooled at several different cooling rates in a temperature range from 530° C. to 450° C. The temperature was measured using a radiation thermometer mainly in a period from the middle stage to the final stage of the hot extrusion process about three or four seconds after the bars came out of the extruder. For the temperature measurement during hot extrusion, hot forging, and hot rolling described below, IGA 8Pro/MB20, a radiation thermometer manufactured by Luma Sense Technologies Inc., was used.

It was verified that the average temperature of the extruded material was within ±5° C. of a temperature shown in Table 12 (i.e., within a range from (temperature shown in the table)−5° C. to (temperature shown in the table)+5° C.).

In Steps Nos. A1, A2, and A6, the extrusion temperature was 580° C. In Steps Nos. A3 and A5, the extrusion temperature was 620° C. In Step No. A4, the extrusion temperature was 680° C. The average cooling rate in a temperature range from 530° C. to 450° C. after hot extrusion was 40° C./min in Step No. A3 and was 70° C./min in Step No. A5. In steps other than Steps Nos. A3, A5, and A10, the average cooling rate was 30° C./min.

After completion of the hot extrusion, in Step No. A1, straightness correction was performed in a cold state. During the straightness correction, the cold working ratio was 0% in effect. In steps other than Steps Nos. A1 and A10, the extruded material having a diameter of 25.6 mm was cold-drawn to reduce the diameter to 25.0 mm (working ratio: 4.6%). Further, in Step No. A6, the material of Step No. A1 was put into a mold then low-temperature annealing was performed at 310° C. for 100 minutes.

In Step No. A10, the material was hot-extruded to modify the diameter to 45 mm at 570° C. and was cooled at an average cooling rate of 20° C./min in a temperature range from 530° C. to 450° C. Step No. A10 was used for a forging experiment.

Here, regarding the materials on which low-temperature annealing was performed, the annealing conditional expression f9 shown below was calculated.

$$f9=(T-200)\times(t)^{1/2}$$

T: temperature (material's temperature) (° C.)
t: heating time (min)

In addition, low-temperature annealing was performed on bars arranged (stacked in four tiers) in a steel mold having a recessed cross-section, a width of 500 mm, a height of 300 mm, a thickness of 10 mm, and a length of 4000 mm. Next, low-temperature annealing was performed, and bend of the bars was measured.

All the measurement results of bending was good standing at 0.1 mm or less for one meter of the sample bars obtained by performing low-temperature annealing on Alloys Nos. S01 and S02.

(Steps Nos. C1 to C5 and C10)

As shown in Table 13, in a laboratory, raw materials were melted at a predetermined component ratio. Test materials to which inevitable impurity elements were intentionally added were also prepared. The molten alloy was cast into a mold having a diameter of 100 mm and a length of 180 mm to prepare a billet (Alloys Nos. S11 to S34 and S51 to S65).

This billet was heated and extruded into a round bar having a diameter of 24 mm or 45 mm. In Steps Nos. C1, C3, and C10, the extrusion temperature was 590° C. In Steps Nos. C2 and C5, the extrusion temperature was 620° C. In Step No. C4, the extrusion temperature was 680° C. The average cooling rate in a temperature range from 530° C. to 450° C. after extrusion was 65° C./min in Step No. C5 and 25° C./min in Steps Nos. C1, C2, and C4. Next, straightness correction was performed (working ratio: 0%) on bars whose straightness was poor, but not on those having good straightness. In Step No. C3, a bar subjected to Step No. C1 was used, and low-temperature annealing was performed at 320° C. for 60 minutes without putting the bar into a mold.

In addition, Alloys A to H were prepared using the method defined in Step No. C1 except that hot extrusion was performed at a different temperature then heat treatment was performed at 500° C. for 2 hours. Further, as a comparative material, a commercially available bar to which Pb was added and a commercially available brass bar for forging to which Pb was added (Alloy No. SI) were prepared.

In Step No. C10, a forging material was prepared by extruding a bar to a diameter of 45 mm at an extrusion temperature of 590° C. and cooling the bar at an average cooling rate of 20° C./min in a temperature range from 530° C. to 450° C.

(Step D)

As shown in Table 14, in Step No. D1, a molten alloy was obtained from a laboratory and was cast into a metal mold having an inner diameter of 45 mm. The molten alloy was cooled at an average cooling rate of 40° C./min in a temperature range from 530° C. to 450° C. in the process of cooling, and the resultant material was used as a forging material in Step No. F.

(Steps Nos. E1 and E2)

As shown in Tables 15 and 16, Steps Nos. E1 and E2 are steps including annealing.

In Step No. E1, the alloy that was hot-extruded to a diameter of 25.6 mm according to the conditions of Step No. A1 was used. It was cold-drawn to 21.6 mm, and was heat-treated at 480° C. for 60 minutes. Subsequently, the alloy was cold-drawn to a diameter of 20.5 mm. Step No. E1 is a step mainly for slender bars having a diameter of, for instance, 7 mm or less. However, as the machining test was unable to be performed on a slender bar, an extruded bar having a large diameter was used for the testing instead.

In Step No. E2, a part of the molten alloy was transferred from a melting furnace used for manufacturing commercial products to a ladle and was poured into a casting mold having a cross-section of 35 mm×70 mm. The surface of the obtained casting having dimensions of 35 mm×70 mm×210 mm was machined to modify the dimensions to 32 mm×65 mm×180 mm. The casting was then heated to 650° C. and two passes of hot-rolling was performed on the casting to a thickness of 15 mm. About three or four seconds after the end of the final hot rolling, the material's temperature was 550° C., and then the material was air-cooled. The cooling was performed at an average cooling rate of 20° C./min in a temperature range from 530° C. to 450° C. The obtained rolled sheet was cold-rolled to a thickness of 10 mm, heat-treated at 480° C. for 60 minutes using an electric furnace, and was further cold-rolled to a thickness of 9 mm (working ratio: 10%). Since the material was quite thin, only drilling test was performed.

(Steps Nos. F1 to F6)

As shown in Table 17, a round bar having a diameter of 45 mm and castings obtained in Steps Nos. A10, C10, and D1 were cut to a length of 180 mm. This round bar was horizontally placed and forged to a thickness of 16 mm using a press machine having a hot forging press capacity of 150 ton. About three to four seconds immediately after the material was hot-forged to a predetermined thickness (upon completion of the hot forging), the temperature was measured using a radiation thermometer and a contact thermometer. It was verified that the hot forging temperature (hot working temperature) was within ±5° C. of a temperature shown in Table 17 (i.e., within a range from (temperature shown in the table)−5° C. to (temperature shown in the table)+5° C.).

Hot forging was performed at 640° C. in Steps Nos. F1 and F6 and at 600° C., 625° C., and 690° C. respectively in Steps Nos. F2, F3, and F5. Cooling was performed in a temperature range from 530 to 450° C. at a cooling rate of 10° C./min in Step No. F1, 28° C./min in Steps Nos. F2, F3, and F5, and 70° C./min in Step No. F6. In Step No. F4, low-temperature annealing was performed at 340° C. for 25 minutes on the forged product of Step No. F1.

The hot forged materials were cut and provided for machining tests and experiments to examine mechanical characteristics.

The above-described test materials were evaluated for the following items. The evaluation results are shown in Tables 18 to 36.

(Observation of Metallographic Structure)

The metallographic structure was observed using the following method, then the area ratios (%) of the respective phases such as α phase, β phase, γ phase, κ phase, and μ phase were measured by image analysis. It was assumed that α' phase, β' phase, and γ' phase were included in α phase, β phase, and γ phase respectively.

Each of the test materials (bars and forged products) was cut parallel to its long side or parallel to a flowing direction of the metallographic structure. Next, the surface was polished (mirror-polished) and was etched with a mixed solution of hydrogen peroxide and ammonia water. For etching, an aqueous solution obtained by mixing 3 ml of 3 vol % hydrogen peroxide water and 22 ml of 14 vol % ammonia water was used. At a room temperature of about 15° C. to about 25° C., the polished metal surface was dipped in the aqueous solution for about 2 seconds to about 5 seconds.

The metallographic structure was observed with a metallographic microscope at a magnification of 500-fold to obtain the proportions of the respective phases and investigate where Bi particles were present and whether or not any P-containing compounds were present. Depending on the state of the metallographic structure, metallic phases, Bi particles, and P-containing compounds were observed at a magnification of 1000×. In micrographs of five visual fields, respective phases (α phase, β phase, γ phase, κ phase, and μ phase) were manually painted using image processing software "Photoshop CC". Next, the micrographs were binarized using image analysis software "WinROOF 2013" to obtain area ratio of each of the phases. Specifically, proportion of each of the phases was obtained by averaging area ratios of each phase in the five visual fields. In this area ratio calculation, the aggregate of the area ratio of each and every constituent phase excluding oxides, sulfides, Bi particles, Pb particles, precipitates (P-containing compounds are excluded), and crystallized particles constitutes 100%.

Then P-containing compounds were observed. The minimum size of a precipitated particle of a P-containing compound that can be observed at 500-fold with a metallographic microscope is about 0.5 μm. Among precipitates which can be observed with a 500-fold metallographic microscope and distinguished and recognized with a 1000-fold metallographic microscope, whether or not any P-containing compounds were present was determined first in the same manner as when the proportion of the phases were observed. Although depending on the P content and the production conditions, P-containing compounds are present in one visual field of the microscope in an quantity from several to several hundreds. As most of the P-containing compounds were present in β phase or at a phase boundary between α phase and β phase, they were assumed to be included in β phase. Further, γ phase having a size of less than 0.5 μm is sometimes present in β phase. Phases having a size of less than 0.5 μm are unable to be identified with a metallographic microscope at a magnification of 500-fold or in some cases even at a magnification of 1000-fold. Therefore, in embodiments of the present invention, ultrafine γ phase was treated as β phase. When observed with a metallographic microscope, a P-containing compound appears blackish grey. Therefore, it is distinguishable from a precipitate or a compound formed of Mn or Fe which has a light blue color.

Incidentally, when a test material containing P is etched with an etching solution according to an embodiment of the present invention, phase boundaries between α phase and β phase can be viewed clearly as shown in FIG. 1. When P content is about 0.01 mass % or more, the boundaries can be observed more clearly, indicating that inclusion of P causes metallographic structure to change.

Bi particles were observed with a metallographic microscope in the same manner as when P-containing compounds were observed. Bi particles and P-containing compounds can be clearly distinguished in a metallographic micrograph. In particular, P-containing compounds are scarcely present in α phase. Therefore, the particles present in α phase are Bi particles. When it was difficult to distinguish them from one another, an electron microscope having an analytical function, for example, EPMA was used for the determination. If Bi particles were found in a α phase crystal grain in a micrograph, it was determined that Bi particles were present in α phase, and the evaluation was "○" (Good). If Bi particles were present at a boundary between α phase and μ phase, it was determined that Bi particles were not present in α phase. If Bi particles were not present in α phase, the evaluation was "X" (poor).

The shape of α phase was evaluated as follows.

An α phase crystal grain was defined as an acicular (elliptical) α phase crystal grain when its longer side/shorter side ratio exceeded 4. When the longer side/shorter side ratio was 4 or lower, the α phase crystal grain was defined to be granular. During the observation of the metallographic structure, the proportion of the number of granular α phase crystal grains to the entirety of α phase was investigated. If the proportion of granular α phase crystal grains was lower than 50%, the evaluation was "X" (poor). If the proportion of granular α phase crystal grains was 50% or higher and lower than 75%, the evaluation was "Δ" (fair). If the proportion of granular α phase crystal grains was 75% or higher, the evaluation was "○" (good). The shape of α phase affects mechanical characteristics and machinability, and the more the number of granular α phase crystal grains, the better the mechanical characteristics and machinability.

When it was difficult to identify phases, precipitates, P-containing compounds, and Bi particles, they were identified by an electron backscattering diffraction pattern (FE-SEM-EBSP) method in which an EDS equipped in an field emission scanning electron microscope (FE-SEM) (JSM-7000F, manufactured by JEOL Ltd.) was used, at a magnification of 500-fold or 2000-fold under the conditions of an acceleration voltage of 15 kV and a current value of 15 (set value). When no P-containing compound was observed in a test material containing P at the stage of observation using a metallographic microscope, presence of P-containing compound was checked at a magnification of 2000×.

In addition, regarding some alloys, when the Si concentration in α phase, β phase, and γ phase (particularly the concentration in β phase) was measured and when it was difficult to determine the presence of P-containing compound, or when Bi particles were small, quantitative analysis or qualitative analysis was performed with an X-ray microanalyzer on a secondary electron image and a compositional image taken at a magnification of 2000-fold. The measurement was performed using "JXA-8230" (manufactured by JEOL Ltd.) at an acceleration voltage of 20 kV and a current value of $3.0 \times 10^{-8}$ A.

If P-containing compounds were found when observed with a metallographic microscope, the alloy was evaluated as "○" (good) in terms of presence of P-containing compound. If a P-containing compound was found when observed at a magnification of 2000×, the alloy was evaluated as "Δ" (fair) in terms of presence of P-containing compound. If no P-containing compound was found, the alloy was evaluated as "X" (poor) in terms of presence of P-containing compound. Those evaluated as "Δ" (fair) regarding presence of P-containing compound are also acceptable in embodiments of the present invention. In the tables, the evaluation results regarding presence of P-containing compounds are shown in the "P Compound" row.

(Electrical Conductivity)

For the measurement of electrical conductivity, an electrical conductivity measurement device (SIGMATEST D2.068, manufactured by Foerster Japan Ltd.) was used. In this specification, the terms "electric conductivity" and "electrical conductivity" are meant to have the same meaning. In addition, thermal conductivity and electrical conductivity are closely correlated. Therefore, the higher the electrical conductivity, the better the thermal conductivity.

(Tensile Strength/Elongation)

Each of the test materials was processed in accordance with specimen No. 10 of JIS Z 2241, and their tensile strength and elongation were measured.

If a hot extruded material or a hot forged material not having undergone any cold working step has a tensile strength of preferably 440 N/mm² or higher, more preferably 480 N/mm² or higher, or still more preferably 520 N/mm² or higher, the material is considered to have the highest level of tensile strength among free-cutting copper alloys. With such a high tensile strength, a reduction in the thickness and weight of parts and components used in various fields or an increase in allowable stress can be realized. In addition, regarding the balance between strength and elongation, when tensile strength is represented by S (N/mm²) and elongation is represented by E (%), if the value of the characteristic relational expression f8=S×(100+E)/100 which indicates the balance between strength and ductility is preferably 580 or higher, more preferably 620 or higher, or still more preferably 650 or higher, it can be said that the alloy has a very high standard of balance between strength and elongation among hot-worked copper alloys having machinability.

<Machinability Test Using Lathe>

Machinability was evaluated by the machining test using a lathe as described below.

A hot extruded bar or a hot forged product was machined to prepare a test material having a diameter of 14 mm. A carbide tool (chip) K10 not equipped with a chip breaker was attached to a lathe. Using this lathe, the circumference of the test material having a diameter of 14 mm was machined on dry conditions with a rake angle of 0°, a nose radius of 0.4 mm, a clearance angle of 6°, a cutting speed of 40 m/min, a cutting depth of 1.0 mm, and a feed rate of 0.11 mm/rev.

Signals emitted from a dynamometer (AST tool dynamometer AST-TL1003, manufactured by Mihodenki Co., Ltd.) composed of three portions attached to the tool were converted into electrical voltage signals and recorded on a recorder. Next, these signals were converted into cutting resistance (principal cutting force, feed force, thrust force, N). In the machining test, in order to suppress influence from wear on the insert, each sample was measured four times by reciprocating A→B→C→ . . . C→B→A twice. The cutting resistance can be obtained from the following expression.

Cutting Resistance(Combined Force comprising Principal cutting force, Feed Force, and Thrust Force)=((Principal Cutting Force)²+(Feed Force)²+(Thrust Force)²)^(1/2)

Incidentally, each sample was measured four times, and their average value was adopted. Assuming that the cutting resistance of a commercially available free-cutting brass bar, C3604, made of an alloy including 59 mass % Cu, 3 mass % Pb, 0.2 mass % Fe, 0.3 mass % Sn, and Zn as the balance was 100, the relative value of the cutting resistance (machinability index) of each sample was calculated for relative evaluation. The higher the machinability index, the better the machinability. "Three force components" refers to a combined force comprising a principal cutting force, a feed force, and a thrust force, which represents the machinability index.

Machinability index was calculated as follows.

An index representing the results of the machining test performed on a sample(machinability index)=(cutting resistance of C3604/cutting resistance of the sample)×100

Concurrently, chips were collected, and machinability was evaluated based on the shape of the chips. Problems that occur in actual machining are entanglement of chips around the tool and bulking of chips. Therefore, regarding chip shape, if the average length of the generated chips was less than 4 mm, it was evaluated as "○" (good). If the average length of the generated chips was 4 mm or more and less than 10 mm, it was determined that machining could be performed although there might be some practical problems and evaluated as "Δ" (fair). When the average length of the generated chips was 10 mm or longer, it was evaluated as "X" (poor). Chips generated at the beginning of machining were excluded from the subject of the evaluation. Those evaluated as either "○" or "Δ" under the aforementioned turning conditions were regarded as acceptable in embodiments of the present invention.

Cutting resistance of a material depends on the shear strength and the tensile strength of the material, and there is a tendency that the higher the strength of the material, the higher the cutting resistance. In the case of a high strength material, if the cutting resistance is approximately 40% points higher than that of a free-cutting brass bar including 1% to 4 mass % Pb, the cutting resistance is considered to be practically good. The shear strength of an extruded material according to an embodiment of the present invention is about 1.2 times that of C3604, a free-cutting brass including 3 mass % Pb. Therefore, machinability of embodiments of the present invention was evaluated providing that 70 was the standard machinability index. As excellent machinability is aimed at in the embodiments, when the machinability index was 84 or higher, the alloy was evaluated to have excellent machinability (evaluation symbol: "@"). When the machinability index was 75 or higher and lower than 84, the alloy was evaluated to have good machinability (evaluation symbol: "◯"). When the machinability index was 68 or higher and lower than 75, the alloy was evaluated to have fair machinability (evaluation symbol: "Δ") as having reached the standard for the most part. When the machinability index was lower than 68, the alloy was evaluated to have poor machinability (evaluation symbol: "X").

When there is no difference in strength, there is a correlation between chip shape and machinability index. That is, if the machinability index of an alloy is high, the alloy's chip breakability tends to be good, and this correlation can be numerically expressed. Those evaluated as "@", "◯" or "Δ" under the aforementioned turning conditions were regarded as acceptable.

Incidentally, the machinability index of an alloy comprising 58.1 mass % Cu, 0.01 mass % Pb, and Zn as the balance, which is a free-cutting copper alloy having a high Zn concentration and including 0.01 mass % Pb and about 50% β phase, was 39, and the alloy's chip length was longer than 10 mm. Likewise, the machinability index of an alloy comprising 55 mass % Cu, 0.01 mass % Pb, and Zn as the balance, which is a β single-phase copper alloy not including Si and including 0.01 mass % Pb, was 41, and the alloy's chip length was longer than 10 mm.

Figure 2:
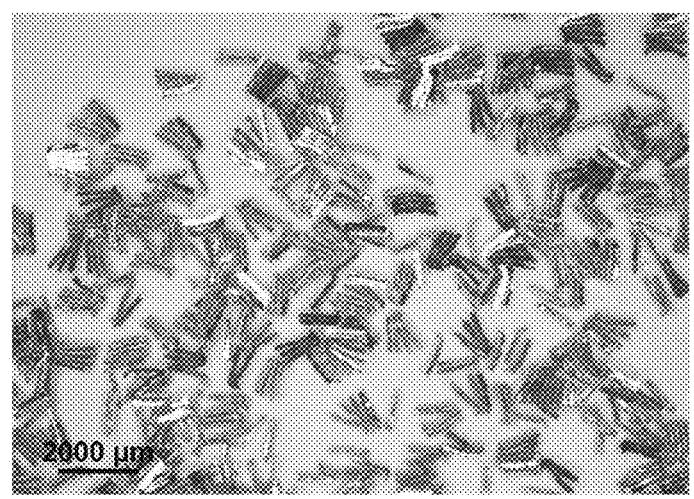
FIG. 2 is a picture of a chip collected after machining test No. T09.

In Test No. T09 (Alloy No. S01), hot-forging was performed on an alloy comprising 63.1 mass % Cu, 1.13 mas % Si, 0.07 mass % Bi, 0.053 mass % Pb, and 0.047 mass % P at 640° C., and Bi particles were present in α phase, and P-containing compounds were present in the resultant alloy. The external appearance of the chips generated in Test No. T09 (Alloy No. S01) is shown in FIG. 2. The chips produced in Test No. T09 (Alloy No. S01) were finely broken with their average length being shorter than 1 mm.

<Drilling Test>

By using a drilling machine with a JIS standard drill made of high-speed steel having a diameter of 3.5 mm attached, 10 mm-deep holes were drilled on dry conditions at a rotation speed of 1250 rpm and a feed rate of 0.17 mm/rev. Voltage fluctuation in a circumferential direction and an axial direction were measured during drilling using an AST tool dynamometer, and torque and thrust during drilling were calculated. Each sample was measured four times, and their average value was adopted. Assuming that the torque and the thrust of C3604, a commercially available free-cutting brass bar comprising 59 mass % Cu, 3 mass % Pb, 0.2 mass % Fe, 0.3 mass % Sn, and Zn as the balance, was 100, the relative values (torque index, thrust index) of the torque and the thrust of each sample were calculated for relative evaluation. The higher the machinability index (torque index, thrust index, drill index), the better the machinability. In the drilling, in order to suppress influence from wear on the drill, each sample was measured four times by reciprocating A→B→C→ . . . C→B→A twice.

That is, the machinability index was obtained as follows.

Index representing the results of drilling test performed on a sample(drill index)=(torque index+thrust index)/2

Torque index of a sample=(torque of C3604/torque of Sample)×100

Thrust index of Sample=(thrust of C3604/thrust of sample)×100

During the third test, chips were collected. Machinability was evaluated based on the chip shape. Problems that occur in actual machining are entanglement of chips around the tool and bulking of chips. Therefore, regarding chip shape, if the average number of windings per chip was one or less, it was evaluated as "◯" (good). If the average number of windings per chip was more than one and two or less, it was evaluated as "Δ" (fair) determining that drilling could be performed although there might be some practical problems. If the average number of windings per chip was more than two, it was evaluated as "X" (poor). Chips generated at the beginning of drilling were excluded from the subject of the evaluation. Those evaluated as either "◯" or "Δ" under the above-mentioned drilling conditions were regarded as acceptable.

If the torque and the thrust of a high-strength material are higher than the cutting resistance of a free-cutting brass bar including 1% to 4 mass % Pb by about 40% points, the material is considered to be practically good regarding torque and thrust. In embodiments of the present invention, the machinability was evaluated providing that 70% was the standard machinability index. Specifically, when the drill index was 76 or higher, the machinability was evaluated to be excellent (evaluation symbol: @; excellent). When the drill index was 71 or higher and lower than 76, the machinability was evaluated to be good (evaluation symbol: ◯; good). When the drill index was 68 or higher and lower than 71, the machinability was evaluated to be fair (evaluation symbol: Δ; fair) determining that it has reached the standard for the most part and drilling could be performed although there might be some practical problems. When the drill index was lower than 68, the machinability was evaluated to be unacceptable (evaluation symbol: X; poor). Those evaluated as either "@" or "◯" under the aforementioned drilling conditions were regarded as acceptable. Providing that the machinability index (drill index) as well as the torque index and the thrust index were 67 or higher, those evaluated as "Δ" were also regarded as acceptable.

When there is no difference in strength, chip shape and torque index have a strong relationship. When torque index is high, chip breakability tends to be high. Therefore, chip shape can be numerically compared by torque index. In an alloy according to an embodiment of the present invention, the shear strength, which is more or less proportional to the tensile strength, is about 1.2 times that of a free-cutting brass including 3 mass % Pb. Since cutting resistance has a strong relationship with shear strength, it is necessary to take the material's strength into consideration.

Incidentally, the drill index of an alloy comprising 58.1 mass % Cu, 0.01 mass % Pb, and Zn as the balance, which is a free-cutting copper alloy having a high Zn concentration and including 0.01 mass % Pb and about 50% β phase, was 49 (the torque index was 46, and the thrust index was 52), and the number of windings per chip exceeded 3. Likewise, the drill index of a β single-phase copper alloy comprising 55 mass % Cu, 0.01 mass % Pb, and Zn as the balance, which is an alloy not including Si and including 0.01 mass % Pb, was 61 (the torque index was 53, and the thrust index was 68), and the number of windings per chip exceeded 3.

Regarding tools dedicated to precision drilling, with the recent accelerated trend toward reduction in the size of various devices and components, drilling tiny holes on such components is increasingly required. For example, there are a wide range of needs for tools such as those for drilling pin holes in a metal mold, tiny holes in a thread extruder mold, holes in a component of a device relating to a semiconductor such as a printed circuit board or to an optical device. A reduction in the size of various industrial products such as home information appliances, medical devices, and automobile components is expected to be increasingly accelerated. In this trend, drill manufacturers are attempting to expand the lineup of carbide drills having a diameter of 0.1 mm or less. In the past, the ratio between the diameter and the depth of a hole to be drilled was limited to about 10. However, recently, a number of drills that are capable of drilling a hole whose ratio between its diameter and depth is approximately 100 even if the diameter of the hole is 0.5 mm or less have emerged. Now that the potential of small and deep hole drilling has been expanded by such drills, materials having excellent machinability are in demand in this field.

(Hot Working Test)

The bars of Steps Nos. A1, C1, and C10 (Step No. F1), the cast material of Step No. D1 (Step No. F3), and Alloy No. SI, a commercially available alloy, were machined to a diameter of 15 mm and a length of 25 mm. The test materials were held at 600° C. for 20 minutes. Subsequently, the test materials were vertically placed and compressed to a thickness of 5 mm using an Amsler testing machine having a hot compression capacity of 10 tons equipped with an electric furnace at a strain rate of 0.02/sec and a working ratio of 80%. During the hot working, the test material was held at 600° C.

Hot deformability was evaluated based on whether any cracks that were visible with bare eyes were present and whether there were any large corrugation formed on the surface. Although depending on the capability of the facility used or the hot working ratio such as an extrusion ratio applied, 30 N/mm$^2$ is a boundary value of hot deformation resistance up to which hot extruded bars that are commonly manufactured can be produced without any problem. If no cracking occurred, no large corrugation was formed, and hot deformation resistance was 30 N/mm$^2$ or lower in a hot working test performed at 600° C., hot workability evaluation was "○" (good). If either hot deformability or hot deformation resistance did not satisfy the above-described standards, hot workability evaluation was "Δ" (fair) with some reservations. If neither hot deformability nor hot deformation resistance satisfied the above-described standards, hot workability evaluation was "X" (poor). The evaluation results are shown in Table 36.

Hot extrusion or hot forging at 600° C. is rarely performed on a common copper alloy. In a test of a free-cutting copper alloy including Pb at 600° C., cracking occurs, and hot deformation resistance exceeds 30 N/mm$^2$. By performing hot working at a low temperature, high strength, superb balance between high strength and elongation, and excellent machinability can be obtained, and improvement of dimensional accuracy and an increase in tool life can be realized, which in turn is eco-friendly.

When the value of the composition relational expression f1 was lower than 56.3, a large corrugation was formed. When the value of the composition relational expression f1 was higher than 59.5, deformation resistance exceeded 30 N/mm$^2$.

TABLE 9

| Alloy No. | Component Composition (mass %) | | | | | | Impurities (mass %) | | | | | | | | | | f1 | f2 |
|---|---|---|---|---|---|---|---|---|---|---|---|---|---|---|---|---|---|---|
| | Cu | Si | P | Pb | Bi | Zn | Fe | Mn | Co | Cr | Sn | Al | Ni | Sb | Ag | MM | | |
| S01 | 63.1 | 1.13 | 0.047 | 0.053 | 0.073 | Balance | 0.08 | 0.02 | 0.00 | 0.01 | 0.08 | 0.03 | 0.07 | 0.01 | 0.01 | 0.00 | 57.8 | 0.126 |
| S02 | 61.9 | 0.98 | 0.071 | 0.062 | 0.035 | Balance | 0.06 | 0.01 | 0.00 | 0.00 | 0.11 | 0.00 | 0.02 | 0.00 | 0.02 | 0.00 | 57.3 | 0.097 |
| S11 | 62.7 | 1.17 | 0.097 | 0.089 | 0.078 | Balance | 0.00 | 0.00 | 0.00 | 0.00 | 0.00 | 0.00 | 0.00 | 0.00 | 0.00 | 0.00 | 57.2 | 0.167 |
| S12 | 63.4 | 1.12 | 0.052 | 0.057 | 0.036 | Balance | 0.06 | 0.02 | 0.01 | 0.00 | 0.06 | 0.01 | 0.04 | 0.02 | 0.01 | 0.00 | 58.2 | 0.093 |
| S12.1 | 63.4 | 1.12 | 0.050 | 0.060 | 0.035 | Balance | 0.19 | 0.07 | 0.01 | 0.00 | 0.06 | 0.01 | 0.04 | 0.02 | 0.01 | 0.00 | 58.2 | 0.095 |
| S12.2 | 63.3 | 1.11 | 0.053 | 0.058 | 0.037 | Balance | 0.30 | 0.07 | 0.01 | 0.00 | 0.06 | 0.01 | 0.04 | 0.02 | 0.01 | 0.00 | 58.1 | 0.095 |
| S12.3 | 63.5 | 1.11 | 0.052 | 0.057 | 0.035 | Balance | 0.30 | 0.22 | 0.01 | 0.00 | 0.06 | 0.01 | 0.04 | 0.02 | 0.01 | 0.00 | 58.3 | 0.092 |
| S12.4 | 63.5 | 1.13 | 0.054 | 0.056 | 0.037 | Balance | 0.06 | 0.02 | 0.01 | 0.00 | 0.18 | 0.09 | 0.04 | 0.02 | 0.01 | 0.00 | 58.2 | 0.093 |
| S12.5 | 63.4 | 1.13 | 0.051 | 0.057 | 0.035 | Balance | 0.06 | 0.02 | 0.01 | 0.00 | 0.29 | 0.09 | 0.04 | 0.02 | 0.01 | 0.00 | 58.1 | 0.092 |
| S12.6 | 63.5 | 1.13 | 0.051 | 0.059 | 0.034 | Balance | 0.06 | 0.02 | 0.01 | 0.00 | 0.36 | 0.15 | 0.04 | 0.02 | 0.01 | 0.00 | 58.2 | 0.093 |
| S13 | 61.8 | 1.10 | 0.126 | 0.125 | 0.088 | Balance | 0.00 | 0.00 | 0.00 | 0.00 | 0.00 | 0.00 | 0.11 | 0.00 | 0.00 | 0.02 | 56.7 | 0.213 |
| S14 | 61.7 | 0.88 | 0.046 | 0.090 | 0.068 | Balance | 0.02 | 0.00 | 0.00 | 0.00 | 0.00 | 0.00 | 0.00 | 0.00 | 0.00 | 0.00 | 57.6 | 0.158 |
| S15 | 60.0 | 0.51 | 0.066 | 0.132 | 0.048 | Balance | 0.00 | 0.00 | 0.00 | 0.00 | 0.00 | 0.00 | 0.00 | 0.00 | 0.00 | 0.00 | 57.7 | 0.180 |
| S16 | 63.8 | 0.98 | 0.083 | 0.078 | 0.086 | Balance | 0.00 | 0.00 | 0.00 | 0.00 | 0.00 | 0.00 | 0.00 | 0.00 | 0.00 | 0.00 | 59.2 | 0.164 |
| S17 | 64.4 | 1.13 | 0.075 | 0.073 | 0.055 | Balance | 0.07 | 0.05 | 0.00 | 0.00 | 0.00 | 0.00 | 0.00 | 0.00 | 0.00 | 0.00 | 59.1 | 0.128 |
| S17.1 | 64.3 | 1.13 | 0.076 | 0.073 | 0.056 | Balance | 0.07 | 0.05 | 0.00 | 0.00 | 0.20 | 0.09 | 0.04 | 0.00 | 0.02 | 0.00 | 59.0 | 0.129 |
| S17.2 | 64.4 | 1.14 | 0.073 | 0.075 | 0.054 | Balance | 0.07 | 0.05 | 0.00 | 0.00 | 0.38 | 0.12 | 0.04 | 0.00 | 0.02 | 0.00 | 59.1 | 0.129 |
| S18 | 63.6 | 1.22 | 0.051 | 0.003 | 0.058 | Balance | 0.02 | 0.10 | 0.00 | 0.01 | 0.01 | 0.05 | 0.00 | 0.02 | 0.00 | 0.00 | 57.9 | 0.061 |
| S19 | 59.3 | 0.36 | 0.068 | 0.090 | 0.085 | Balance | 0.01 | 0.00 | 0.00 | 0.00 | 0.00 | 0.00 | 0.00 | 0.00 | 0.00 | 0.00 | 57.7 | 0.175 |

Note:
"mm" refers to mischmetal.

TABLE 10

| Alloy No. | Component Composition (mass %) | | | | | | Impurities (mass %) | | | | | | | | | | f1 | f2 |
|---|---|---|---|---|---|---|---|---|---|---|---|---|---|---|---|---|---|---|
| | Cu | Si | P | Pb | Bi | Zn | Fe | Mn | Co | Cr | Sn | Al | Ni | Sb | Ag | MM | | |
| S20 | 61.8 | 0.94 | 0.131 | 0.165 | 0.065 | Balance | 0.00 | 0.00 | 0.00 | 0.00 | 0.01 | 0.00 | 0.00 | 0.00 | 0.00 | 0.00 | 57.4 | 0.230 |
| S21 | 61.9 | 0.85 | 0.039 | 0.089 | 0.050 | Balance | 0.07 | 0.00 | 0.01 | 0.00 | 0.11 | 0.00 | 0.00 | 0.00 | 0.00 | 0.00 | 58.0 | 0.139 |
| S22 | 62.3 | 0.82 | 0.043 | 0.045 | 0.032 | Balance | 0.09 | 0.00 | 0.00 | 0.00 | 0.05 | 0.00 | 0.06 | 0.00 | 0.01 | 0.00 | 58.5 | 0.077 |
| S22.1 | 62.4 | 0.83 | 0.042 | 0.045 | 0.031 | Balance | 0.09 | 0.18 | 0.00 | 0.00 | 0.05 | 0.00 | 0.06 | 0.00 | 0.01 | 0.00 | 58.5 | 0.076 |
| S22.2 | 62.2 | 0.82 | 0.046 | 0.047 | 0.033 | Balance | 0.09 | 0.39 | 0.00 | 0.00 | 0.05 | 0.00 | 0.06 | 0.00 | 0.01 | 0.00 | 58.4 | 0.080 |
| S23 | 63.1 | 0.98 | 0.066 | 0.071 | 0.050 | Balance | 0.00 | 0.00 | 0.00 | 0.00 | 0.00 | 0.00 | 0.00 | 0.00 | 0.00 | 0.00 | 58.5 | 0.121 |
| S24 | 61.4 | 0.77 | 0.009 | 0.061 | 0.025 | Balance | 0.00 | 0.00 | 0.00 | 0.00 | 0.00 | 0.00 | 0.00 | 0.00 | 0.00 | 0.00 | 57.8 | 0.086 |
| S25 | 61.3 | 0.65 | 0.031 | 0.100 | 0.077 | Balance | 0.00 | 0.00 | 0.00 | 0.00 | 0.00 | 0.00 | 0.00 | 0.00 | 0.00 | 0.00 | 58.3 | 0.177 |
| S26 | 60.5 | 0.59 | 0.025 | 0.144 | 0.072 | Balance | 0.00 | 0.00 | 0.00 | 0.00 | 0.08 | 0.03 | 0.01 | 0.00 | 0.01 | 0.00 | 57.8 | 0.216 |
| S26.1 | 60.4 | 0.59 | 0.024 | 0.144 | 0.073 | Balance | 0.14 | 0.13 | 0.00 | 0.00 | 0.08 | 0.03 | 0.01 | 0.00 | 0.01 | 0.00 | 57.7 | 0.217 |
| S26.2 | 60.5 | 0.60 | 0.026 | 0.146 | 0.071 | Balance | 0.25 | 0.25 | 0.00 | 0.00 | 0.08 | 0.03 | 0.01 | 0.00 | 0.01 | 0.00 | 57.8 | 0.217 |
| S27 | 64.2 | 1.19 | 0.066 | 0.057 | 0.035 | Balance | 0.00 | 0.00 | 0.00 | 0.00 | 0.00 | 0.00 | 0.00 | 0.00 | 0.00 | 0.00 | 58.6 | 0.092 |
| S28 | 59.9 | 0.58 | 0.046 | 0.045 | 0.044 | Balance | 0.02 | 0.06 | 0.01 | 0.01 | 0.03 | 0.00 | 0.00 | 0.00 | 0.00 | 0.01 | 57.2 | 0.089 |
| S29 | 59.1 | 0.52 | 0.102 | 0.050 | 0.045 | Balance | 0.00 | 0.00 | 0.00 | 0.00 | 0.00 | 0.00 | 0.00 | 0.00 | 0.00 | 0.00 | 56.7 | 0.095 |
| S30 | 59.5 | 0.40 | 0.066 | 0.083 | 0.048 | Balance | 0.05 | 0.01 | 0.00 | 0.00 | 0.06 | 0.02 | 0.00 | 0.00 | 0.00 | 0.00 | 57.7 | 0.131 |
| S30.1 | 59.5 | 0.40 | 0.068 | 0.084 | 0.046 | Balance | 0.05 | 0.01 | 0.00 | 0.00 | 0.11 | 0.18 | 0.00 | 0.00 | 0.00 | 0.00 | 57.7 | 0.130 |
| S30.2 | 59.6 | 0.41 | 0.066 | 0.086 | 0.047 | Balance | 0.05 | 0.01 | 0.00 | 0.00 | 0.33 | 0.18 | 0.00 | 0.00 | 0.00 | 0.00 | 57.7 | 0.133 |
| S31 | 64.1 | 1.03 | 0.075 | 0.062 | 0.079 | Balance | 0.00 | 0.00 | 0.00 | 0.00 | 0.00 | 0.00 | 0.00 | 0.00 | 0.00 | 0.00 | 59.3 | 0.141 |
| S32 | 63.2 | 0.96 | 0.066 | 0.020 | 0.023 | Balance | 0.00 | 0.00 | 0.00 | 0.00 | 0.00 | 0.00 | 0.00 | 0.00 | 0.00 | 0.00 | 58.7 | 0.043 |
| S33 | 62.2 | 0.93 | 0.005 | 0.008 | 0.031 | Balance | 0.00 | 0.00 | 0.00 | 0.00 | 0.00 | 0.00 | 0.00 | 0.00 | 0.00 | 0.00 | 57.8 | 0.039 |
| S34 | 62.9 | 0.85 | 0.099 | 0.034 | 0.045 | Balance | 0.08 | 0.07 | 0.02 | 0.01 | 0.09 | 0.05 | 0.03 | 0.01 | 0.01 | 0.01 | 58.9 | 0.079 |

Note:
"mm" refers to mischmetal.

TABLE 11

| Alloy No. | Component Composition (mass %) | | | | | | Impurities (mass %) | | | | | | | | | | f1 | f2 |
|---|---|---|---|---|---|---|---|---|---|---|---|---|---|---|---|---|---|---|
| | Cu | Si | P | Pb | Ni | Zn | Fe | Mn | Co | Cr | Sn | Al | Ni | Sb | Ag | MM | | |
| S51 | 60.0 | 0.88 | 0.076 | 0.005 | 0.028 | Balance | 0.00 | 0.00 | 0.00 | 0.00 | 0.00 | 0.00 | 0.00 | 0.00 | 0.00 | 0.00 | 55.8 | 0.033 |
| S52 | 60.3 | 0.51 | 0.000 | 0.085 | 0.053 | Balance | 0.05 | 0.00 | 0.00 | 0.00 | 0.05 | 0.00 | 0.00 | 0.00 | 0.00 | 0.00 | 58.0 | 0.138 |
| S53 | 58.9 | 0.24 | 0.099 | 0.080 | 0.094 | Balance | 0.03 | 0.02 | 0.00 | 0.00 | 0.03 | 0.00 | 0.05 | 0.03 | 0.02 | 0.00 | 57.8 | 0.174 |
| S54 | 63.0 | 0.65 | 0.100 | 0.112 | 0.081 | Balance | 0.00 | 0.00 | 0.01 | 0.00 | 0.00 | 0.02 | 0.00 | 0.00 | 0.00 | 0.00 | 60.0 | 0.193 |
| S55 | 63.5 | 0.95 | 0.033 | 0.010 | 0.022 | Balance | 0.00 | 0.00 | 0.00 | 0.00 | 0.00 | 0.00 | 0.00 | 0.00 | 0.00 | 0.00 | 59.0 | 0.032 |
| S56 | 64.8 | 1.22 | 0.139 | 0.011 | 0.005 | Balance | 0.00 | 0.00 | 0.00 | 0.00 | 0.11 | 0.00 | 0.00 | 0.00 | 0.00 | 0.00 | 59.0 | 0.016 |
| S57 | 65.4 | 1.29 | 0.065 | 0.031 | 0.031 | Balance | 0.07 | 0.00 | 0.00 | 0.00 | 0.00 | 0.00 | 0.00 | 0.00 | 0.00 | 0.00 | 59.3 | 0.062 |
| S58 | 65.5 | 1.40 | 0.077 | 0.040 | 0.025 | Balance | 0.00 | 0.00 | 0.00 | 0.00 | 0.00 | 0.00 | 0.00 | 0.00 | 0.00 | 0.00 | 58.9 | 0.065 |
| S59 | 59.4 | 0.36 | 0.014 | 0.047 | 0.030 | Balance | 0.00 | 0.00 | 0.00 | 0.00 | 0.00 | 0.00 | 0.00 | 0.00 | 0.00 | 0.00 | 57.7 | 0.077 |
| S60 | 63.2 | 0.85 | 0.139 | 0.041 | 0.021 | Balance | 0.06 | 0.00 | 0.00 | 0.00 | 0.04 | 0.00 | 0.00 | 0.00 | 0.00 | 0.00 | 59.2 | 0.062 |
| S61 | 62.1 | 0.61 | 0.025 | 0.097 | 0.036 | Balance | 0.00 | 0.00 | 0.00 | 0.00 | 0.00 | 0.00 | 0.00 | 0.00 | 0.00 | 0.00 | 59.3 | 0.133 |
| S62 | 61.0 | 1.11 | 0.114 | 0.142 | 0.098 | Balance | 0.00 | 0.00 | 0.00 | 0.00 | 0.00 | 0.00 | 0.00 | 0.00 | 0.00 | 0.00 | 55.8 | 0.240 |
| S63 | 59.9 | 0.44 | 0.001 | 0.063 | 0.008 | Balance | 0.04 | 0.00 | 0.00 | 0.00 | 0.07 | 0.00 | 0.00 | 0.00 | 0.00 | 0.00 | 57.9 | 0.071 |
| S64 | 61.4 | 0.57 | 0.012 | 0.059 | 0.025 | Balance | 0.05 | 0.00 | 0.00 | 0.00 | 0.05 | 0.00 | 0.00 | 0.00 | 0.00 | 0.00 | 58.8 | 0.084 |
| S65 | 58.5 | 0.08 | 0.015 | 0.010 | 0.247 | Balance | 0.00 | 0.00 | 0.00 | 0.00 | 0.00 | 0.00 | 0.00 | 0.00 | 0.00 | 0.00 | — | 0.257 |
| S66 | 62.7 | 0.52 | 0.062 | 0.197 | 0.045 | Balance | 0.00 | 0.00 | 0.02 | 0.00 | 0.02 | 0.00 | 0.00 | 0.00 | 0.00 | 0.00 | 60.3 | 0.242 |
| SI | 58.8 | 0.00 | 0.001 | 2.10 | 0.008 | Balance | 0.27 | 0.01 | 0.02 | 0.00 | 0.29 | 0.00 | 0.08 | 0.01 | 0.00 | 0.00 | — | 2.110 |

Note:
"MM" refers to mischmetal.

TABLE 12

Step A: Production step with the facility used for manufacturing commercial products
(direct extrusion)

| Step No. | Hot Extrusion Diameter of Extruded Material (mm) | Hot Extrusion Temperature (° C.) | Hot Extrusion Cooling Rate* (° C./min) | Cold Drawing and Straightness Correction Working Ratio (%) | Low-Temperature Annealing Temperature (° C.) | Low-Temperature Annealing Time (min) | f9 | Note |
|---|---|---|---|---|---|---|---|---|
| A1 | 25.6 | 580 | 30 | 0 | — | — | — | |
| A2 | 25.6 | 580 | 30 | 4.6 | — | — | — | |
| A3 | 25.6 | 620 | 40 | 4.6 | — | — | — | |
| A4 | 25.6 | 680 | 30 | 4.6 | — | — | — | |
| A5 | 25.6 | 620 | 70 | 4.6 | — | — | — | |
| A6 | 25.6 | 580 | 30 | 4.6 | 310 | 100 | 1100 | Low-temperature annealing was performed on the material of A1 |
| A10 | 45.0 | 570 | 20 | — | — | — | — | To Step F (forging material) |

*Cooling rate from 530° C. to 450° C.

TABLE 13

Step C: Extrusion in a Laboratory

| Step No. | Hot Extrusion Diameter of Extruded Material (mm) | Hot Extrusion Temperature (° C.) | Hot Extrusion Cooling Rate* (° C./min) | Cold Working Working Ratio (%) | Low-Temperature Annealing Temperature (° C.) | Low-Temperature Annealing Time (min) | f9 | Note |
|---|---|---|---|---|---|---|---|---|
| C1 | 24 | 590 | 25 | 0 | — | — | — | |
| C2 | 24 | 620 | 25 | 0 | — | — | — | |
| C3 | 24 | 590 | 25 | 0 | 320 | 60 | 930 | Low-temperature annealing was performed on the material of C1 |
| C4 | 24 | 680 | 25 | 0 | — | — | — | |
| C5 | 24 | 620 | 65 | 0 | — | — | — | |
| C10 | 45 | 590 | 20 | — | — | — | — | To Step F (forging material) |

*Cooling rate from 530° C. to 450° C.

TABLE 14

| | Step D: Casting (production of castings with a forging material) | | |
|---|---|---|---|
| Step No. | Diameter (mm) | Cooling Rate* (° C./min) | Note |
| D1 | 45 | 40 | To Step F (forging material) |

*Cooling rate from 530° C. to 450° C.

TABLE 15

| | | | Step E1: Laboratory (bar) | | | | | |
|---|---|---|---|---|---|---|---|---|
| | | Diameter | Cold Drawing 1 | | | | Cold Drawing 2 | |
| | Material | of | Diameter | | | | Diameter | |
| | (preced- | Extruded | of Drawn | Working | Annealing | | of Drawn | Working |
| Step No. | ing step) | Material (mm) | Material (mm) | Ratio (%) | Temperature (° C.) | Time (min) | Material (mm) | Ratio (%) |
| E1 | A1 | 25.6 | 21.6 | 29 | 480 | 60 | 20.5 | 10 |

TABLE 16

| | | Step E2: Laboratory (rolled material) | | | | | | | |
|---|---|---|---|---|---|---|---|---|---|
| | | Hot Rolling | | Cold Rolling 1 | | | | Cold Rolling 2 | |
| | Material | Thickness | | Thickness | | | | Thickness | |
| | (preced- | of Rolled | Cooling | of Rolled | Working | Annealing | | of Rolled | Working |
| Step No. | ing step) | Material (mm) | Rate* (° C./min) | Material (mm) | Ratio (%) | Temperature (° C.) | Time (min) | Material (mm) | Ratio (%) |
| E2 | casting | 15 | 20 | 10 | 33 | 480 | 60 | 9 | 10 |

*Cooling rate from 530° C. to 450° C.

TABLE 17

| | | Step F: Hot forging | | | | | |
|---|---|---|---|---|---|---|---|
| | Material | Hot Forging | | Low-Temperature Annealing | | | |
| | (preced- | | Cooling | | | | |
| Step No. | ing step) | Temperature (° C.) | Rate* (° C./min) | Temperature (° C.) | Time (min) | f9 | Note |
| F1 | A10, C10 | 640 | 10 | — | — | — | |
| F2 | A10, C10 | 600 | 28 | — | — | — | |
| F3 | D1 | 625 | 28 | — | — | — | |
| F4 | A10, C10 | 640 | 10 | 340 | 25 | 700 | Low-temperature annealing was performed on the material of F1 |
| F5 | A10, C10 | 690 | 28 | — | — | — | |
| F6 | A10, C10 | 640 | 70 | — | — | — | |

*Cooling rate from 530° C. to 450° C.

TABLE 18

| Test No. | Alloy No. | Step No. | f3 | f4 | f5 | f6 | f7 | Presence of Bi in α Phase | P Compound | Shape of α Phase | Concentration of Si in β phase (mass %) |
|---|---|---|---|---|---|---|---|---|---|---|---|
| T01 | S01 | A1 | 53 | 47 | 0 | 12.3 | 2.26 | ○ | ○ | ○ | 1.3 |
| T02 |  | A2 | 53 | 47 | 0 | 12.3 | 2.26 | ○ | ○ | ○ | — |
| T03 |  | A3 | 49 | 51 | 0 | 12.7 | 2.37 | ○ | ○ | ○ | — |
| T04 |  | A4 | 46 | 54 | 0 | 12.9 | 2.45 | ○ | ○ | Δ | — |
| T05 |  | A5 | 44 | 56 | 0 | 13.1 | 2.50 | ○ | Δ | ○ | 1.3 |
| T06 |  | A6 | 59 | 39 | 1.9 | 12.2 | 2.02 | ○ | ○ | ○ | — |
| T07 |  | E1 | 59 | 41 | 0 | 11.7 | 2.08 | ○ | ○ | ○ | 1.5 |
| T08 |  | E2 | 60 | 40 | 0 | 11.6 | 2.05 | ○ | ○ | ○ | — |
| T09 |  | F1 | 54 | 46 | 0 | 12.2 | 2.23 | ○ | ○ | ○ | — |
| T10 |  | F2 | 55 | 45 | 0 | 12.1 | 2.20 | ○ | ○ | ○ | 1.4 |
| T11-1 |  | F3 | 53 | 47 | 0 | 12.3 | 2.26 | ○ | ○ | ○ | — |
| T11-2 |  | F4 | 58 | 40 | 1.6 | 12.2 | 2.05 | ○ | ○ | ○ | — |
| T12 |  | F5 | 46 | 54 | 0 | 12.9 | 2.45 | ○ | ○ | Δ | — |
| T13 |  | F6 | 45 | 55 | 0 | 13.0 | 2.48 | ○ | Δ | ○ | — |

TABLE 19

| Test No. | Alloy No. | Step No. | Electrical Conductivity (% IACS) | Tensile Strength (N/mm²) | Elongation (%) | f8 |
|---|---|---|---|---|---|---|
| T01 | S01 | A1 | 15.3 | 520 | 32 | 686 |
| T02 |  | A2 | 15.3 | 557 | 27 | 707 |
| T03 |  | A3 | 15.5 | 538 | 26 | 678 |
| T04 |  | A4 | 15.6 | 533 | 25 | 666 |
| T05 |  | A5 | 15.7 | 571 | 24 | 708 |
| T06 |  | A6 | 15.5 | 562 | 23 | 691 |
| T07 |  | E1 | 15.2 | 630 | 17 | 737 |
| T08 |  | E2 | 15.2 | — | — | — |
| T09 |  | F1 | 15.4 | 517 | 35 | 698 |
| T10 |  | F2 | 15.4 | 537 | 34 | 720 |
| T11-1 |  | F3 | 15.4 | 525 | 32 | 693 |
| T11-2 |  | F4 | 15.4 | 535 | 29 | 690 |
| T12 |  | F5 | 15.5 | 514 | 31 | 673 |
| T13 |  | F6 | 15.5 | 540 | 28 | 691 |

TABLE 20

| Test No. | Alloy No. | Step No. | Lathe Chips | Three Component Forces | Drill Chips | Drill Torque Index | Drill Thrust Index | Drill Index |
|---|---|---|---|---|---|---|---|---|
| T01 | S01 | A1 | ○ | 89 | ○ | 77 | 77 | 77 |
| T02 |  | A2 | ○ | 89 | ○ | 77 | 78 | 78 |
| T03 |  | A3 | ○ | 89 | ○ | 77 | 76 | 77 |
| T04 |  | A4 | ○ | 86 | ○ | 74 | 77 | 76 |
| T05 |  | A5 | ○ | 85 | ○ | 74 | 77 | 76 |
| T06 |  | A6 | ○ | 88 | ○ | 79 | 75 | 77 |
| T07 |  | E1 | ○ | 86 | ○ | 75 | 76 | 76 |
| T08 |  | E2 | — | — | ○ | 74 | 76 | 75 |
| T09 |  | F1 | ○ | 88 | ○ | 76 | 79 | 78 |
| T10 |  | F2 | ○ | 89 | ○ | 78 | 77 | 78 |
| T11-1 |  | F3 | ○ | 89 | ○ | 77 | 78 | 78 |
| T11-2 |  | F4 | ○ | 88 | ○ | 79 | 75 | 77 |
| T12 |  | F5 | ○ | 86 | ○ | 76 | 77 | 77 |
| T13 |  | F6 | ○ | 85 | ○ | 74 | 77 | 76 |

TABLE 21

| Test No. | Alloy No. | Step No. | f3 | f4 | f5 | f6 | f7 | Presence of Bi in α Phase | P Compound | Shape of α Phase | Concentration of Si in β phase (mass %) |
|---|---|---|---|---|---|---|---|---|---|---|---|
| T21 | S02 | A1 | 46 | 54 | 0 | 12.1 | 1.98 | ○ | ○ | ○ | 1.2 |
| T22 |  | A2 | 47 | 53 | 0 | 12.0 | 1.96 | ○ | ○ | ○ | — |
| T23 |  | A3 | 43 | 57 | 0 | 12.4 | 2.04 | ○ | ○ | ○ | — |
| T24 |  | A4 | 39 | 61 | 0 | 12.7 | 2.12 | ○ | ○ | x | — |
| T25 |  | A5 | 40 | 60 | 0 | 12.6 | 2.10 | ○ | Δ | ○ | — |
| T26 |  | A6 | 48 | 52 | 0 | 12.0 | 1.94 | ○ | ○ | ○ | — |
| T27 |  | E1 | 55 | 45 | 0 | 11.3 | 1.78 | ○ | ○ | ○ | — |
| T28 |  | F1 | 47 | 53 | 0 | 12.0 | 1.96 | ○ | ○ | ○ | — |
| T29 |  | F2 | 49 | 51 | 0 | 11.9 | 1.92 | ○ | ○ | ○ | 1.3 |
| T30 |  | F3 | 46 | 54 | 0 | 12.1 | 1.98 | ○ | ○ | ○ | — |
| T31 |  | F4 | 48 | 51 | 0.6 | 12.3 | 1.92 | ○ | ○ | ○ | — |
| T32 |  | F6 | 39 | 61 | 0 | 12.7 | 2.12 | ○ | Δ | ○ | — |

TABLE 22

| Test No. | Alloy No. | Step No. | Electrical Conductivity (% IACS) | Tensile Strength (N/mm²) | Elongation (%) | f8 |
|---|---|---|---|---|---|---|
| T21 | S02 | A1 | 16.8 | 530 | 30 | 689 |
| T22 | | A2 | 16.8 | 567 | 26 | 714 |
| T23 | | A3 | 17.0 | 564 | 25 | 705 |
| T24 | | A4 | 17.1 | 533 | 24 | 661 |
| T25 | | A5 | 16.9 | 576 | 23 | 708 |
| T26 | | A6 | 16.9 | 573 | 25 | 716 |
| T27 | | E1 | 16.8 | 627 | 16 | 727 |
| T28 | | F1 | 16.9 | 516 | 32 | 681 |
| T29 | | F2 | 16.9 | 540 | 34 | 724 |
| T30 | | F3 | 16.9 | 524 | 32 | 692 |
| T31 | | F4 | 17.0 | 535 | 29 | 690 |
| T32 | | F6 | 17.0 | 533 | 29 | 688 |

TABLE 23

| Test No. | Alloy No. | Step No. | Lathe Chips | Three Component Forces | Drill Chips | Torque Index | Thrust Index | Drill Index |
|---|---|---|---|---|---|---|---|---|
| T21 | S02 | A1 | ○ | 88 | ○ | 77 | 76 | 77 |
| T22 | | A2 | ○ | 89 | ○ | 76 | 77 | 77 |
| T23 | | A3 | ○ | 88 | ○ | 76 | 76 | 76 |
| T24 | | A4 | ○ | 84 | ○ | 73 | 75 | 74 |
| T25 | | A5 | ○ | 83 | ○ | 72 | 76 | 74 |
| T26 | | A6 | ○ | 87 | ○ | 77 | 75 | 76 |
| T27 | | E1 | ○ | 86 | ○ | 76 | 75 | 76 |
| T28 | | F1 | ○ | 88 | ○ | 76 | 76 | 76 |
| T29 | | F2 | ○ | 89 | ○ | 78 | 77 | 78 |
| T30 | | F3 | ○ | 87 | ○ | 77 | 76 | 77 |
| T31 | | F4 | ○ | 87 | ○ | 78 | 75 | 77 |
| T32 | | F6 | ○ | 84 | ○ | 74 | 75 | 75 |

TABLE 24

| Test No. | Alloy No. | Step No. | f3 | f4 | f5 | f6 | f7 | Presence of Bi in α Phase | P Compound | Shape of α Phase | Concentration of Si in β phase (mass %) |
|---|---|---|---|---|---|---|---|---|---|---|---|
| T101 | S11 | C1 | 44 | 56 | 0 | 14.3 | 2.94 | ○ | ○ | ○ | 1.4 |
| T102 | S12 | C1 | 60 | 40 | 0 | 11.1 | 1.75 | ○ | ○ | ○ | 1.4 |
| T103 | S12.1 | C1 | 62 | 38 | 0 | 10.9 | 1.71 | ○ | ○ | ○ | — |
| T104 | S12.2 | C1 | 63 | 37 | 0 | 10.8 | 1.68 | ○ | ○ | ○ | 1.3 |
| T105 | S12.3 | C1 | 67 | 33 | 0 | 10.3 | 1.54 | ○ | ○ | ○ | 1.2 |
| T106 | S12.4 | C1 | 59 | 41 | 0 | 11.3 | 1.79 | ○ | ○ | ○ | 1.4 |
| T107 | S12.5 | C1 | 61 | 37 | 1.6 | 11.4 | 1.67 | ○ | ○ | ○ | — |
| T108 | S12.6 | C1 | 67 | 29 | 3.9 | 10.8 | 1.44 | ○ | ○ | ○ | 1.2 |
| T109 | S13 | C1 | 30 | 70 | 0 | 15.9 | 3.65 | ○ | ○ | ○ | 1.3 |
| T110 | S14 | C1 | 48 | 52 | 0 | 12.1 | 2.34 | ○ | ○ | ○ | 1.1 |
| T111 | S14 | C2 | 44 | 56 | 0 | 12.4 | 2.44 | ○ | ○ | ○ | — |
| T112 | S14 | C3 | 48 | 52 | 0 | 12.1 | 2.34 | ○ | ○ | ○ | — |
| T113 | S14 | C4 | 40 | 60 | 0 | 12.7 | 2.54 | ○ | ○ | Δ | 1.0 |
| T114 | S14 | C5 | 42 | 58 | 0 | 12.6 | 2.49 | ○ | Δ | ○ | — |
| T115 | S15 | C1 | 47 | 53 | 0 | 10.7 | 1.83 | ○ | ○ | ○ | 0.6 |
| T116 | S16 | C1 | 78 | 22 | 0 | 9.8 | 1.46 | ○ | ○ | ○ | 1.4 |
| T117 | S17 | C1 | 78 | 21 | 0.8 | 9.9 | 1.35 | ○ | ○ | ○ | 1.4 |
| T118 | S17 | C3 | 80 | 17 | 2.8 | 9.6 | 1.14 | ○ | ○ | ○ | — |

TABLE 25

| Test No. | Alloy No. | Step No. | Electrical Conductivity (% IACS) | Tensile Strength (N/mm$^2$) | Elongation (%) | f8 |
|---|---|---|---|---|---|---|
| T101 | S11 | C1 | 14.9 | 538 | 26 | 678 |
| T102 | S12 | C1 | 15.4 | 511 | 33 | 680 |
| T103 | S12.1 | C1 | 15.2 | 512 | 31 | 671 |
| T104 | S12.2 | C1 | 15.1 | 514 | 28 | 658 |
| T105 | S12.3 | C1 | 14.9 | 499 | 24 | 619 |
| T106 | S12.4 | C1 | 15.3 | 510 | 32 | 673 |
| T107 | S12.5 | C1 | 15.1 | 504 | 26 | 635 |
| T108 | S12.6 | C1 | 15.1 | 477 | 17 | 558 |
| T109 | S13 | C1 | 16.1 | 545 | 19 | 649 |
| T110 | S14 | C1 | 17.8 | 533 | 27 | 677 |
| T111 | S14 | C2 | 17.9 | 542 | 26 | 683 |
| T112 | S14 | C3 | 17.8 | 530 | 26 | 668 |
| T113 | S14 | C4 | 18.0 | 511 | 27 | 649 |
| T114 | S14 | C5 | 17.9 | 548 | 26 | 690 |
| T115 | S15 | C1 | 21.1 | 490 | 30 | 637 |
| T116 | S16 | C1 | 16.0 | 467 | 37 | 640 |
| T117 | S17 | C1 | 14.6 | 495 | 33 | 658 |
| T118 | S17 | C3 | 14.8 | 487 | 25 | 609 |

TABLE 26

| Test No. | Alloy No. | Step No. | Lathe Chips | Three Component Forces | Drill Chips | Torque Index | Thrust Index | Drill Index |
|---|---|---|---|---|---|---|---|---|
| T101 | S11 | C1 | ○ | 90 | ○ | 78 | 78 | 78 |
| T102 | S12 | C1 | ○ | 85 | ○ | 74 | 75 | 75 |
| T103 | S12.1 | C1 | ○ | 84 | ○ | 73 | 75 | 74 |
| T104 | S12.2 | C1 | ○ | 82 | Δ | 71 | 74 | 73 |
| T105 | S12.3 | C1 | Δ | 76 | x | 67 | 73 | 70 |
| T106 | S12.4 | C1 | ○ | 84 | ○ | 75 | 74 | 75 |
| T107 | S12.5 | C1 | ○ | 83 | ○ | 75 | 69 | 72 |
| T108 | S12.6 | C1 | Δ | 78 | Δ | 72 | 65 | 69 |
| T109 | S13 | C1 | ○ | 92 | ○ | 80 | 79 | 80 |
| T110 | S14 | C1 | ○ | 89 | ○ | 78 | 76 | 77 |
| T111 | S14 | C2 | ○ | 87 | ○ | 77 | 77 | 77 |
| T112 | S14 | C3 | ○ | 88 | ○ | 78 | 75 | 77 |
| T113 | S14 | C4 | ○ | 85 | ○ | 74 | 76 | 75 |
| T114 | S14 | C5 | ○ | 84 | ○ | 73 | 76 | 75 |
| T115 | S15 | C1 | ○ | 83 | ○ | 74 | 75 | 75 |
| T116 | S16 | C1 | ○ | 81 | ○ | 72 | 74 | 73 |
| T117 | S17 | C1 | ○ | 80 | ○ | 75 | 71 | 73 |
| T118 | S17 | C3 | Δ | 79 | ○ | 76 | 69 | 73 |

TABLE 27

| Test No. | Alloy No. | Step No. | f3 | f4 | f5 | f6 | f7 | Presence of Bi in α Phase | P Compound | Shape of α Phase | Concentration of Si in β phase (mass %) |
|---|---|---|---|---|---|---|---|---|---|---|---|
| T119 | S17.1 | C1 | 80 | 18 | 1.9 | 9.7 | 1.20 | ○ | ○ | ○ | — |
| T120 | S17.2 | C1 | 83 | 13 | 3.8 | 8.9 | 0.89 | ○ | ○ | ○ | 1.2 |
| T121 | S18 | F1 | 56 | 44 | 0 | 11.3 | 1.56 | ○ | ○ | ○ | 1.5 |
| T122 | S18 | F2 | 58 | 42 | 0 | 11.1 | 1.52 | ○ | ○ | ○ | — |
| T123 | S18 | F3 | 55 | 45 | 0 | 11.4 | 1.58 | ○ | ○ | ○ | 1.5 |
| T124 | S18 | F4 | 61 | 35 | 3.6 | 11.2 | 1.36 | ○ | ○ | ○ | — |
| T125 | S18 | F5 | 49 | 51 | 0 | 12.0 | 1.71 | ○ | ○ | Δ | 1.5 |
| T126 | S18 | F6 | 51 | 49 | 0 | 11.8 | 1.67 | ○ | Δ | ○ | — |
| T127 | S19 | C1 | 49 | 51 | 0 | 9.5 | 1.41 | ○ | ○ | ○ | 0.5 |
| T128 | S20 | C1 | 47 | 53 | 0 | 14.0 | 2.97 | ○ | ○ | ○ | 1.1 |
| T129 | S21 | C1 | 56 | 44 | 0 | 11.0 | 1.95 | ○ | ○ | ○ | 1.1 |
| T130 | S21 | C2 | 53 | 47 | 0 | 11.2 | 2.03 | ○ | ○ | ○ | — |
| T131 | S21 | C5 | 50 | 50 | 0 | 11.5 | 2.10 | ○ | X | ○ | — |
| T132 | S22 | F1 | 62 | 38 | 0 | 9.4 | 1.29 | ○ | ○ | ○ | 1.1 |
| T133 | S22.1 | F1 | 64 | 36 | 0 | 9.3 | 1.25 | ○ | ○ | ○ | — |
| T134 | S22.2 | F1 | 70 | 30 | 0 | 8.7 | 1.14 | ○ | ○ | ○ | 1.0 |
| T135 | S23 | C1 | 63 | 37 | 0 | 10.9 | 1.77 | ○ | ○ | ○ | 1.3 |

TABLE 28

| Test No. | Alloy No. | Step No. | Electrical Conductivity (% IACS) | Tensile Strength (N/mm$^2$) | Elongation (%) | f8 |
|---|---|---|---|---|---|---|
| T119 | S17.1 | C1 | 14.7 | 490 | 27 | 622 |
| T120 | S17.2 | C1 | 14.6 | 475 | 18 | 561 |
| T121 | S18 | F1 | 14.0 | 532 | 33 | 708 |
| T122 | S18 | F2 | 14.0 | 542 | 34 | 726 |
| T123 | S18 | F3 | 14.1 | 535 | 31 | 701 |
| T124 | S18 | F4 | 14.0 | 523 | 19 | 622 |
| T125 | S18 | F5 | 14.2 | 516 | 30 | 671 |
| T126 | S18 | F6 | 14.0 | 540 | 29 | 697 |
| T127 | S19 | C1 | 22.6 | 457 | 30 | 594 |
| T128 | S20 | C1 | 16.8 | 533 | 26 | 672 |
| T129 | S21 | C1 | 17.7 | 508 | 33 | 676 |
| T130 | S21 | C2 | 17.7 | 514 | 31 | 673 |
| T131 | S21 | C5 | 17.8 | 519 | 30 | 675 |
| T132 | S22 | F1 | 18.0 | 490 | 35 | 662 |
| T133 | S22.1 | F1 | 17.9 | 494 | 34 | 662 |
| T134 | S22.2 | F1 | 17.5 | 497 | 26 | 626 |
| T135 | S23 | C1 | 16.4 | 500 | 35 | 675 |

TABLE 29

| Test No. | Alloy No. | Step No. | Lathe Three Component Chips | Lathe Three Component Forces | Drill Chips | Drill Torque Index | Drill Thrust Index | Drill Drill Index |
|---|---|---|---|---|---|---|---|---|
| T119 | S17.1 | C1 | Δ | 78 | ○ | 75 | 68 | 72 |
| T120 | S17.2 | C1 | X | 69 | X | 68 | 63 | 66 |
| T121 | S18 | F1 | ○ | 86 | ○ | 74 | 75 | 75 |
| T122 | S18 | F2 | ○ | 87 | ○ | 74 | 76 | 75 |
| T123 | S18 | F3 | ○ | 85 | ○ | 73 | 75 | 74 |
| T124 | S18 | F4 | ○ | 85 | ○ | 78 | 70 | 74 |
| T125 | S18 | F5 | ○ | 83 | ○ | 72 | 74 | 73 |
| T126 | S18 | F6 | ○ | 82 | ○ | 72 | 73 | 73 |
| T127 | S19 | C1 | ○ | 77 | ○ | 70 | 75 | 73 |
| T128 | S20 | C1 | ○ | 91 | ○ | 78 | 79 | 79 |
| T129 | S21 | C1 | ○ | 86 | ○ | 75 | 76 | 76 |
| T130 | S21 | C2 | ○ | 86 | ○ | 74 | 76 | 75 |
| T131 | S21 | C5 | Δ | 81 | ○ | 70 | 73 | 72 |
| T132 | S22 | F1 | ○ | 80 | ○ | 73 | 73 | 73 |
| T133 | S22.1 | F1 | ○ | 77 | ○ | 71 | 72 | 72 |
| T134 | S22.2 | F1 | X | 69 | X | 65 | 68 | 67 |
| T135 | S23 | C1 | ○ | 85 | ○ | 74 | 75 | 75 |

TABLE 30

| Test No. | Alloy No. | Step No. | f3 | f4 | f5 | f6 | f7 | Presence of Bi in α Phase | P Compound | Shape of α Phase | Concentration of Si in β phase (mass %) |
|---|---|---|---|---|---|---|---|---|---|---|---|
| T136 | S24 | C1 | 55 | 45 | 0 | 9.4 | 1.46 | ○ | Δ | ○ | 1.0 |
| T137 | S25 | C1 | 63 | 37 | 0 | 9.9 | 1.70 | ○ | ○ | ○ | 0.9 |
| T138 | S26 | C1 | 54 | 46 | 0 | 10.6 | 2.02 | ○ | ○ | ○ | 0.7 |
| T139 | S26.1 | C1 | 57 | 43 | 0 | 10.4 | 1.95 | ○ | ○ | ○ | — |
| T140 | S26.2 | C1 | 63 | 37 | 0 | 10.1 | 1.80 | ○ | ○ | ○ | 0.6 |
| T141 | S27 | C1 | 65 | 35 | 0 | 10.9 | 1.66 | ○ | ○ | ○ | 1.5 |
| T142 | S28 | F1 | 46 | 54 | 0 | 9.7 | 1.40 | ○ | ○ | ○ | 0.7 |
| T143 | S28 | F2 | 47 | 53 | 0 | 9.6 | 1.39 | ○ | ○ | ○ | — |
| T144 | S28 | F3 | 45 | 55 | 0 | 9.8 | 1.42 | ○ | ○ | ○ | — |
| T145 | S28 | F6 | 39 | 61 | 0 | 10.1 | 1.50 | ○ | Δ | ○ | — |
| T146 | S29 | C2 | 31 | 69 | 0 | 10.8 | 1.56 | ○ | ○ | Δ | 0.6 |
| T147 | S30 | F1 | 49 | 51 | 0 | 9.2 | 1.30 | ○ | ○ | ○ | 0.5 |
| T148 | S30.1 | F1 | 47 | 53 | 0 | 9.3 | 1.33 | ○ | ○ | ○ | — |
| T149 | S30.2 | F1 | 50 | 49 | 0.8 | 9.7 | 1.31 | ○ | ○ | ○ | — |
| T150 | S31 | C1 | 82 | 18 | 0 | 8.9 | 1.19 | ○ | ○ | ○ | 1.5 |
| T151 | S32 | C1 | 69 | 31 | 0 | 8.8 | 0.92 | ○ | ○ | ○ | 1.3 |
| T152 | S33 | F1 | 54 | 46 | 0 | 9.1 | 1.09 | ○ | Δ | ○ | 1.1 |
| T153 | S34 | C1 | 76 | 24 | 0 | 8.6 | 0.99 | ○ | ○ | ○ | 1.2 |

TABLE 31

| Test No. | Alloy No. | Step No. | Electrical Conductivity (% IACS) | Tensile Strength (N/mm$^2$) | Elongation (%) | f8 |
|---|---|---|---|---|---|---|
| T136 | S24 | C1 | 18.4 | 506 | 33 | 673 |
| T137 | S25 | C1 | 19.7 | 483 | 34 | 647 |
| T138 | S26 | C1 | 20.3 | 490 | 31 | 642 |
| T139 | S26.1 | C1 | 20.2 | 494 | 29 | 637 |
| T140 | S26.2 | C1 | 19.8 | 497 | 23 | 611 |
| T141 | S27 | C1 | 14.3 | 514 | 37 | 704 |
| T142 | S28 | F1 | 20.4 | 508 | 29 | 655 |
| T143 | S28 | F2 | 20.4 | 520 | 29 | 671 |
| T144 | S28 | F3 | 20.5 | 511 | 27 | 649 |
| T145 | S28 | F6 | 20.4 | 526 | 27 | 668 |
| T146 | S29 | C2 | 21.3 | 503 | 21 | 609 |
| T147 | S30 | F1 | 22.2 | 472 | 30 | 614 |
| T148 | S30.1 | F1 | 22.2 | 464 | 26 | 585 |
| T149 | S30.2 | F1 | 22.1 | 452 | 19 | 538 |
| T150 | S31 | C1 | 15.5 | 447 | 39 | 621 |
| T151 | S32 | C1 | 16.5 | 489 | 37 | 670 |
| T152 | S33 | F1 | 16.9 | 513 | 33 | 682 |
| T153 | S34 | C1 | 17.8 | 463 | 38 | 639 |

TABLE 32

| Test No. | Alloy No. | Step No. | Lathe Chips | Three Component Forces | Drill Chips | Torque Index | Thrust Index | Drill Index |
|---|---|---|---|---|---|---|---|---|
| T136 | S24 | C1 | Δ | 79 | ○ | 71 | 73 | 72 |
| T137 | S25 | C1 | ○ | 82 | ○ | 74 | 75 | 75 |
| T138 | S26 | C1 | ○ | 83 | ○ | 74 | 76 | 75 |
| T139 | S26.1 | C1 | ○ | 81 | ○ | 72 | 75 | 74 |
| T140 | S26.2 | C1 | X | 74 | X | 67 | 70 | 69 |
| T141 | S27 | C1 | ○ | 85 | ○ | 74 | 76 | 75 |
| T142 | S28 | F1 | ○ | 82 | ○ | 72 | 73 | 73 |
| T143 | S28 | F2 | ○ | 83 | ○ | 73 | 73 | 73 |
| T144 | S28 | F3 | ○ | 81 | ○ | 74 | 72 | 73 |
| T145 | S28 | F6 | ○ | 79 | Δ | 71 | 71 | 71 |
| T146 | S29 | C2 | ○ | 83 | ○ | 74 | 73 | 74 |
| T147 | S30 | F1 | ○ | 79 | ○ | 72 | 73 | 73 |
| T148 | S30.1 | F1 | ○ | 77 | ○ | 72 | 71 | 72 |
| T149 | S30.2 | F1 | X | 68 | X | 69 | 64 | 67 |
| T150 | S31 | C1 | ○ | 77 | ○ | 72 | 72 | 72 |
| T151 | S32 | C1 | ○ | 76 | Δ | 69 | 73 | 71 |
| T152 | S33 | F1 | Δ | 75 | ○ | 70 | 72 | 71 |
| T153 | S34 | C1 | Δ | 74 | ○ | 70 | 71 | 71 |

TABLE 33

| Test No. | Alloy No. | Step No. | Metallographic Structure | | | | | Presence of Bi in α Phase | P Compound | Shape of α Phase | Concentration of Si in β phase (mass %) |
|---|---|---|---|---|---|---|---|---|---|---|---|
| | | | f3 | f4 | f5 | f6 | f7 | | | | |
| T201 | S51 | C1 | 13 | 87 | 0 | 12.6 | 1.39 | ○ | ○ | X | — |
| T202 | S52 | C1 | 57 | 43 | 0 | — | 1.42 | ○ | X | ○ | — |
| T203 | S53 | C1 | 53 | 47 | 0 | 8.6 | 0.98 | ○ | ○ | ○ | 0.3 |
| T204 | S53 | F1 | 51 | 49 | 0 | 8.6 | 1.01 | ○ | ○ | ○ | — |
| T205 | S54 | C1 | 88 | 12 | 0 | 7.9 | 0.72 | ○ | ○ | ○ | 1.0 |
| T206 | S55 | C1 | 74 | 26 | 0 | 7.4 | 0.70 | ○ | ○ | ○ | — |
| T207 | S55 | F1 | 73 | 27 | 0 | 7.6 | 0.71 | ○ | ○ | ○ | — |
| T208 | S56 | C1 | 77 | 22 | 1.0 | 8.5 | 0.48 | X | ○ | ○ | — |
| T209 | S57 | C1 | 82 | 15 | 2.6 | 8.2 | 0.76 | ○ | ○ | ○ | — |
| T210 | S57 | C3 | 85 | 9 | 5.5 | 6.7 | 0.38 | ○ | ○ | ○ | — |
| T211 | S58 | C1 | 81 | 14 | 4.8 | 8.6 | 0.76 | ○ | ○ | ○ | — |
| T212 | S59 | C1 | 51 | 49 | 0 | 7.3 | 0.90 | ○ | ○ | ○ | — |
| T213 | S59 | F1 | 49 | 51 | 0 | 7.4 | 0.93 | ○ | ○ | ○ | — |
| T214 | S60 | C1 | 77 | 23 | 0 | 8.5 | 0.85 | ○ | ○ | ○ | — |
| T215 | S61 | C1 | 80 | 20 | 0 | 7.5 | 0.93 | ○ | ○ | ○ | — |
| T216 | S62 | C1 | 14 | 86 | 0 | 17.3 | 4.36 | ○ | ○ | X | 1.2 |
| T217 | S63 | C1 | 55 | 45 | 0 | 6.9 | 0.94 | X | X | ○ | — |
| T218 | S64 | C1 | 71 | 29 | 0 | 7.2 | 0.92 | ○ | ○ | ○ | — |
| T219 | S65 | C1 | 55 | 45 | 0 | — | — | X | Δ | ○ | 0.1 |
| T220 | S66 | F1 | 90 | 10 | 0 | 7.5 | 0.55 | ○ | ○ | ○ | 0.8 |
| T221 | SI | Market item | — | — | — | — | — | — | — | — | — |

TABLE 34

| Test No. | Alloy No. | Step No. | Electrical Conductivity (% IACS) | Tensile Strength (N/mm²) | Elongation (%) | f8 |
|---|---|---|---|---|---|---|
| T201 | S51 | C1 | 18.7 | 565 | 14 | 644 |
| T202 | S52 | C1 | 21.4 | 480 | 32 | 634 |
| T203 | S53 | C1 | 23.7 | 433 | 30 | 563 |
| T204 | S53 | F1 | 23.7 | 438 | 31 | 574 |
| T205 | S54 | C1 | 19.0 | 423 | 40 | 592 |
| T206 | S55 | C1 | 16.8 | 473 | 36 | 643 |
| T207 | S55 | F1 | 16.9 | 478 | 37 | 655 |
| T208 | S56 | C1 | 14.1 | 469 | 33 | 624 |
| T209 | S57 | C1 | 13.3 | 517 | 24 | 641 |
| T210 | S57 | C3 | 13.5 | 511 | 17 | 598 |
| T211 | S58 | C1 | 12.7 | 504 | 15 | 580 |
| T212 | S59 | C1 | 22.5 | 458 | 31 | 600 |
| T213 | S59 | F1 | 22.5 | 461 | 33 | 613 |
| T214 | S60 | C1 | 17.9 | 444 | 37 | 608 |
| T215 | S61 | C1 | 20.3 | 433 | 40 | 606 |
| T216 | S62 | C1 | 16.2 | 571 | 11 | 634 |
| T217 | S63 | C1 | 21.7 | 470 | 32 | 620 |
| T218 | S64 | C1 | 20.7 | 456 | 35 | 616 |
| T219 | S65 | C1 | 25.6 | 420 | 33 | 559 |
| T220 | S66 | F1 | 20.3 | 409 | 41 | 577 |
| T221 | SI | Market item | — | — | — | — |

TABLE 35

| | | | Lathe | | Drill | | | |
|---|---|---|---|---|---|---|---|---|
| Test No. | Alloy No. | Step No. | Chips | Three Component Forces | Chips | Torque Index | Thrust Index | Drill Index |
| T201 | S51 | C1 | ○ | 88 | ○ | 74 | 77 | 76 |
| T202 | S52 | C1 | X | 65 | X | 64 | 68 | 66 |
| T203 | S53 | C1 | X | 67 | Δ | 68 | 71 | 70 |
| T204 | S53 | F1 | X | 68 | X | 66 | 72 | 69 |
| T205 | S54 | C1 | X | 63 | X | 63 | 66 | 65 |
| T206 | S55 | C1 | X | 68 | X | 66 | 71 | 69 |
| T207 | S55 | F1 | X | 70 | X | 67 | 72 | 70 |
| T208 | S56 | C1 | X | 65 | Δ | 71 | 68 | 70 |
| T209 | S57 | C1 | X | 69 | Δ | 71 | 64 | 68 |
| T210 | S57 | C3 | X | 64 | X | 69 | 62 | 66 |
| T211 | S58 | C1 | X | 68 | Δ | 73 | 66 | 70 |
| T212 | S59 | C1 | X | 68 | X | 67 | 71 | 69 |
| T213 | S59 | F1 | X | 70 | X | 69 | 71 | 70 |
| T214 | S60 | C1 | Δ | 71 | X | 68 | 71 | 70 |
| T215 | S61 | C1 | X | 68 | X | 67 | 69 | 68 |
| T216 | S62 | C1 | ○ | 92 | ○ | 79 | 80 | 80 |
| T217 | S63 | C1 | X | 61 | X | 63 | 68 | 66 |
| T218 | S64 | C1 | X | 67 | X | 65 | 68 | 67 |
| T219 | S65 | C1 | X | 53 | X | 56 | 62 | 59 |
| T220 | S66 | F1 | X | 58 | X | 61 | 63 | 62 |
| T221 | SI | Market item | — | — | — | — | — | — |

TABLE 36

| Test No. | Alloy No. | Step No. | Hot Workability |
|---|---|---|---|
| T01 | S01 | A1 | ○ |
| T21 | S02 | A1 | ○ |
| T30 | S02 | F3 | ○ |
| T101 | S11 | C1 | ○ |
| T102 | S12 | C1 | ○ |
| T109 | S13 | C1 | ○ |
| T110 | S14 | C1 | ○ |
| T115 | S15 | C1 | ○ |
| T116 | S16 | C1 | ○ |
| T117 | S17 | C1 | ○ |
| T121 | S18 | F1 | ○ |
| T123 | S18 | F3 | ○ |
| T127 | S19 | C1 | ○ |
| T128 | S20 | C1 | ○ |
| T129 | S21 | C1 | ○ |
| T132 | S22 | F1 | ○ |
| T135 | S23 | C1 | ○ |
| T136 | S24 | C1 | ○ |
| T137 | S25 | C1 | ○ |
| T138 | S26 | C1 | ○ |
| T141 | S27 | C1 | ○ |
| T142 | S28 | F1 | ○ |
| T147 | S30 | F1 | ○ |
| T150 | S31 | C1 | ○ |
| T151 | S32 | C1 | ○ |
| T152 | S33 | F1 | ○ |
| T201 | S51 | C1 | Δ |
| T202 | S52 | C1 | ○ |
| T203 | S53 | C1 | ○ |
| T205 | S54 | C1 | Δ |
| T206 | S55 | C1 | ○ |
| T208 | S56 | C1 | ○ |
| T212 | S59 | C1 | ○ |
| T214 | S60 | C1 | ○ |
| T215 | S61 | C1 | ○ |
| T216 | S62 | C1 | Δ |
| T217 | S63 | C1 | ○ |
| T218 | S64 | C1 | ○ |
| T220 | S66 | F1 | Δ |
| T221 | SI | Market item | X |

From the above-described measurement results, the following findings were obtained.

1) By satisfying a composition according to an embodiment of the present invention, the composition relational expressions f1 and f2, the metallographic structure relational expressions f3 to f5, and the composition and metallographic structure relational expressions f6 and f7 as well as presence of Bi particles in α phase, excellent machinability can be obtained even if the contents of Pb and Bi are small, and a hot-worked material (a hot extruded material or a hot forged material) having good hot workability at about 600° C., high electrical conductivity of 14% IACS or higher, high strength, good ductility, and superb balance between strength and ductility (characteristic relational expression f8) can be obtained (Alloys Nos. S01, S02, and S11 to S34).

2) When the Cu content was 65.0 mass % or higher, the amount of γ phase was large, the elongation was low, and machinability was poor (Alloys Nos. S57 and S58).

3) When the Si content was lower than 0.3 mass %, the machinability was poor, and the tensile strength was low. When the Si content was increased to higher than 0.5 mass %, and further, higher than 0.7 mass %, the machinability and mechanical characteristics improved. When the Si content was 1.3 mass % or higher, the amount of γ phase was large, and the elongation was low (for example, Alloys Nos. S14, S28, S53, and S58).

4) When P was not included, the machinability was poor. When P was contained in an amount exceeding 0.001 mass %, the machinability was good. When the P content exceeded 0.010 mass %, the machinability further improved. When a P-containing compound was present and was able to be observed with a metallographic microscope, yet further improved machinability was obtained. It is presumed that inclusion of P and the presence of P-containing compound improved the machinability of β phase and also improved the machinability of the alloy (for example, Alloys Nos. S01, S02, S24, S33, S52, and S63).

5) When the Bi content was higher than 0.020 mass %, the Pb content was higher than 0.001 mass %, and the total content of Bi and Pb (f2) was higher than 0.025 mass %, the machinability was satisfactory. When the Bi content was higher than 0.030 mass %, the Pb content was 0.003 mass % or higher, and the total content of Bi and Pb (f2) was 0.04 mass % or higher, the machinability was more satisfactory (Alloys Nos. S01, S02, and S11 to S34). When the Bi content was 0.020 mass % or lower and f2 was lower than 0.025, the machinability was poor (Alloy No. S56).

6) It was verified that, even if inevitable impurities are included in an amount actually included in a commercially manufactured alloy, there is no significant influence on the properties (Alloys Nos. S12, S17, S22, S26, and S30). It is presumed that when Fe, Mn, Co, or Cr is contained in an amount exceeding the preferable range of inevitable impurities, intermetallic compounds comprising Fe, Mn, or the like and Si are formed. As a result, it is presumed that the machinability deteriorated due to the presence of compounds comprising Fe or the like and Si, a decrease in the concentration of Si that was acting effectively on machinability, and a possible change in the composition of P-containing compounds (Alloys Nos. S12.3, S22.2, and S26.2). It is presumed that when Sn and Al are contained in an amount exceeding the preferable range of inevitable impurities, γ phase appears or increases and β phase decreases, or the behaviors of β phase and γ phase change. Consequently, the elongation value decreased, the balance index f8 decreased, and the machinability deteriorated (Alloys Nos. S12.6, S17.2, and S30.2).

7) When Bi particles were present in α phase, the machinability was excellent (for example, Alloys Nos. S01 and S02). Even if the Bi content was higher than 0.020 mass %, when Bi particles were not present in α phase, the machinability was poor. It is presumed that whether or not Bi particles are present in α phase relates to the Si content and the Bi content in the alloy (Alloys Nos. S56, S63, and S65).

8) When the composition relational expression f1 was lower than 56.5, the elongation value was low. When f1 was higher than 59.5, the machinability was poor, and the tensile strength was low. In both of the cases, the hot workability at 600° C. was poor (Alloys Nos. S51, S54, S62, and S66).

9) When f3 was 85 or higher or f4 was 15 or lower, the machinability was poor, and the tensile strength and the balance index f8 were low. When f3 was lower than 20 or f4 was higher than 80, the elongation was low. When f3 was 30 or higher and 75 or lower, or f4 was 25 or higher and 70 or lower, the machinability was improved, the tensile strength and elongation were higher, and the balance index f8 was higher. In particular, when f4 was 35 or higher and further 40 or higher, the machinability was further improved (Alloys Nos. S11 to S34 and S51 to S65).

10) When the amount of γ phase, or f5, was 5 or higher, the elongation was low, and the machinability was poor (Alloy No. S57). When f5 was lower than 3, the elongation was better, and the torque machinability index was improved (Alloys Nos. S01 and S02).

11) When the value of f6 was lower than 8.0, the machinability was poor. When the value of f6 was higher than 17.0, the elongation was low. When the value of f7 was lower than 0.9, the machinability was poor. When the value of f7 was higher than 4.0, the elongation was low. Even if the requirements regarding the composition and f1, f2, and f3 to f5 were satisfied, unless both f6 and f7 were satisfied, there was a problem in machinability. When f6 was 10.0 or higher and f7 was 1.2 or higher, the machinability was further improved (Alloys Nos. S01, s02, S11 to S34, S53, S56, and 59 to 64).

12) Even if γ phase was not included and the area ratio of β phase was about 40% to about 50%, when f6 was 10.0 or higher and f7 was 1.2 or higher, the machinability of Alloy H, a β single-phase alloy, was maintained or improved (for example, Alloys Nos. S01, S14, S18, S20, S21, and S23).

13) When the Si concentration in β phase was 0.4 mass % or higher, machinability was better, and when Si concentration in β phase was 0.6 mass % or higher, and further 1.0 mass % or higher, the machinability was even better. There was a slight difference in Si concentration in β phase between alloys depending on production conditions or the amount of inevitable impurities even if the compositions of the alloys were the same (Alloy Nos. S01, S02, and S11 to S34).

14) Regarding the shape of α phase, when the proportion of granular α phase crystal grains whose longer side/shorter side ratio is 4 or lower in all the α phase crystal grains was 75% or higher, the tensile strength, elongation, and f8 were high, and the machinability was good (Alloys Nos. S01, S02, S11 to S34, S51, and S62).

15) When the composition and f1 to f7 were satisfied, the tensile strength was 440 N/mm$^2$ or higher, and the balance index f8 was 580 or higher. When f1 to f7 were in the preferable ranges, in most of the alloys, the tensile strength was 480 N/mm$^2$ or higher, and the balance index f8 was 620 or higher (Alloys Nos. S01, S02, and S11 to S34).

16) In the materials that were cold-drawn at a working ratio of 4.6% after hot working (Steps Nos. A2 to A6) and the materials that were cold-worked and heat-treated after hot working then cold-worked at a cold working ratio of 10% (Steps Nos. E1 and E2), the mechanical characteristics satisfied the following properties when the cold working ratio was represented by [R]%. The tensile strength S (N/mm$^2$) was (440+8×[R]) N/mm$^2$ or higher, the elongation E (%) was $(0.02\times[R]^2-1.15\times[R]+18)$ % or higher, exhibiting high strength and excellent elongation (Alloys Nos. S01 and S02).

17) When hot working conditions including cooling conditions changed, the proportions of β phase and γ phase changed, which affected machinability, tensile strength, elongation, and electrical conductivity (for example, Alloy No. S01, the respective steps).

18) When the average cooling rate in a temperature range from 530° C. to 450° C. during cooling after hot extrusion or hot forging was 50° C./min or lower, presence of P-containing compound was able to be observed. An alloy whose evaluation regarding P-containing compound was "○" had better machinability than one whose evaluation regarding P-containing compound was "Δ" (the respective steps).

19) When low-temperature annealing was performed on a bar that had been hot-extruded then cold-drawn such that the value of the heat treatment conditional expression f9 became 1100, a bar which was not much bent with a measurement of bend being 0.1 mm or less per meter was obtained. Depending on low-temperature annealing conditions, γ phase precipitated. When the amount of γ phase was appropriate, the torque index was improved (Alloy No. S01 and Step No. A6).

As described above, free-cutting copper alloys in which the contents of the respective additive elements, the composition relational expressions f1 and f2, and the metallographic structure relational expressions f3 to f5, and the composition and metallographic structure relational expressions f6 and f7 are in appropriate ranges like embodiments of the present invention have excellent hot workability (in hot extrusion and hot forging), and their machinability and mechanical characteristics are also good. Free-cutting copper alloys according to an embodiment of the present invention can obtain excellent properties by adjusting production conditions in hot extrusion and hot forging as well as heat treatment conditions to appropriate ranges.

INDUSTRIAL APPLICABILITY

Free-cutting copper alloys according to an embodiment of the present invention have excellent machinability and hot workability, high strength, and excellent balance between strength and elongation although the amounts of Pb and Bi contained are small. Therefore, free-cutting copper alloys according to an embodiment of the present invention are suitable for automobile components, electrical and electronic apparatus components, mechanical components, stationaries, toys, sliding components, measuring instrument components, precision mechanical components, medical components, drink-related devices and components, devices and components for water drainage, industrial plumbing components, and components relating to liquid or gas such as drinking water, industrial water, drainage water, or hydrogen.

Specifically, free-cutting copper alloys according to an embodiment of the present invention are suitably applicable as a material that constitutes the items used in the above-mentioned fields which go by the names including valve, joint, cock, faucet, gear, axle, bearing, shaft, sleeve, spindle, sensor, bolt, nut, flare nut, pen point, insert nut, cap nut, nipple, spacer, and screw.

What is claimed is:
1. A free-cutting copper alloy comprising:
higher than 58.0 mass % and lower than 65.0 mass % of Cu;
higher than 0.30 mass % and lower than 1.30 mass % of Si;
higher than 0.001 mass % and lower than or equal to 0.20 mass % of Pb;
higher than 0.020 mass % and lower than or equal to 0.10 mass % of Bi; and
higher than 0.001 mass % and lower than 0.20 mass % of P,
with the balance being Zn and inevitable impurities,
wherein among the inevitable impurities, a total content of Fe, Mn, Co, and Cr is lower than 0.45 mass % and a total content of Sn and Al is lower than 0.45 mass %,
when a Cu content is represented by [Cu] mass %, a Si content is represented by [Si] mass %, a Pb content is represented by [Pb] mass %, a Bi content is represented by [Bi] mass %, and a P content is represented by [P] mass %, relationships of

$$56.5 \leq f1 = [Cu] - 4.7 \times [Si] + 0.5 \times [Pb] + 0.5 \times [Bi] - 0.5 \times [P] \leq 59.5 \text{ and}$$

$$0.025 \leq f2 = [Pb] + [Bi] < 0.25$$

are satisfied,
a metallographic structure contains α phase and β phase,
in constituent phases of the metallographic structure excluding non-metallic inclusions that are intermetallic compounds, precipitates, oxides, and sulfides, when an area ratio of α phase is represented by (α) %, an area ratio of γ phase is represented by (γ) %, and an area ratio of β phase is represented by (β) %, relationships of $$20 \leq (\alpha) < 85,$$

$$15 < (\beta) \leq 80,$$

$$0 \leq (\gamma) < 5,$$

$$8.0 \leq ([Bi]+[Pb]-0.002)^{1/2} \times 10 + ([P]-0.001)^{1/2} \times 5 + ((\beta)-7)^{1/2} \times ([Si]-0.1)^{1/2} \times 1.2 + (\gamma)^{1/2} \times 0.5 \leq 17.0 \text{ and}$$

$$0.9 \leq ([Bi]+[Pb]-0.002)^{1/2} \times ((\beta)-7)^{1/2} \times ([Si]-0.1)^{1/2} \leq 4.0$$

are satisfied, and
a particle containing Bi is present in the α phase.
2. A free-cutting copper alloy comprising:
higher than or equal to 59.5 mass % and lower than or equal to 64.5 mass % of Cu;
higher than 0.50 mass % and lower than or equal to 1.20 mass % of Si;
higher than or equal to 0.003 mass % and lower than 0.10 mass % of Pb;
higher than 0.030 mass % and lower than 0.10 mass % of Bi; and
higher than or equal to 0.010 mass % and lower than or equal to 0.14 mass % of P,
with the balance being Zn and inevitable impurities,
wherein among the inevitable impurities, a total content of Fe, Mn, Co, and Cr is lower than or equal to 0.35 mass % and a total content of Sn and Al is lower than or equal to 0.35 mass %,
when a Cu content is represented by [Cu] mass %, a Si content is represented by [Si] mass %, a Pb content is represented by [Pb] mass %, a Bi content is represented by [Bi] mass %, and a P content is represented by [P] mass %, relationships of $56.8 \leq f1=[Cu]-4.7\times[Si]+0.5\times[Pb]+0.5\times[Bi]-0.5\times[P]\leq 59.0$, and $0.04 \leq f2=[Pb]+[Bi]\leq 0.19$ are satisfied,
a metallographic structure contains α phase and β phase,
in constituent phases of the metallographic structure excluding non-metallic inclusions that are intermetallic compounds, precipitates, oxides, and sulfides, when an area ratio of α phase is represented by (α) %, an area ratio of γ phase is represented by (γ) %, and an area ratio of β phase is represented by (β) %, relationships of $30\leq(\alpha)\leq 75$, $25\leq(\beta)\leq 70$, $0\leq(\gamma)<3$, $10.0 \leq ([Bi]+[Pb]-0.002)^{1/2}\times 10+([P]-0.001)^{1/2}\times 5+((\beta)-7)^{1/2}\times([Si]-0.1)^{1/2}\times 1.2+(\gamma)^{1/2}\times 0.5 \leq 14.0$, and $1.2\leq([Bi]+[Pb]-0.002)^{1/2}\times((\beta)-7)^{1/2}\times([Si]-0.1)^{1/2}\leq 3.0$ are satisfied,
a particle containing Bi is present in the α phase, and
a compound containing P is present in the β phase.

3. A free-cutting copper alloy comprising:
higher than 58.0 mass % and lower than 65.0 mass % of Cu;
higher than 0.30 mass % and lower than 1.30 mass % of Si;
higher than 0.001 mass % and lower than or equal to 0.20 mass % of Pb;
higher than 0.020 mass % and lower than or equal to 0.10 mass % of Bi; and
higher than 0.001 mass % and lower than 0.20 mass % of P,
with the balance being Zn and inevitable impurities,
wherein among the inevitable impurities, a total content of Fe, Mn, Co, and Cr is lower than 0.45 mass % and a total content of Sn and Al is lower than 0.45 mass %,
when a Cu content is represented by [Cu] mass %, a Si content is represented by [Si] mass %, a Pb content is represented by [Pb] mass %, a Bi content is represented by [Bi] mass %, and a P content is represented by [P] mass %, relationships of $56.5\leq f1=[Cu]-4.7\times[Si]+0.5\times[Pb]+0.5\times[Bi]-0.5\times[P]\leq 59.5$ and $0.025\leq f2=[Pb]+[Bi]<0.25$ are satisfied,
a metallographic structure contains α phase and β phase,
in constituent phases of the metallographic structure excluding non-metallic inclusions that are intermetallic compounds, precipitates, oxides, and sulfides, when an area ratio of α phase is represented by (α) %, an area ratio of γ phase is represented by (γ) %, and an area ratio of β phase is represented by (β) %, relationships of $20\leq(\alpha)<85$, $15<(\beta)\leq 80$, $0\leq(\gamma)<5$, $8.0\leq([Bi]+[Pb]-0.002)^{1/2}\times 10+([P]-0.001)^{1/2}\times 5+((\beta)-7)^{1/2}\times([Si]-0.1)^{1/2}\times 1.2+(\gamma)^{1/2}\times 0.5\leq 17.0$ and $0.9\leq([Bi]+[Pb]-0.002)^{1/2}\times((\beta)-7)^{1/2}\times([Si]-0.1)^{1/2}\leq 4.0$ are satisfied, and
a particle containing Bi is present in the α phase,
a Si content in the β phase is higher than or equal to 0.4 mass % and lower than or equal to 1.7 mass %, and
a tensile strength is at least higher than or equal to 440 N/mm$^2$.

4. The free-cutting copper alloy according to claim 1,
which is a hot worked material, a material obtained by subjecting a hot worked material to cold working, or a material obtained by subjecting a material to hot working, annealing, and cold working,
wherein an electrical conductivity is higher than or equal to 14% IACS, a tensile strength S (N/mm$^2$) is at least higher than or equal to 440 N/mm$^2$, and f8=S×(100+E)/100, which indicates a balance between the strength and the elongation E (%), is higher than or equal to 580.

5. The free-cutting copper alloy according to claim 1, which is used for an automobile component, an electrical or electronic apparatus component, a mechanical component, a stationery, a toy, a sliding component, a measuring instrument component, a precision mechanical component, a medical component, a drink-related device or component, a device or component for water drainage, or an industrial plumbing component.

6. A method for producing the free-cutting copper alloy according to claim 1, the method comprising:
one or more hot working steps,
wherein in the final hot working step among the hot working steps, hot working temperature is higher than 530° C. and lower than 650° C., and an average cooling rate in a temperature range from 530° C. to 450° C. after hot working is higher than or equal to 0.1° C./min and lower than or equal to 50° C./min.

7. The method for producing a free-cutting copper alloy according to claim 6, further comprising one or more steps selected from a cold working step, a straightness correction step, and an annealing step.

8. The method for producing a free-cutting copper alloy according to claim 6, further comprising a low-temperature annealing step that is performed after the final step among the hot working step, the cold working step, the straightness correction step, and the annealing step,
wherein in the low-temperature annealing step, holding temperature is higher than or equal to 250° C. and lower than or equal to 430° C., and holding time is longer than or equal to 10 minutes and shorter than or equal to 200 minutes.

9. A free-cutting copper alloy comprising:
higher than or equal to 59.5 mass % and lower than or equal to 64.5 mass % of Cu;
higher than 0.50 mass % and lower than or equal to 1.20 mass % of Si;
higher than or equal to 0.003 mass % and lower than 0.10 mass % of Pb;
higher than or equal to 0.030 mass % and lower than 0.10 mass % of Bi; and higher than or equal to 0.010 mass % and lower than or equal to 0.14 mass % of P,
with the balance being Zn and inevitable impurities,
wherein among the inevitable impurities, a total content of Fe, Mn, Co, and Cr is lower than or equal to 0.35 mass % and a total content of Sn and Al is lower than or equal to 0.35 mass %,
when a Cu content is represented by [Cu] mass %, a Si content is represented by [Si] mass %, a Pb content is represented by [Pb] mass %, a Bi content is represented by [Bi] mass %, and a P content is represented by [P] mass %, relationships of $$56.8 \leq f1 = [Cu] - 4.7 \times [Si] + 0.5 \times [Pb] + 0.5 \times [Bi] - 0.5 \times [P] \leq 59.0, \text{ and}$$

$$0.04 \leq f2 = [Pb] + [Bi] \leq 0.19$$

are satisfied,
a metallographic structure contains α phase and β phase,
in constituent phases of the metallographic structure excluding non-metallic inclusions that are intermetallic compounds, precipitates, oxides, and sulfides, when an area ratio of α phase is represented by (α) %, an area ratio of γ phase is represented by (γ) %, and an area ratio of β phase is represented by (β) %, relationships of $$30 \leq (\alpha) \leq 75,$$

$$25 \leq (\beta) \leq 70,$$

$$0 \leq (\gamma) < 3,$$

$$10.0 \leq ([Bi]+[Pb]-0.002)^{1/2} \times 10 + ([P]-0.001)^{1/2} \times 5 + ((\beta)-7)^{1/2} \times ([Si]-0.1)^{1/2} \times 1.2 + (\gamma)^{1/2} \times 0.5 \leq 14.0,$$
and $$1.2 \leq ([Bi]+[Pb]-0.002)^{1/2} \times ((\beta)-7)^{1/2} \times ([Si]-0.1)^{1/2} \leq 3.0$$

are satisfied,
a Si content in the β phase is higher than or equal to 0.4 mass % and lower than or equal to 1.7 mass %,
a particle containing Bi is present in the α phase,
a compound containing P is present in the β phase, and
a tensile strength is at least higher than or equal to 440 N/mm$^2$.

* * * * *